Oct. 8, 1957 J. J. STONE, JR., ET AL 2,808,986

ELECTRONIC DIGITAL COMPUTER

Filed March 21, 1952 34 Sheets-Sheet 1

INVENTORS
Joseph J. Stone, Jr.
Edward S. Bettis &
BY Estle R. Mann

Roland A. Anderson
ATTORNEY

ELECTRONIC DIGITAL COMPUTER

Filed March 21, 1952 34 Sheets-Sheet 2

INVENTORS
Joseph J. Stone, Jr.
BY Edward S. Bettis &
Estle R. Mann
Roland A. Anderson
ATTORNEY

ELECTRONIC DIGITAL COMPUTER

Filed March 21, 1952 34 Sheets-Sheet 3

INVENTORS
Joseph J. Stone, Jr.
Edward S. Bettis &
BY Estle R. Mann
Roland A. Anderson
ATTORNEY INVENTORS
Joseph J. Stone, Jr.
Edward S. Bettis &
BY Estle R. Mann
Roland A. Anderson
ATTORNEY

ELECTRONIC DIGITAL COMPUTER

INVENTORS
Joseph J. Stone, Jr.
BY Edward S. Bettis &
Estle R. Mann
Roland A. Anderson
ATTORNEY INVENTORS
Joseph J. Stone, Jr.
BY Edward S. Bettis &
Estle R. Mann
Roland A. Anderson
ATTORNEY INVENTORS
Joseph J. Stone, Jr.
BY Edward S. Bettis &
Estle R. Mann
Roland A. Anderson
ATTORNEY INVENTORS
Joseph J. Stone, Jr.
Edward S. Bettis &
BY Estle R. Mann
Roland A. Anderson
ATTORNEY INVENTORS
Joseph J. Stone, Jr.
Edward S. Bettis &
Estle R. Mann
BY Roland A. Anderson
ATTORNEY INVENTORS
Joseph J. Stone, Jr.
Edward S. Bettis &
Estle R. Mann
BY Roland A. Anderson
ATTORNEY INVENTORS
Joseph J. Stone, Jr.
Edward S. Bettis
Estle R. Mann
BY Roland A. Anderson
ATTORNEY INVENTORS
Joseph J. Stone, Jr.
Edward S. Bettis &
Estle R. Mann
BY
Roland A. Anderson
ATTORNEY INVENTORS
Joseph J. Stone, Jr.
Edward S. Bettis &
BY Estle R. Mann
Roland A. Anderson
ATTORNEY INVENTORS
Joseph J. Stone, Jr.
Edward S. Bettis &
Estle R. Mann
BY
Roland A. Anderson
ATTORNEY INVENTORS
Joseph J. Stone, Jr.
BY Edward S. Bettis &
Estle R. Mann
Roland A. Anderson
ATTORNEY INVENTORS
Joseph J. Stone, Jr.
Edward S. Bettis &
Estle R. Mann
BY
ATTORNEY Oct. 8, 1957 J. J. STONE, JR., ET AL 2,808,986

ELECTRONIC DIGITAL COMPUTER

Filed March 21, 1952 34 Sheets-Sheet 17

INVENTORS
Joseph J. Stone, Jr.
Edward S. Bettis &
BY Estle R. Mann
Roland A. Anderson
ATTORNEY INVENTORS
Joseph J. Stone, Jr.
BY Edward S. Bettis &
Estle R. Mann
Roland A. Anderson
ATTORNEY INVENTORS
Joseph J. Stone, Jr.
Edward S. Bettis &
Estle R. Mann
BY Roland A. Anderson
ATTORNEY INVENTORS
Joseph J. Stone, Jr.
BY Edward S. Bettis &
Estle R. Mann
Roland A. Anderson
ATTORNEY INVENTORS
Joseph J. Stone, Jr.
BY Edward S. Bettis &
Estle R. Mann
Roland A. Anderson
ATTORNEY INVENTORS
Joseph J. Stone, Jr.
BY Edward S. Bettis &
Estle R. Mann
Roland A. Anderson
ATTORNEY INVENTORS
Joseph J. Stone, Jr.
Edward S. Bettis &
Estle R. Mann
BY
Roland A. Anderson
ATTORNEY INVENTORS
Joseph J. Stone, Jr.
BY Edward S. Bettis &
Estle R. Mann Roland A. Anderson
ATTORNEY

ELECTRONIC DIGITAL COMPUTER

Filed March 21, 1952 34 Sheets-Sheet 25

INVENTORS
Joseph J. Stone, Jr.
Edward S. Bettis &
BY Estle R. Mann
Roland A. Anderson
ATTORNEY INVENTORS
Joseph J. Stone, Jr.
BY Edward S. Bettis &
Estle R. Mann

ATTORNEY

INVENTORS
Joseph J. Stone, Jr.
BY Edward S. Bettis &
Estle R. Mann
Roland A. Anderson
ATTORNEY INVENTORS
Joseph J. Stone, Jr.
BY Edward S. Bettis &
Estle R. Mann
Roland A. Anderson
ATTORNEY Oct. 8, 1957 J. J. STONE, JR., ET AL 2,808,986

ELECTRONIC DIGITAL COMPUTER

Filed March 21, 1952 34 Sheets-Sheet 29

INVENTORS
Joseph J. Stone, Jr.
BY Edward S. Bettis &
Estle R. Mann

Roland A. Anderson
ATTORNEY

INVENTORS
Joseph J. Stone, Jr.
BY Edward S. Bettis &
Estle R. Mann
Roland A. Anderson
ATTORNEY INVENTORS
Joseph J. Stone, Jr.
BY Edward S. Bettis &
Estle R. Mann
Roland A. Anderson
ATTORNEY INVENTORS
Joseph J. Stone, Jr.
Edward S. Bettis &
Estle R. Mann
BY Roland A. Anderson
ATTORNEY INVENTORS
Joseph J. Stone, Jr.,
BY Edward S. Bettis &
Estle R. Mann
Roland A. Anderson
ATTORNEY INVENTORS
Joseph J. Stone, Jr.
BY Edward S. Bettis &
Estle R. Mann

ATTORNEY 2,808,986
Patented Oct. 8, 1957

2,808,986

ELECTRONIC DIGITAL COMPUTER

Joseph J. Stone, Jr., Clinton, Estle R. Mann, Oak Ridge, and Edward S. Bettis, Fountain City, Tenn., assignors to the United States of America as represented by the United States Atomic Energy Commission Application March 21, 1952, Serial No. 277,816

8 Claims. (Cl. 235—61)

The present invention relates to computing machines, and more specifically to an electronic digital computer designed to solve systems involving a plurality of simultaneous linear equations.

Systems which are most suited for solution by the computer are those which converge rather rapidly when using Von Seidel's method of approximation. In Von Seidel's method the equations to be solved are transposed so that each unknown appears on the left side of one of the equations. In this form each unknown, say $x_1$, is equal to a constant term plus a summation of the products of each of the other unknowns and the proper coefficients. The set of equations then appears in the following form:

$$X_1 = A_{11} + A_{12}X_2 + A_{13}X_3 + \ldots + A_{1n}X_n \qquad (1)$$

$$X_2 = A_{21}X_1 + A_{22} + A_{23}X_3 + \ldots + A_{2n}X_n \qquad (2)$$

---

$$X_n = A_{n1}X_1 + A_{n2}X_2 + A_{N3}X_3 + \ldots + A_{nn} \qquad (n)$$

In each equation the constant term in the series is placed in the position normally occupied by the variable which appears on the left. The number of equations in the above set is equal to *n*.

The solution is obtained by making an initial guess as to the value of each unknown and substituting these values into the first equation for $X_1$. The result is a better guess for $X_1$ which may then be used in Equation 2 to obtain a closer approximation to $X_2$. In this manner each of the unknowns is successively corrected until the entire set has converged to the correct result. A complete iteration involves the use of each equation of the set once. As many iterations as desired may be made to obtain the answer; an indication of which is agreement between successive iterations.

Accordingly, it is an object of the present invention to provide a computer for performing the summations indicated in each of the above equations and for solving for the unknown terms thereof by a method of successive approximations.

A further object of the invention is to provide a computer comprising calculating means, and a plurality of synchronized intelligence storage media adapted to continuously deliver information to the calculating means and to receive at appropriate intervals information calculated by said means.

Other objects and numerous advantages of the invention will be apparent from the following detailed description, when read in connection with the appended drawings, in which:

Figure 1, *a* to *f*, illustrates in block form the over-all arrangement of a preferred form of the invention;

Figure 3 illustrates schematically a portion of a preferred mechanism for selecting, coding, and recording intelligence on the magnetic tape, shown also in Figure 2;

Figures 17–40 illustrate in more detail the preferred embodiments of certain novel and functional electronic units of the computer, which are shown only in block form in Figure 1.

Figure 1D:
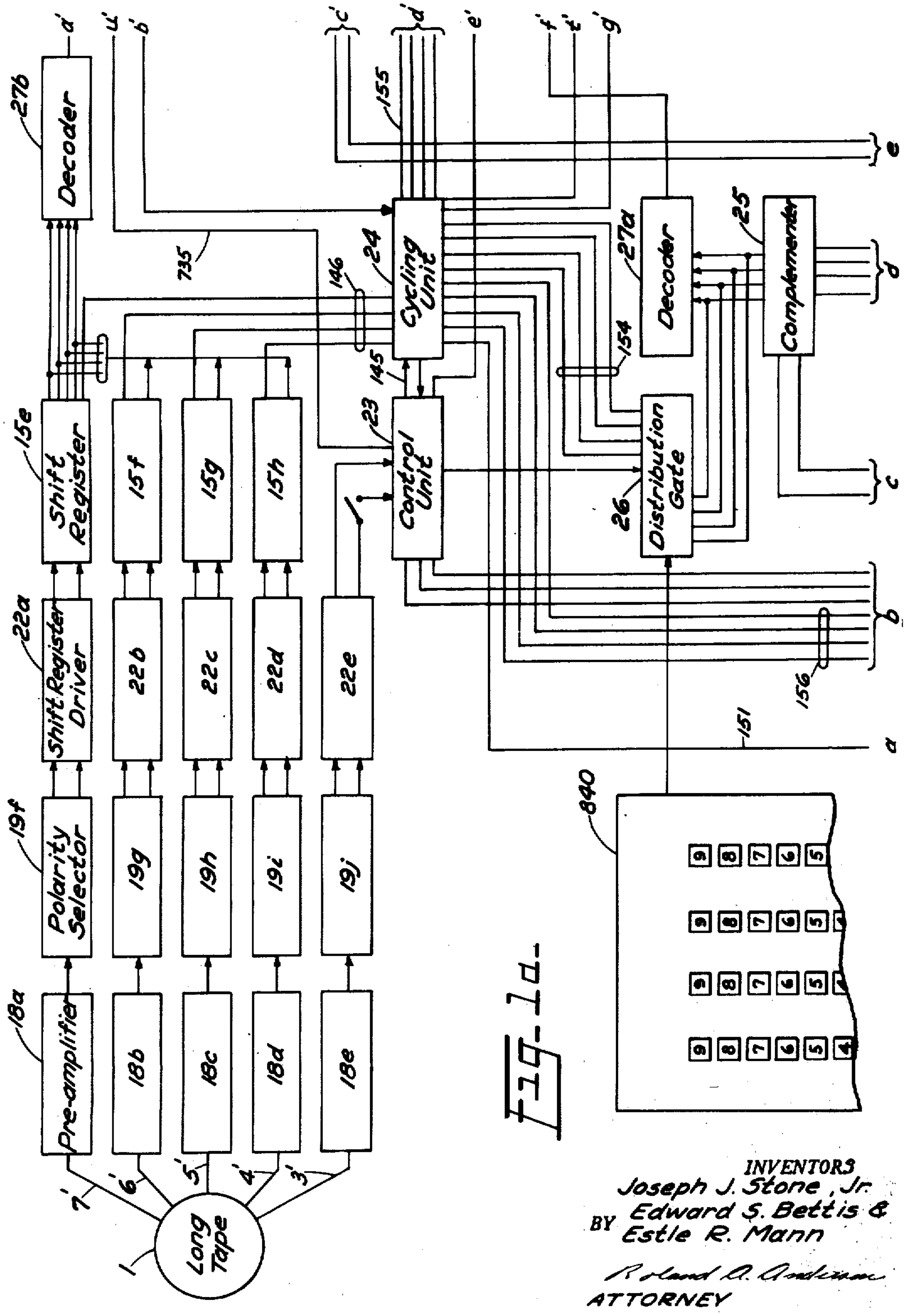

The objects of the present invention are accomplished in a manner fully disclosed hereinafter. The product of each unknown and its associated coefficient is computed and then is added to the products that precede it in the equation, which products have been previously computed or estimated. The values of the coefficients and the unknowns are stored in the machine on two magnetic tapes which are scheduled to arrive at the inputs to the electronic portion of the computer in the proper order and at the proper time for use in the computation. A sufficient interval is left between numbers on the magnetic tapes to allow time for the computation to be performed so that the tapes may run continuously during the computation, and the two tapes used are mechanically held in synchronization by the use of the same sprocket drive for both.

One of the two magnetic tapes, hereafter referred to as the "long" tape, is used to store and furnish as required the values of the coefficients of all the variables in all the equations, in a serial fashion. These may be recorded in groups of 240 tape sprocket holes length, each group representing the coefficients of a single equation in the set. The same unknowns are used, however, in each equation, and, therefore, must be repeated into the computer from the tape as each new equation is used. We have found that, because of the repeating nature of the unknowns, they may be stored upon an endless circulating tape, synchronized with the long tape, and hereafter denoted the "short" tape, the length of which is equal to the distance occupied by the coefficients of each equation on the long tape. By aligning marks on the two tapes at the start of an iteration, the values of the variables are aligned with the respective coefficients for the first equation, and then alignment will exist between the variables and the proper coefficients in the following equations. Each revolution of the short tape completes the solution of one of the equations, so at the end of each revolution a better approximation for one of the unknowns is stored in the computer. During the next revolution of the short tape, which occurs during the solution of the next equation, the previously obtained value for the unknown is inserted at the proper place thereon. The reinsertion of the new value on the tape erases the old value automatically. The place on the short tape at which the new value is to be recorded is selected by instruction codes recorded on the long tape along with the coefficients.

Initially the short tape contains nothing but a series of timing marks, which are used by the computer to determine the exact location along the tape at which the recordings are to be made. The blank tape is automatically assumed by the machine as zeros, so that a zero initial guess as to the value of the first unknown is made automatically if nothing else is recorded on the tape. Other guesses may be made if desired by inserting these on the short tape, using an especially prepared long tape which instructs the computer to record on the short tape the number selected from a keyboard on the control panel. The long tape in this case may be made endless and progresses with respect to the short tape so that each location on the short tape may be filled. A time interval between recordings is allowed which is sufficient for the operator to modify the number in the keyboard between recordings. In addition to the number, the sign of the variable is recorded on the short tape. The range of values for the unknowns may vary between plus and minus one, the computer being inoperative for values outside those limits.

For convenience, numbers are stored and used in the excess three coded binary form. Each decimal digit is represented by the four digit binary number which is three greater than the decimal digit; thus if X is the digit to be coded, the binary number N used will be: $N=X+3$.

Figure 1B:
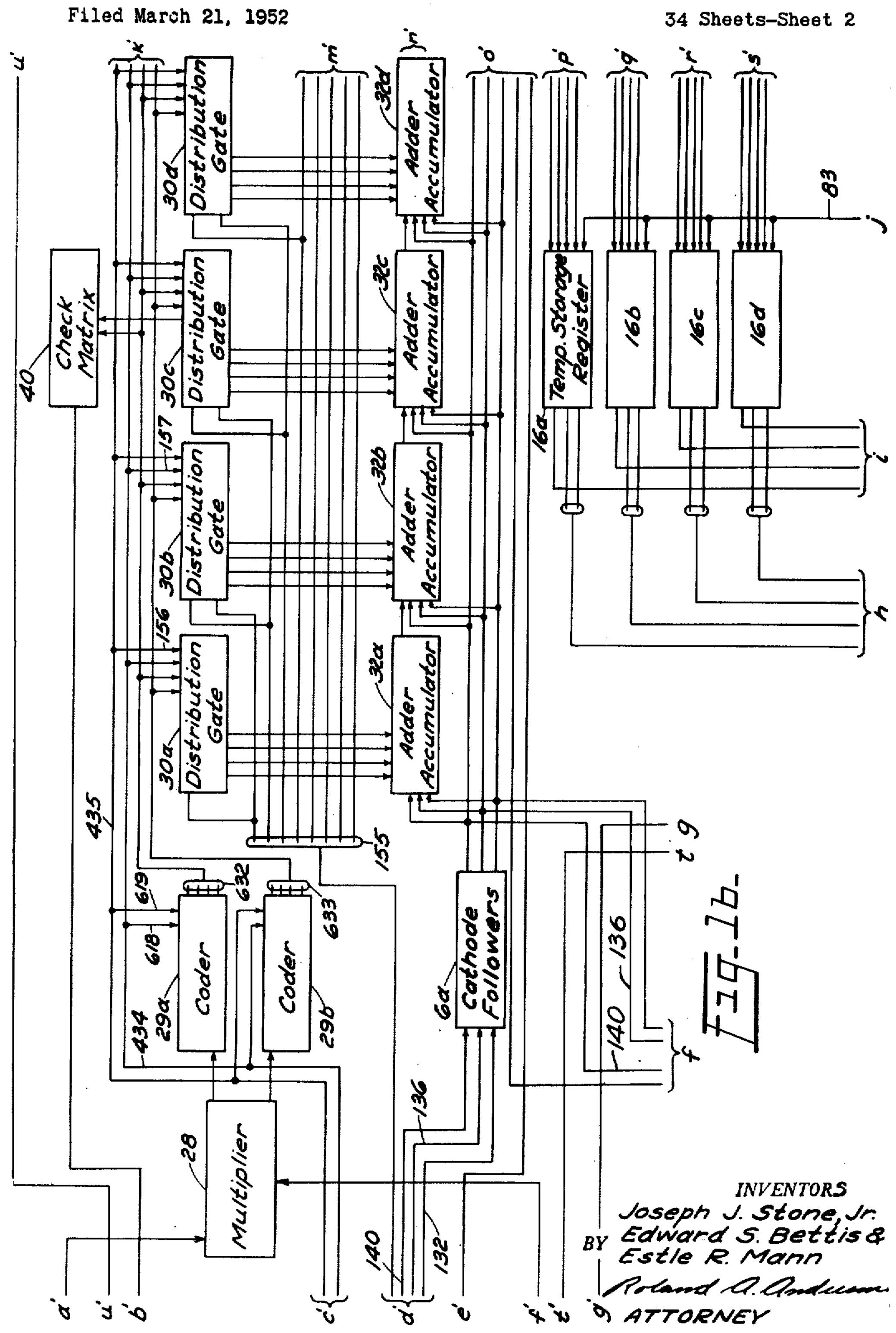
Figure 1C:
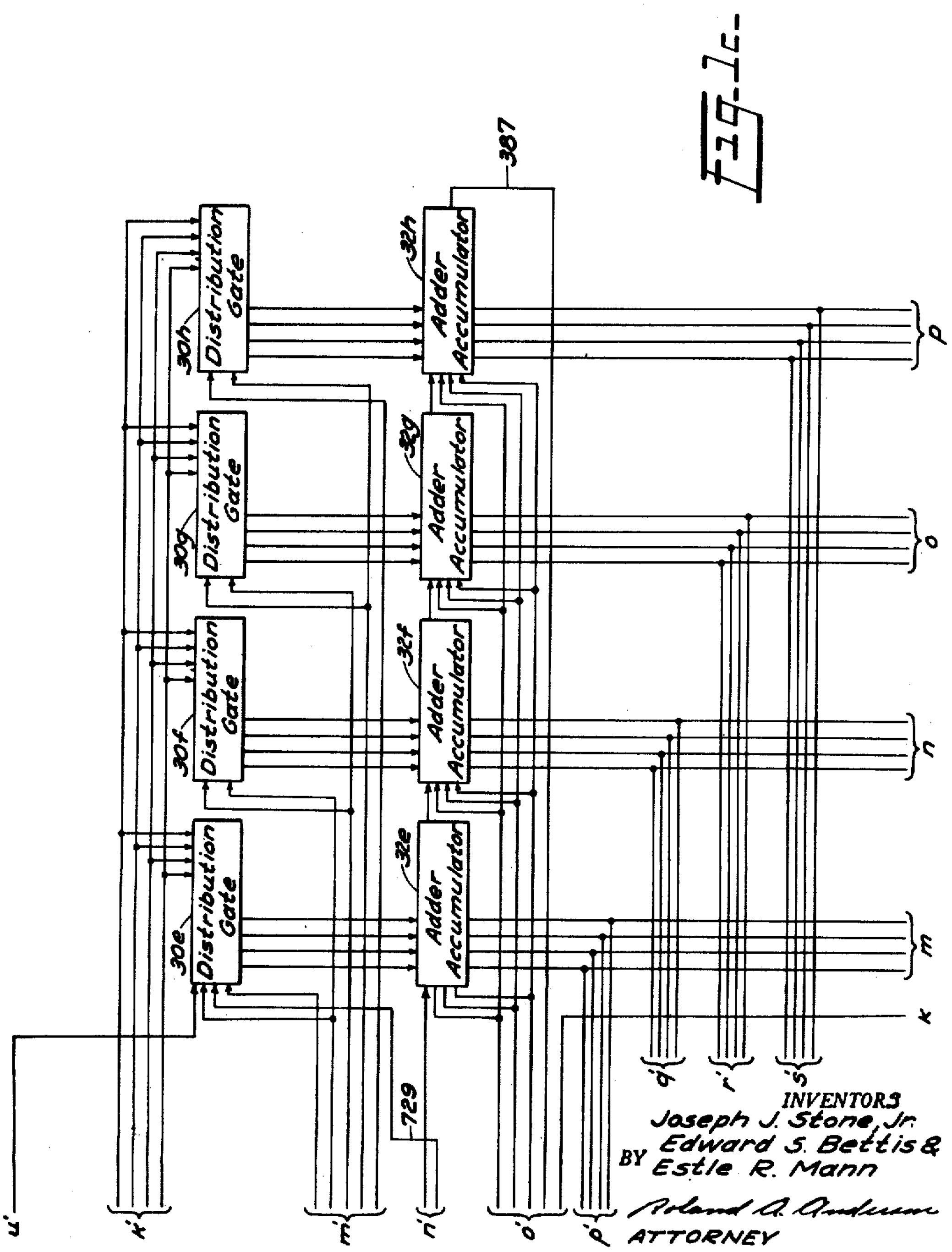
Figure 1D:
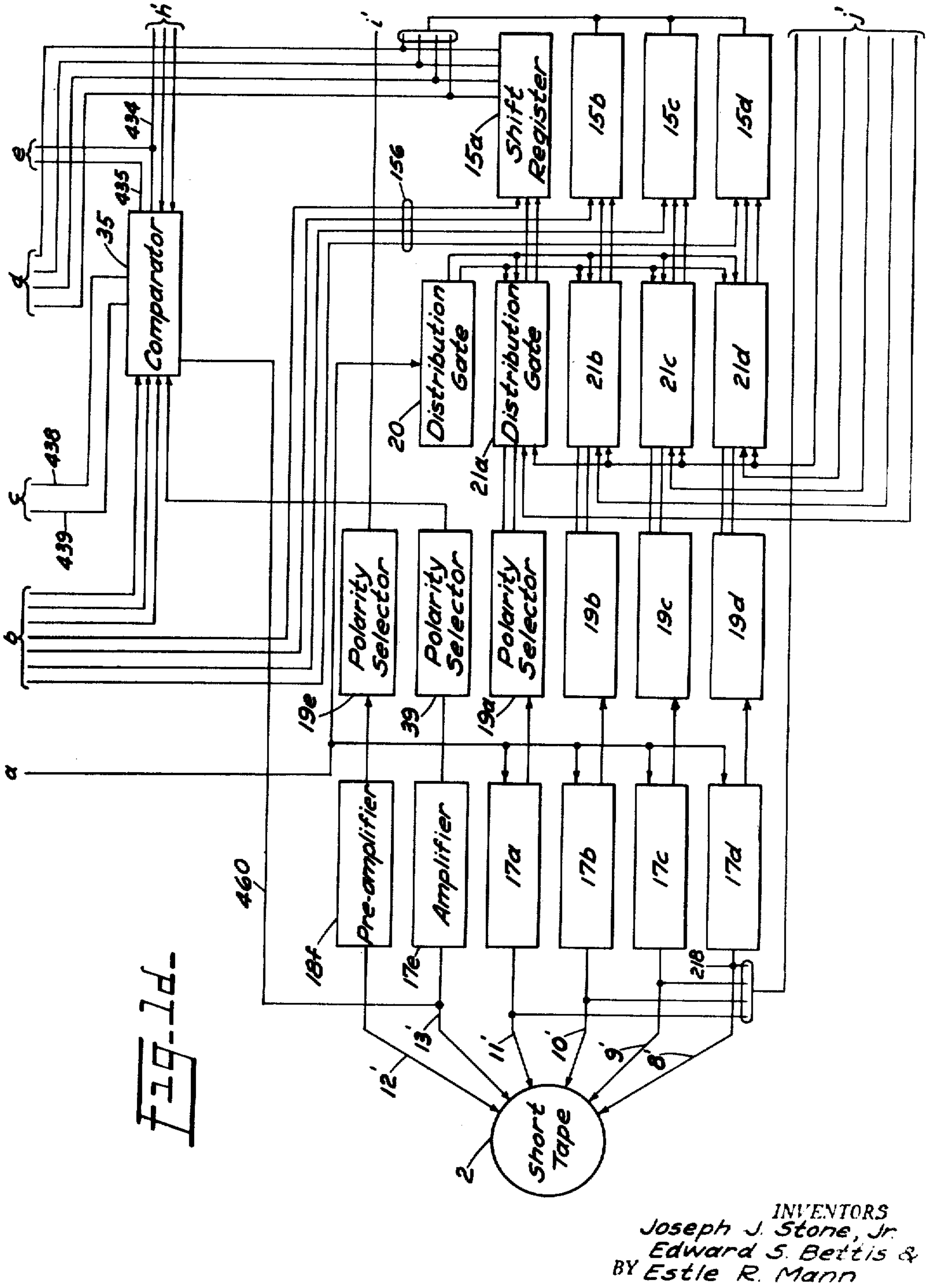
Figure 1E:
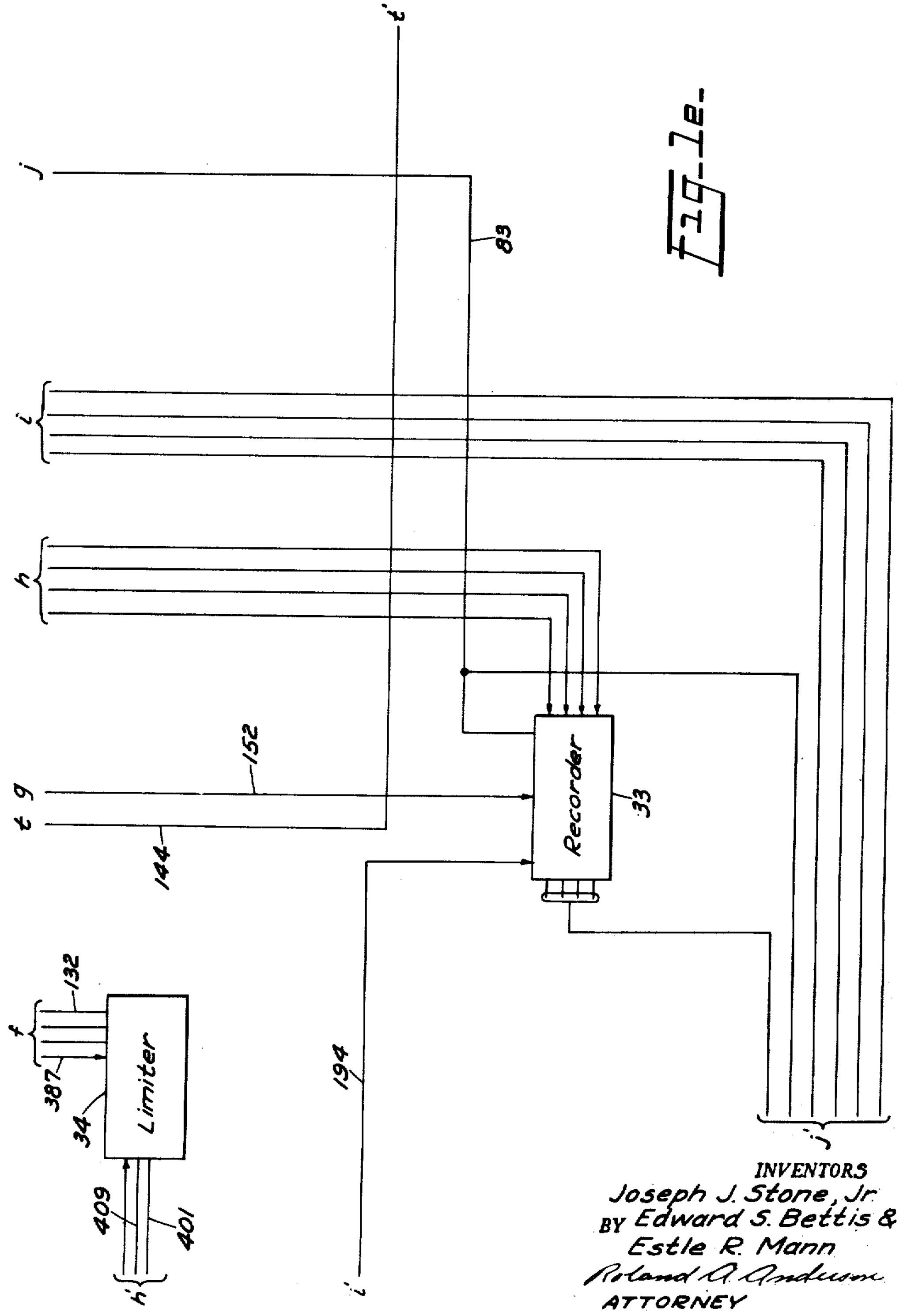
Figure 1F:
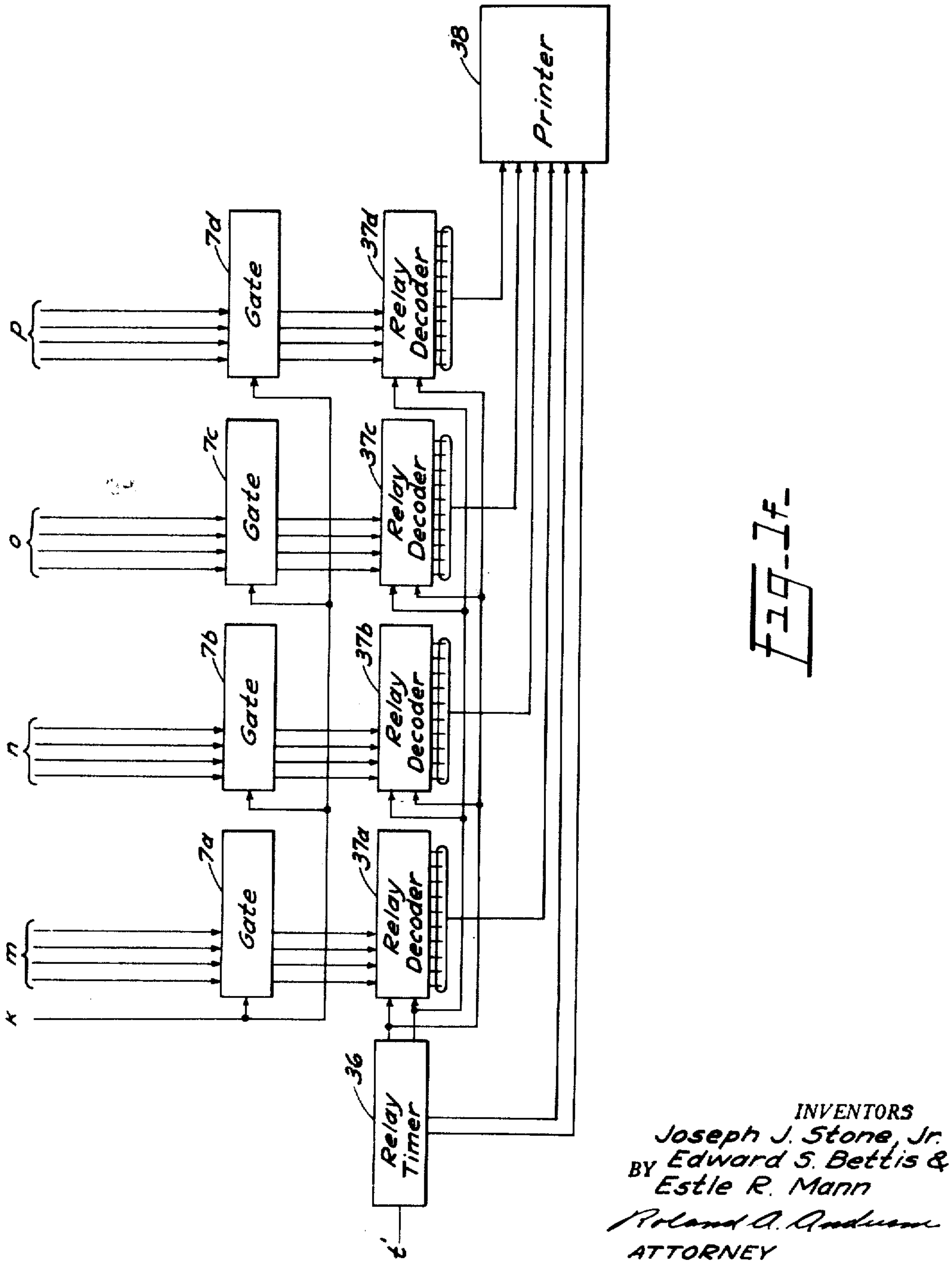
Figure 2:
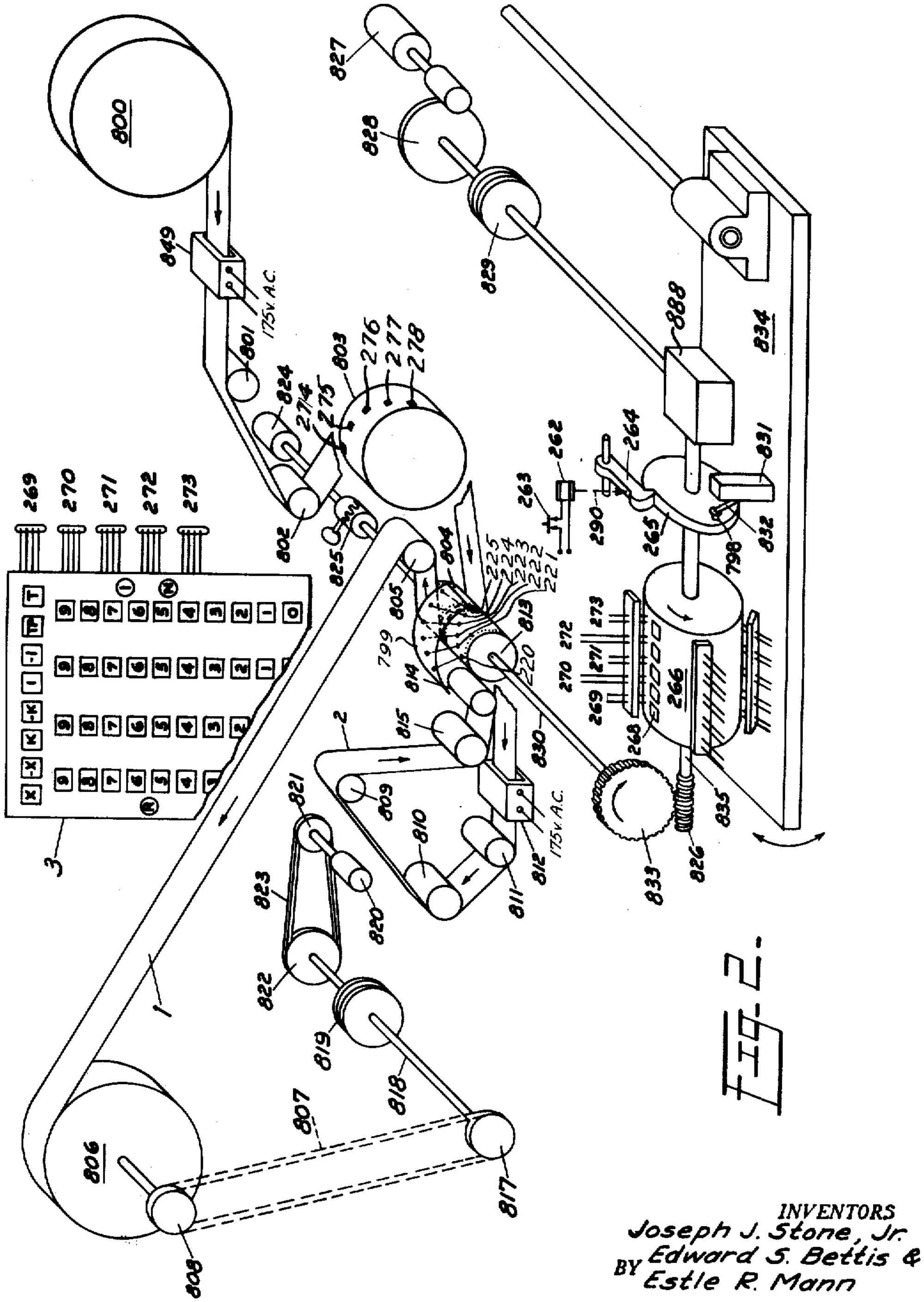
Figure 2 illustrates a preferred embodiment of the means provided for handling the intelligence storage medium, for storing information thereon, and for obtaining the desired information at the proper time.

Referring now to Figure 1, *a* to *f*, five recording channels 3'–7' are used on the long tape 1, channels 4'–7' are used to store the coefficient and channel 3' is used to store the instruction. The four binary digits necessary to represent a decimal number are recorded in serial fashion in each recording channel, with one's being positive pulses and zero's negative pulses. Space is left between groups on the tape to allow time for the computation discussed above and to allow for mechanical play in the positions of the long and short tapes. Six channels are used on the short tape 2. Of these channels 8'–11' carry the unknown, while the channel 12' carries time markers and channel 13' carries the sign of the unknown. The tapes may move at 20 inches per second and numbers are read at the rate of 180 per second. The same magnetic heads are employed to both read and record the signals on the tape. While any conventional head could be utilized, the small size brush tape recording head, distributed by the Brush Company, catalog No. BK-919, is preferred. The heads may be held in position inside a pair of drums over which the respective tapes pass, so that one of the tapes contacts the proper surface of each head, in the conventional manner. The head arrangement is shown in Figure 2, infra.

Operation of each unit of the computer is fully described hereinafter. Briefly stated, operation of the entire computer is as follows:

A coefficient and a variable number are read simultaneously from the tapes 1, 2, each head reading four binary signals, forming one decimal digit, serially. The two complete numbers are stored in input shift registers 15*a*—15*h*. A decimal digit (four binary digits) at a time is transferred from registers 15*e*—15*h* to the multiplier 28 simultaneously with either a corresponding decimal digit of the number in registers 15*a*—15*d*, a digit of a constant number selected at the number board 3, or the decimal number "1." The two decimal digits of each multiplier product are gated into the proper two of the eight units in the adder-accumulator 32. After the products of the four decimal digits have been formed, they are all added to or subtracted from the total in the accumulator in accordance with the sign of the product. The next coefficient and variable are now stored in the shift registers 15*a*—15*h* and are gated into the multiplier. When each new product is calculated, the result is added to the products previously made, so that after a complete revolution of tape 2, the accumulator holds the new estimate of the values of the variable solved for. If subtraction is called for by the instruction recorded on tape 1, the complement of the number with respect to 9 is formed in complementer 25 and the complement is used in place of the number. As is described in connection with Figure 29, by use of the excess 3 code, and by complementing the numbers in their binary form, accurate subtraction may be provided in this manner.

After all the operations indicated for an equation are accomplished by the computer, the approximation or total for that equation is transferred to temporary storage registers 16A—16*d*, where it remains until the proper place for insertion on the short tape 2 is reached during solution of the next equation. The transfer operation also resets the accumulator to zero, so that the next equation may be started immediately. The total may also be printed out by a suitable printer 38, operated by the transfer signal, so the operator may see immediately each new approximation and check the convergence of the solution.

The function, individual construction features, and the interrelation of all the units shown in block form in Figure 1, *a* to *f*, will become apparent from the following detailed descriptions of each unit, when read in connection with the over-all circuit arrangement of Figure 1, *a* to *f*, and the appropriate individual diagram.

A preferred tape handling mechanism is illustrated in Figure 2. An object of this mechanism is to move the two storage media, which may be 35 mm. perforated recording tapes, past the reading-recording heads in exact synchronism. The "long" tape 1 may be initially wound on storage reel 800. In operation, it is threaded through erasing coil 849, over pulleys 801 and 802, around drum 803 which holds magnetic heads 274—278 arranged in staggered relation as shown schematically by the solid squares around drum 804 which carries sprockets to engage the tape perforations, around pulley 805, and is taken up on reel 806, which may be driven through chain 807 and sprocket wheels 808, 817.

The "short" or endless tape 2 is threaded over the pulleys 809—810, under pulley 811, through erasing coil 812, around sprocketed drum 813, located under segment 799 carrying magnetic heads 220—225, shown schematically by the dots at the end of lines connected to the segment, and under pulleys 814, 815.

Heads 220—225 are mounted in a cylindrical sector 799 which rests on drum 813. They may be held in position by clamps fitting around the obverse or back surface of the heads, the clamps being fastened to the surface of the sector 799 by suitable mounting brackets. Two smooth, raised flanges are provided on the drum 813 just outside the sprockets, and the base of the sector rests upon and slides on those flanges as the drum rotates. The heads are staggered in position, as shown, and are aligned diagonally across the drum. In like manner heads 274—278 are offset both around the circumference and across the width of drum 803. The latter heads are mounted on brackets inside the hollow drum, which remains stationary while the long tape 1 slides over it. A cork lining on the two sprocketed drums provides a friction drag on the tapes and insures positive contact of the tape surface with the magnetic heads.

It is apparent that other similar arrangements for supporting the heads adjacent the tapes could be utilized; for example, both sets of heads could be mounted inside a drum like drum 803. The objects achieved by the tape and head arrangement is the recording of a plurality of magnetic signals on two storage media individually or simultaneously, and the reading of a plurality of related, stored signals from both media simultaneously. The various sizes and locations of the pulleys and drums is, of course, not critical, the particular embodiments shown being only a convenient means for providing proper tension on the tapes so they may be kept in synchronization.

The wheel 817 may be carried on shaft 818, which is supported by bearings, and which terminates in one side of magnetic clutch 819. Take-up motor 820 drives the magnetic clutch through pulleys 821—822 and belt 823. Drive motor 824 is coupled through breakable coupling 825 to shaft 830, which carries spocketed drums 804, 813 and a worm wheel 833. The wheel may be meshed with worm 826 by raising hinged platform 834 to the horizontal position. The perforations in the 35 mm. tape engage the sprockets, so that rotation of the shaft 830 causes synchronous movement of tapes 1, 2.

When it is desired to record information on either tape, hinged platform 834 is raised to the horizontal position, engaging wheel 833 with worm 826, and coupling 825 is broken, disengaging the drive motor. The recording motor 827 is energized to drive the drum 266 and, through the worm and wheel, turns the sprocket wheels 804, 813 carrying the tapes, to insure perfect synchronism.

Shaft 835 carrying the worm 826 and the drum 266 is urged to turn by the torque from motor 827, but is prevented from turning by the cam 265 and pawl 264. When button 263 is closed, solenoid 262 is energized, and the pawl is picked up by the plunger 290. Then the shaft 835 turns, carrying the drum 266 for one complete revolution. As may be seen from Figure 3, the solenoid will be energized by closing switch 263, causing the tapes to be advanced to the next consecutive position, only if the arm 832 of microswitch 831 is depressed. Screw 798 mounted on cam 265 holds the arm 832 depressed while the cam is in the locked position. When the cam rotates, arm 832 disengages the screw, opening the solenoid energizing the circuit, and allowing pawl 264 to fall back onto the cam surface. The microswitch arm in this position also closes the circuit connecting batteries 249, 253, Figure 3, to the switches in the keyboard unit 3. When the recording is finished, platform 834 is lowered, disengaging the worm and wheel, and the drive motor is re-coupled to shaft 830 through coupling 825. The recording motor 827 is still connected to shaft 835 through worm and wheel 828, magnetic fluid clutch 829, and gearing 888 to exert a turning force on shaft 835, so as to drive drum 266 when the cam is again released.

To erase the tapes, coils 812 and 849 may be energized from a source of 175 v., 440 cycle A. C., and the tapes are merely run through the respective coils. The fields set up by the coils should be sufficient to obliterate any signals which may have been recorded on the tapes, in the manner well known to the art.

Figures 3, 20, 21:
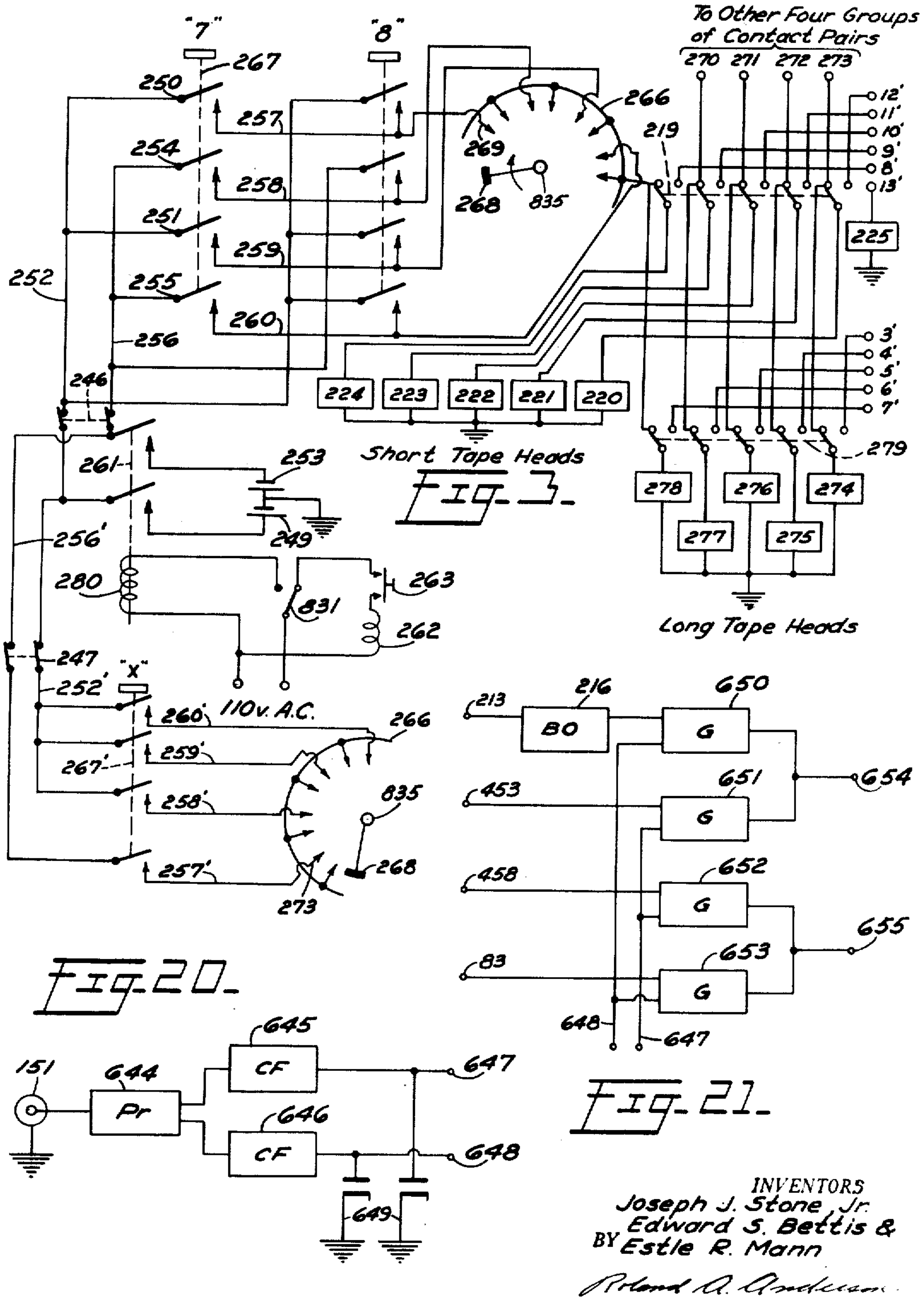

Figure 3 illustrates schematically a representative portion of the keyboard unit and associated electrical connections for coding and recording both numbers and instructions onto the long tape. On the keyboard itself, as indicated by block 3, Figure 2, there may be four columns of ten numbered keys each, representing the four decimal digits of a number to be coded, a row of eight keys, representing eight of the nine possible instructions to the machine, a record key R, a number switch N and an instruction switch I.

To record numbers on either type, the N switch 247 is thrown, opening the + and − busses 252′, 256′ to the instruction keys. To record instructions on the long tape 1, the I switch is thrown, opening the + and − busses 252, 256 to the number keys, but allowing the busses 252′, 256′ to be energized. Switch 279 may be thrown to the left, as illustrated, to connect the long tape heads 274—278 to the energized channels, while switch 219 should be thrown to the right, opposite from the illustrated position, to disconnect the short tape heads 220—224.

In recording numbers, solenoid actuator 262 may be energized from a source of 110 volt, 60 cycle current by closing push button 263. As is shown in Figure 2, pawl 264 is picked up, releasing cam 265 to make one complete revolution. As the cam rotates, it momentarily throws microswitch 831, energizing solenoid 280, closing switch 261 and connecting batteries 249, 253 to + and − busses 252, 256.

Each of the number keys, when depressed, closes the contacts of a four-pole switch, which is wired to correspond with the coded binary representation of that number. For example, since the code for "7" is 1010, the first and third contacts 250, 251 are connected to bus 252, which, when energized, connects to the positive side of battery 249. The second and fourth contacts 254, 255 are connected to bus 256, which in turn may be connected to the negative side of the battery 253. The respective output channels for all ten switches in a column are connected in parallel, and only one switch in the column may be closed at one time. Thus, a positive voltage will appear in the first and third output channels 257, 259, while a negative voltage appears in second and fourth channels 258, 260, to represent the number "1010," when switch 267 is closed by depressing the key numbered "7." In like manner, the switch actuated by key numbered "8" in the same column sets up voltages to represent "1011" in the respective output channels when key "8" is depressed.

Drum 266 is mounted on camshaft 835 and turns with the cam. The drum carries a five-segmented conductive strip 268. Five pairs of flexible metal contact fingers 269—273 are mounted to wipe against the drum as it rotates. One contact of each of the pairs is connected to one end of its respective recording head winding while the other contact of the pair is connected to its respective output channel from the keyboard. Three other like groups of five pairs of contacts are spaced around the drum, the groups being 72 degrees apart. The remaining 144 degree segment of the drum allows for a computing time interval between numbers. As the strip 268 contacts a group of metal fingers, it short circuits each pair of fingers of that group through a segment, providing a current surge in the appropriate direction from one battery through the switches and through each of the associated recording heads 274—278. Seventy-two degrees later, the strip passes a second group of contact pairs, shorting each pair to provide another current surge through the recording heads. Four consecutive signals through the heads complete recording of four decimal digits and an instruction in coded binary form.

Eight of the nine possible instructions are binary coded into a four binary digit number, and the switches are interconnected like the switches in a column of number keys as illustrated. One contact of each of the four instruction contact pairs indicated generally at 273 may be connected to the four instruction output channels 257′—260′, so that head 274 will record, in sequence, a signal corresponding to the voltages set up in the respective channels, provided switch 247 is closed. For example, the "X" key sets up "0111" to be recorded as a four place binary number in the instruction channel.

The key indicated at the left of the number keys and marked R, directs the computer to "record" when it is depressed, and it alone may be depressed together with any of the other keys. Its effect is only to set up a "1" in the most significant digit of the coded instruction signal. The R key closes only one set of contacts, connecting the positive bus 252′ to channel 257′, which represents the most significant digit of the instruction. The remaining eight instructions are so coded that a 1 does not appear in that digit. Table A below illustrates the coded binary instructions as they could be set up in the computer, and their meanings.

*Table A*

| Instruction | Code | Meaning |
|---|---|---|
| X | 0111 | Multiply long tape no. by short tape no. |
| −X | 0011 | The sign corresponds to that of the long tape no. |
| K | 0101 | Multiply long tape no. by constant from Keyboard 3. |
| −K | 0001 | The sign is that of the long tape no. |
| 1 | 0110 | Add long tape no. to accumulator total. |
| −1 | 0010 | Subtract long tape no. from accumulator total. |
| TP | 1101 | Round off; transfer accumulator no. to temporary storage register and printer; reset accumulator. |
| T | 0100 | Same as TP, except no transfer to printer. |
| R | 1 | Record the no. in temporary storage register on the short tape, during next reading period. |

Timing marks are recorded on the short tape in channel 12′ through recording head 220 by depressing any instruction key, throwing switch 279 to the right and switch 219 to the left, throwing instruction switch 246 open, and recording. The signals recorded may be of either polarity, and are used in each space of the short tape where a signal is to be recorded.

The present computer utilizes several conventional circuit elements or components in one or more of its functional units. Therefore, to avoid the excessive complexity of the complete schematic diagrams of all the units, certain conventional components will be illustrated below and thereafter shown in block form only. A more complete description of these elements may be found in Electronics, Elmore and Sands, McGraw-Hill Book Co., 1949. One skilled in the art will realize that many modifications and variations of the components illustrated may be made without departing from the teachings of the invention, and it is intended that the conventional circuits hereinafter shown be considered as illustrative only, and not in a limiting sense.

Figure 4:
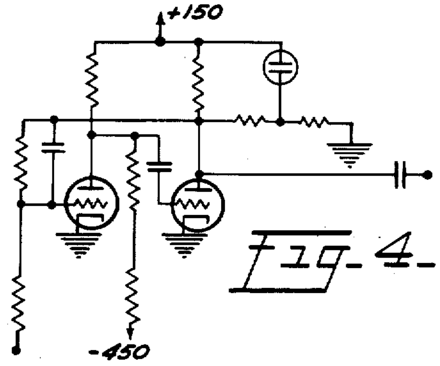
Figures 4–16 illustrate preferred embodiments of certain conventional circuit elements used throughout the computer which for clarity are shown only in block form in the remaining drawings.

One circuit element used repeatedly throughout the computer is the well known Eccles-Jordan trigger circuit, or flip-flop, denoted in the block diagrams as "FF," a preferred embodiment of which is illustrated in Figure 4. This element has two stable states, so is very useful in "storing" a binary number which also has two possible states. One indication of the state of the flip-flop, therefore, of the number "stored" therein, may be obtained by the relative potentials of the anodes of the two tubes. If a tube is cut off, its anode potential will be "high"—substantially 150 volts; but if the tube is conducting, the anode potential will fall to its "low" condition—about 75 volts. Therefore, the potential of each tube plate will be "high" or "low" depending upon the stable state in which the flip-flop is operating, which in turn depends upon the "number" input signal impressed thereon. Tube types 12AT7 and 5687 are preferred for this circuit.

Figure 5:
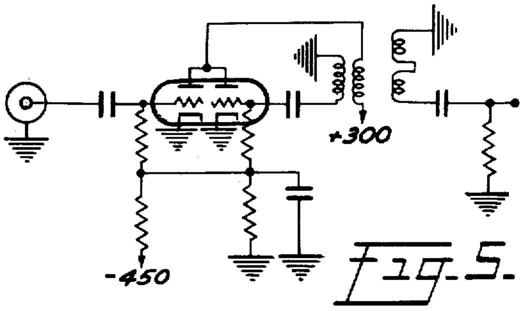

Another element which finds repeated use is the biased blocking oscillator, denoted by the letters BO in the block diagrams, a preferred form of which is shown in Figure 5. This element is used generally to generate a single very sharp pluse in response to each triggering signal. It is preferred to take the output signal from the tube anode through a winding of a pulse transformer, rather than from the cathode, as illustrated in the reference, supra. The tube may be type 12AT7, while a satisfactory transformer is that of Dumont, Inc., Catalog No. 20C11117.

Figure 6:
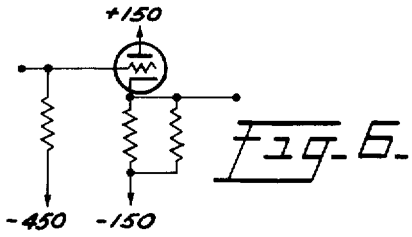

A third familiar element employed is the cathode follower, denoted CF in the drawings, and illustrated in Figure 6. This unit is conventionally used herein primarily as a low-impedance output stage. If the tube is cut off, the output voltage at the cathode is at its "low" value, while if the tube conducts, that potential rises to its "high" value because of the voltage drop across the cathode resistor. One triode section of a type 5687 tube is a satisfactory tube for this element.

Figure 7:
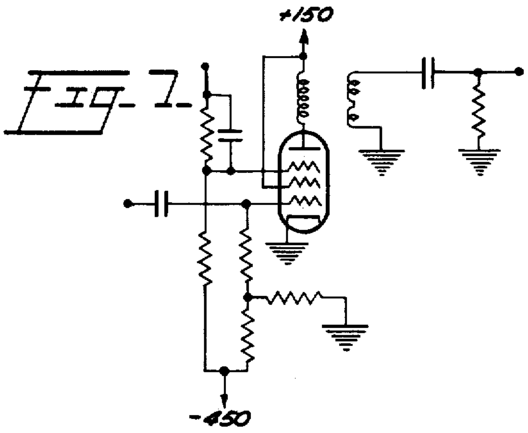

A preferred form of a gate circuit, denoted by G is the block diagrams, is shown in Figure 7. The purpose of this element is to allow a pulse to pass from one element in the computer to another only upon receipt of a preselected signal, so that, ideally, it will have either a unity gain or a zero gain, depending upon the presence or absence of a certain "gating" signal. In the conventional circuit shown, the positive voltage "gating" signal is applied to the suppressor grid, while the signal to be passed or blocked is applied to the control grid. In the absence of the "gating" signal, the tube cannot be rendered conductive by the signal applied to the control grid, but in the presence of the "gating" signal, an input pulse to the control grid will cause a pulse to appear in the output transformer winding. The preferred gating tube is type 6AS6, and the pulse transformer may be that furnished by Dumont, mentioned supra.

Figure 8:
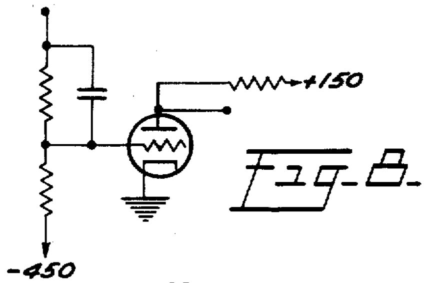

The pulse inverter stage, shown in Figure 8, is simply a single pulse amplifier stage, one triode section of a type 12AT7 tube, for example. The input pulse is applied to the grid and the output, a pulse of opposite polarity, is taken from the anode. This element is denoted by the letters INV in the drawings.

Figure 9:
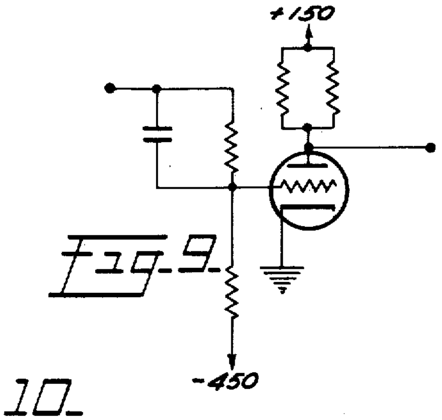

Like the inverter stage, the conventional buffer stage, denoted by the letter B and shown in Figure 9, is a single stage of amplification, for example, one triode section of a tube type 12AT7. It serves as an impedance buffer, especially between different units of the computer, where two different impedance levels must be coupled.

Figure 10:
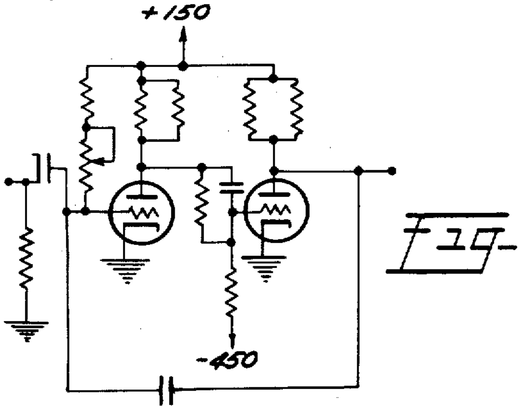

A convenient means for delaying a pulse for a predetermined time is to use it to trigger a delay-multivibrator, or univibrator, circuit such as that shown in Figure 10. If a pulse sufficient to trigger the circuit is applied to the input terminals, the circuit will assume its quasi-stable state, and will remain in that state for a time dependent upon the time constant associated with the input grid circuit; then it will again assume its normal stable state. Therefore, a pulse will appear at the output terminals of the same polarity as the input pulse, but delayed by a time dependent upon the chosen time constant. Such delay circuits are denoted MV in the drawings. A twin-triode type 5687 is satisfactory for this circuit.

Figure 11:
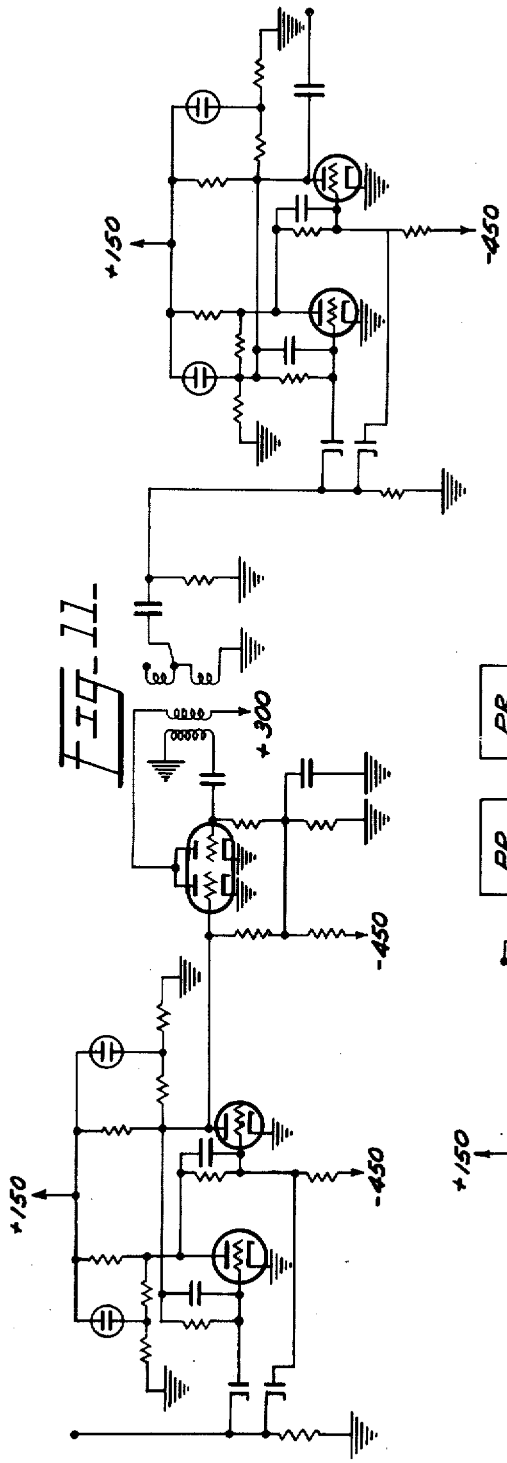

To produce a single output pulse for each four input pulses, a conventional scaling circuit such as is shown in Figure 11 may be employed. Two separate scale-of-two units are coupled through a blocking oscillator, to sharpen the pulses, and four input pulses are required to produce a single pulse at the output. Such binary counting or scaling circuits will be denoted in the drawings by the letters BC. Each scale-of-two may utilize a twin-triode, type 12AT7.

The element shown in Figure 12, denoted Pr in the drawings and hereinafter called simply a "pair," is not shown in the reference above. It may comprise two interconnected amplifier stages 500, 501 having a single input 502 connected to the control grid of one stage, and two outputs 503, 504, one from the anode of each stage. The relative potentials of the two output leads will depend upon the input or signal potential. Thus, if that signal is sufficiently positive, the anode potential of the input tube 500 will fall, driving the grid of tube 501 more negative, and causing the anode potential of the latter to rise; but if the signal drives the grid of tube 500 more negative, the anode potential of the tube will rise and the potential at the anode of tube 501 will fall. This element is conveniently used in connection with diode matrices, since the relative potentials of its outputs may be reversed by the input signal. An input signal potential which drives the input grid more positive and the higher of the two anode potentials will be referred to in the following description, for simplicity, as "high" or "positive" potentials, while a signal potential which drives the input grid more negative and the lower of the two anode potentials will be referred to as "low" or "negative" potentials. Twin-triode type 12AT7 may conveniently be utilized in this circuit.

Figures 12, 13, 15, 16:
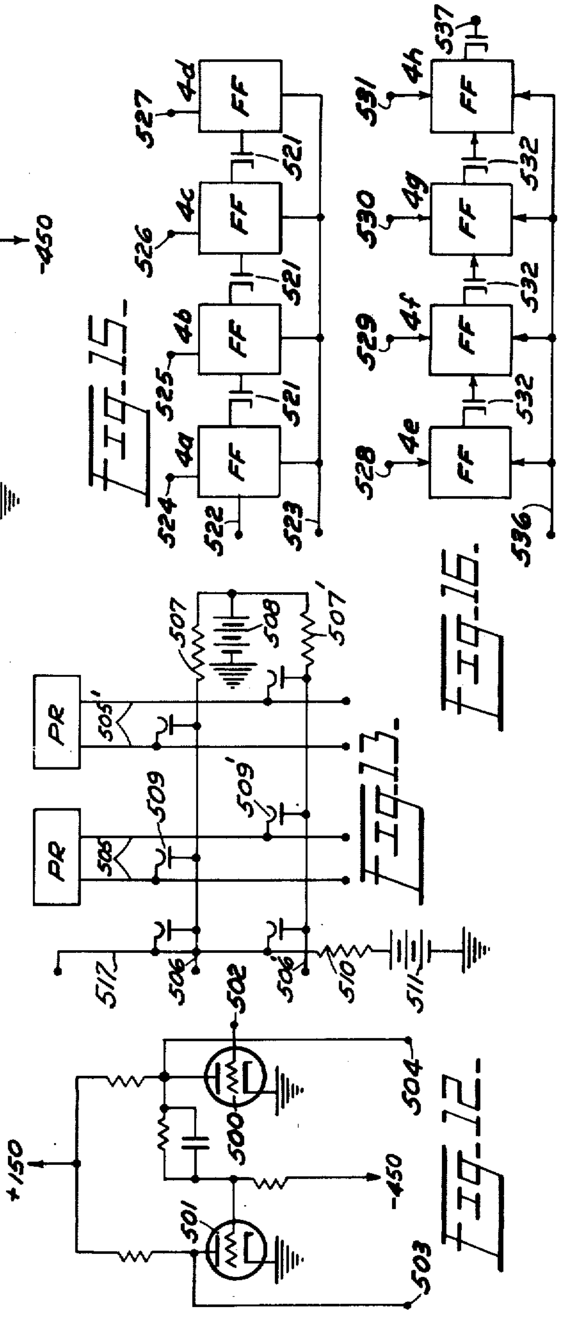

The diode matrix shown in Figure 13, but not described in the reference, is an element useful for comparing a plurality of binary input signals and deriving a binary output signal therefrom indicative of one or more of the inputs. It may comprise a plurality of input leads 505, 505', each of which may operate at one of two possible potentials, denoted the "high" and "low" potentials; output leads 506, 506', each connected through separate resistors 507, 507', to a source of potential 508; and a plurality of diodes 509, 509', each coupling a selected input lead with a selected output lead. The potentials of input leads 505, 505', and source 508 are such that the coupling diodes will conduct a substantial current only when the input lead coupled to the diode cathode is at its "low" potential. The output signal from the matrix may be taken from the voltage drop across the resistor 507 in each output lead. A large voltage drop indicates a large flow of current through the lead, and therefore conduction by one or more of the diodes coupled to that lead, while no voltage drop indicates no diode conduction to or from that lead. If the output lead is connected to the positive terminal of a potential source, current flow through the resistor will make the lead potential "low," while if the lead is connected to the negative source terminal, current flow will raise the lead potential to its "high" value.

An additional lead 517 may be diode-coupled to the two output leads 506, 506', and may be connected through resistor 510 to a source of potential 511, to obtain additional binary ("high" or "low") signals responsive to the potentials existing on any desired combination of the matrix output leads. Type 6AL5 diodes are preferred for the matrix connectors.

Figure 14:
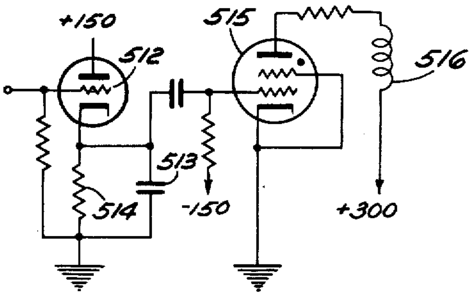

The pulse lengthener circuit, Figure 14, comprises simply a single cathode follower amplifier stage having a long RC time constant in its cathode circuit, which may be coupled to the grid of a thyratron, or gas tube. A sharp positive pulse delivered to the control grid of the cathode follower 512 causes the potential to rise rapidly at the cathode, charging up the shunt capacitor 513. But when the input pulse decays and the grid voltage drops to normal, the cathode potential is held up for the finite time required to discharge the shunt capacitor through the cathode resistor 514. The circuit thereby extends the duration of a sharp pulse long enough to insure reliable triggering of the associated thyratron 515. The thyratron, when conducting, may deliver current through a relay coil 516 to open or close certain relay contacts in the conventional and well-known manner. The amplifier may be one triode section of the 12AT7 twin-triode type, while the thyratron may be type 2D21.

The shift register is a conventional computer element, not described in the above reference, which may take any of several forms. It is a storage or memory device, and is useful to store any number of binary signals, or the algebraic sign of a number. The flip-flop, Figure 4, is particularly adapted for binary storage, since one of its two stable states may indicate a "1" signal, and the other state may indicate a "0" signal. Voltages indicative of the operating state may be taken from any of several points in the circuit, and will be relatively low if the circuit is operating in one state, but relatively high if in the other stable state. Therefore, the potentials of the leads from such points will have a binary character; that is, they may be "high" or "low."

A series input, parallel output register for a 4 binary digit number, is shown in block form in Figure 15. It may comprise four flip-flops **4*a*–4*d* connected in series by diodes 521, and so arranged that the pulse appearing at the anode of the second or output tube of the flip-flop circuit when it shifts from the "1" to the "0" state will trigger the next consecutive circuit from the "0" to the "1" state. In operation, the flip-flops are all initially in the "0" condition. A group of four pulses representing a binary number may be impressed successively on input lead 522 and another group of four "shift" pulses may be impressed successively on line 523** from a polarity selector, shown in Figure 19.

For example, the number "8" is represented by the coded binary number 1011, and is electrically represented by a timed sequence of pulse, no pulse, pulse, and pulse. To store that number in such shift register, a shift pulse first appears in channel 523, resetting all four flip-flops to "0." Very shortly afterwards, a pulse appears in channel 522, and triggers flip-flop **4*a* to its "1" position. Then a second shift pulse enters the flip-flops through channel 523, causing the circuit 4*a* to flip back to its "0" position and sending a pulse through the coupling diode to flip-flop 4*b*, triggering it to the "1" position. Since the second binary digit is "0," no pulse will occur in channel 522 immediately following the second shift pulse, but later a third shift pulse appears in channel 523. That pulse will reset circuit 4*b* to its "0" position, causing a pulse to be coupled to flip-flop 4*c*, triggering it to the "1" position. Then another pulse, representing the third of the four binary digits, will appear in channel 522, triggering circuit 4*a* to the "1" position. A fourth shift pulse will next reset circuit 4*a* and 4*c* to "0," triggering circuits 4*b* and 4*d* to "1." The next positive pulse appearing in channel 522 again triggers circuit 4*a* to "1." It is apparent that the number "1011" has been set up in the register in reverse order, for reading from right to left, the flip-flops are in the respective states representing "1," "0," "1," and "1." A voltage indicative of the stable state of each circuit may be taken from the respective control grids of the second tube of each flip-flop, for example, as indicated by output leads 524—527**. That voltage will be "high" if a "1" is stored in the flip-flop, and "low" if a "0" is stored therein.

A binary number may be represented not only by a series of timed pulses but also by a group of relatively "high" or "low" potentials. A register designed to receive and store numbers thus represented is shown in Figure 16. The number is determined by the relative potentials on the input leads 528—531 which communicate respectively with the control grid of a tube in the corresponding flip-flop. The potentials on the leads are such that they will determine the stable state which flip-flops **4*e*—4*h* will assume. After the input potentials are applied, four shift pulses occur in channel 536**, shifting the binary digits successively out of the register, one digit at a time, and setting it up to receive the next number.

For example, suppose the input leads 528—531 are driven respectively high, low, high, and low. The flip-flops will assume corresponding stable states of "1," "0," "1," and "0," respectively. The first shift pulse in channel 536 resets circuits **4*e* and 4*g* from "1" to "0," causing pulses to be coupled to circuits 4*f*, 4*h*, triggering them to the "1" state. But since circuit 4*h* previously was in the "0" state, no pulse was coupled to output channel 537. The second shift pulse resets circuits 4*f* and 4*h* to "0," triggering circuit 4*g* to the "1" state, and producing a pulse at the output 537. The third shift pulse steps the "1" to flip-flop 4*h* and produces no pulse at the output, while the fourth shift pulse produces a pulse at the output and completely clears the register, so that it reads "0000." Thus, the binary signals appearing at the input channels 528—531 have been transferred, in reverse order, to output channel 537** in the form of a series of timed pulses.

Such circuits are, of course, not limited to four flip-flop stages, but any desired number may be employed, depending on the number of binary digits to be stored. It may be desirable to couple the successive flip-flops through pulse-sharpening blocking tube oscillators such as those described in connection with Figure 5, rather than directly through diodes 532, in which case the output pulse produced as the flip-flop circuit assumes its "0" position may be utilized to trigger the oscillator, which will in turn trigger the next successive flip-flop.

The present computer is designed to utilize single magnetic heads for both reading and recording of the number and instruction signals. However, there is a great difference in amplitude between the 300 volt recording pulses delivered to the magnetic heads, and the 30 millivolt sinusoidal output produced when the heads read the recorded signal, so that a single conventional electronic amplifier cannot be utilized with the system. If a conventional RC coupled amplifier were made sensitive to the small recorded signals, then the large amplitude recording pulses, which may be 100 M sec. wide, would completely block the system for longer than the maximum dead time allowable with the present computer, because of the finite time required for the coupling capacitor to charge and discharge as the plate voltage of the preceding tube rises and falls. A direct coupled amplifier would not block, but would drift excessively. Both conventional amplifier types produce an output signal of a magnitude proportional to the input signal. However, it is necessary that the present circuit produce an output of substantially the same magnitude for both the largest and smallest input signals, in order to properly operate a following "gate" circuit.

Figure 17:
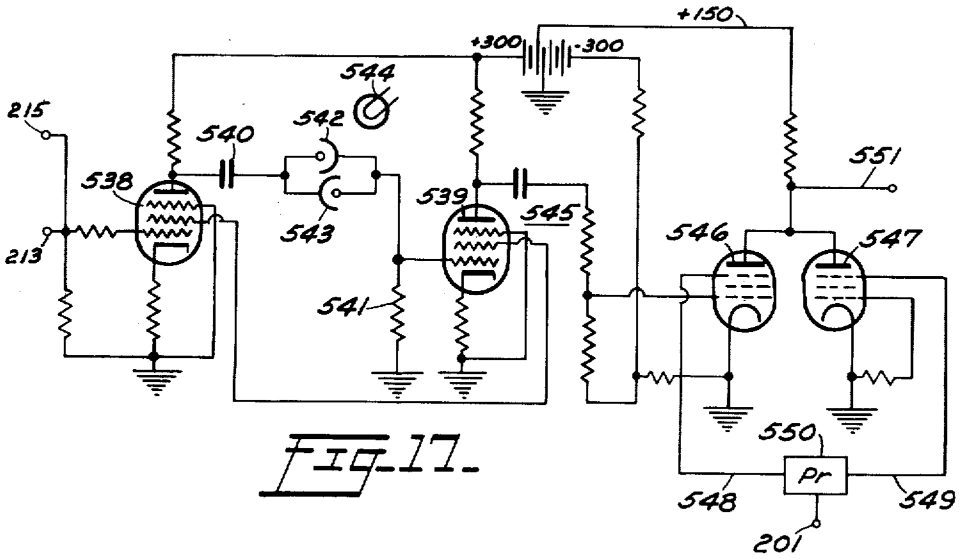

To overcome the disadvantages of known electronic amplifier circuits, the system illustrated schematically in Figure 17 was developed.

Two pentodes 538, 539, are coupled by the capacitor 540, resistor 541, and a pair of vacuum phototubes 542, 543 connected back to back. The tubes are both subjected to light from a substantially constant intensity source such as bulb 544, energized from a 110 volt A. C. line. The vacuum type phototubes have a virtually flat anode current-anode voltage characteristic for a given light intensity. In operation, if a recording square wave or pulse of +300 volts is impressed on input 213, the voltage across tube 538 will drop from 300 to about 50 volts, and capacitor 540 will begin to discharge. But no more electrons may flow away through conducting phototube 543 than the saturation current of about 5 ma., so the drop across resistor 541 which furnishes the input signal to tube 539, is limited to about 5 volts. At the end of the square wave, the voltage across tube 538 will rise rapidly to 300 volts causing condenser 540 to charge up through phototube 542 and resistor 541, but again the charging current is limited.

If a +30 millivolt sine wave, the recorded number signal, is applied to input 213, the plate voltage of tube 538 will vary only about ±4 volts. Yet, because of their flat current-voltage characteristics, the phototubes will still conduct substantially 4 ma. for the 4 volt difference of potential, causing a drop across resistor 541 of about 4 volts, which is substantially the same as the signal produced by the 250 volt change in voltage across the coupling capacitor. Therefore, the output signals from tube 539 will be very nearly of equal magnitude, irrespective of the size of the input signal impressed upon the circuit. The output signal from that tube may be taken through a differentiating network 545 to produce sharp input pulses for the following pair operated gate network. That network may comprise two interconnected pentode gate tubes 546, 547, controlled by gating input lines 548, 549 from pair 550. The recorder unit, Figure 33, furnishes a "high" voltage input signal to the pair 550 during each recording operation through channel 201, making line 548 go "low," cutting off tube 546 and blocking the pulse from the network 545. When the computer is not recording, however, the signal in channel 201 is "low," making line 548 "high," unblocking gate tube 546, so that pulses from the network 545 will produce corresponding pulses at the output 551.

The signals thus produced at output 551 will be, because of the differentiation in network 545, two pulses of opposite polarity, whether the input signal is one complete sinusoidal wave of 360 degrees read from the tape into channel 213 or a large square wave from the recorder unit incident on channel 215.

The preferred type tubes for this circuit are: tubes 538, 539 type 5693; tubes 546, 547—type 6AS6; tube 550—type 5687; tubes 542, 543—type 929.

Figure 18:
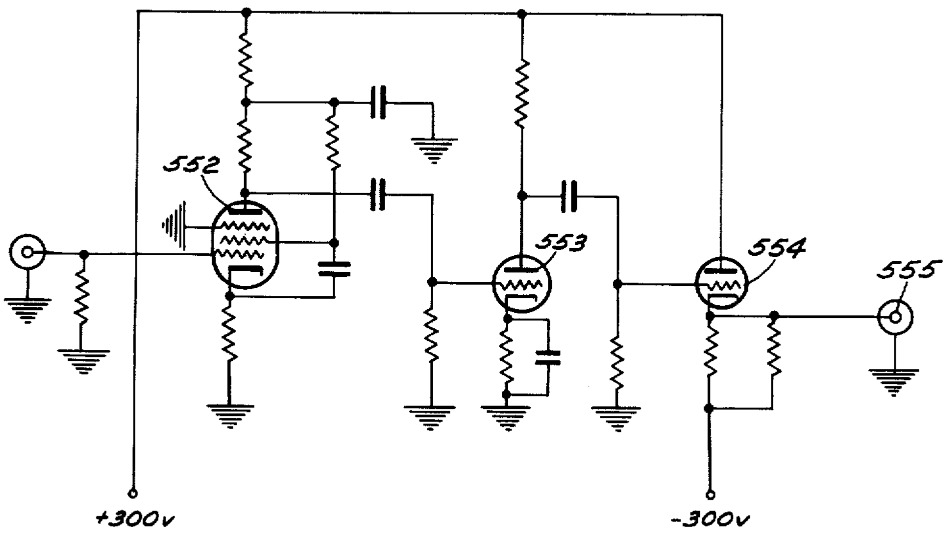

The signals read from the long tape by recording heads 274—278 and the timing mark signals on the short tape, read by head 220, sinusoidal signals of the order of 30 millivolts, may be amplified and differentiated by five identical conventional RC coupled voltage pre-amplifiers, a preferred embodiment of one of which is shown in Figure 18. Since the operation of such pre-amplifiers is well known, no detailed description thereof will be given. The signals taken from the output 555 should be pulses of the order of 30 volts. Tube 552 may be type 5693, while tubes 553, 554 may be the two triode sections of a 5692 type tube.

Figure 19:
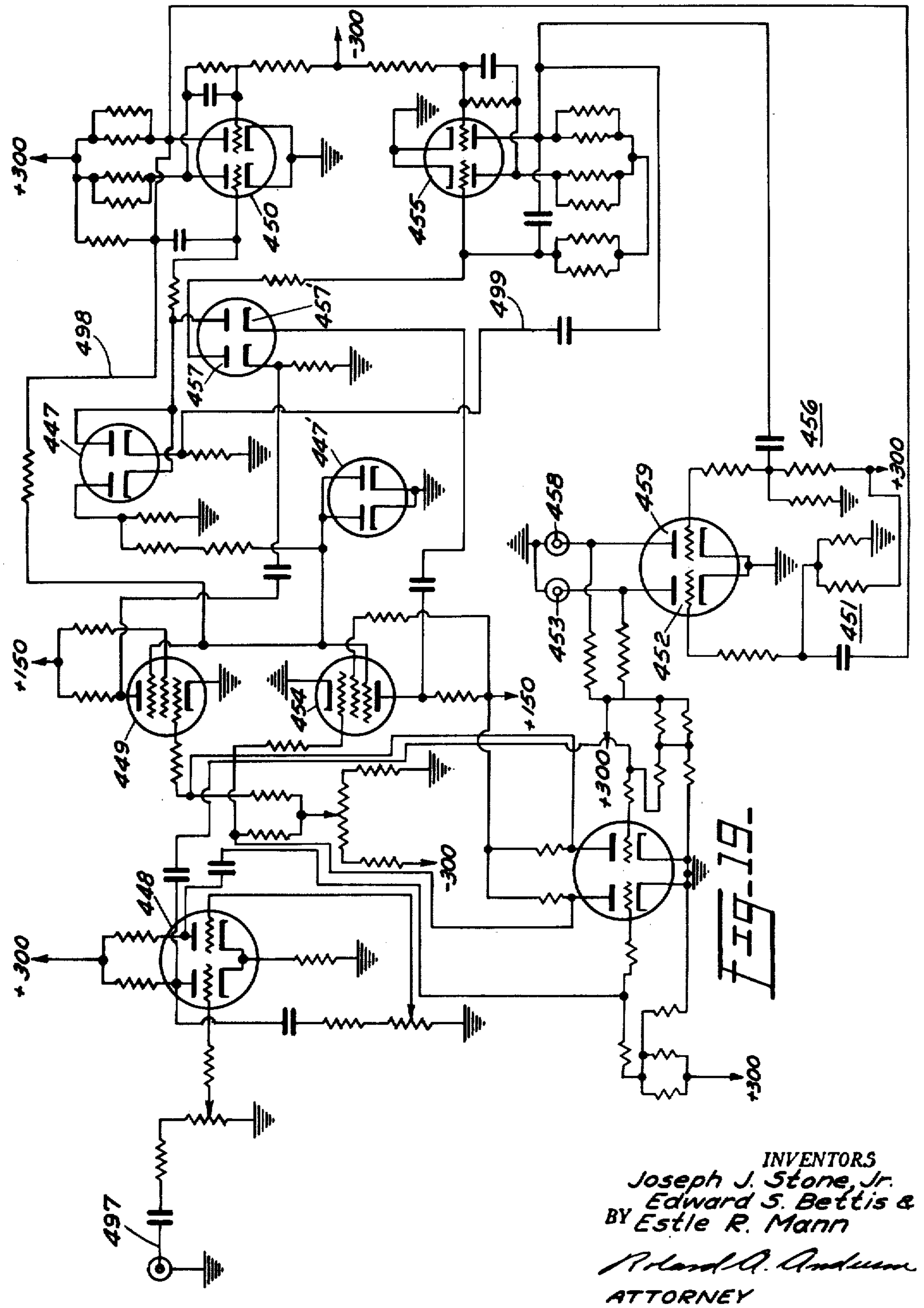

The polarity selector, Figure 19, has been designed to receive input signals comprising an electrical pulse of one polarity followed by a pulse of the opposite polarity, and to produce a pulse at one of two output terminals for each discrete input signal and pulse at the other output terminal for each input signal wherein a positive pulse is followed by a negative pulse. The outputs thus are at one terminal a pulse for each input group of two voltage excursions and, at another terminal, a pulse only for each "1" signal received from the amplifiers. Several identical units are utilized in the computer, one of which will be described in detail.

Referring now to the drawing, the input signals are applied through a gain control to the control grid of one section of a phase inverter 448. Output signals may be taken from the two anodes of the inverter, a positive signal from one anode, and a negative signal from the other, due to the cathode coupling between sections. The signals are amplified and inverted in stages 495, 496. If the input signal to channel 497 is a sine wave first going positive, which signifies a "1," a positive pulse is first delivered to the control grid of open gate 449. That tube produces a negative pulse which trips delay-multivibrator 455 through diode 457, sending a negative pulse along line 499 to trip delay-multivibrator 450 and producing a sharp pulse across differentiating network 451. The latter pulse may be further amplified in amplifier 452, the anode of which is coupled to the output 453. Since both delay-multivibrators 450, 455 are tripped by an input "1" signal, comprising a positive pulse followed by a negative pulse, it is evident that both outputs 453, 458 will contain a pulse when a "1" signal is received at the input 497.

If a "0" signal is incident on input 497, a positive pulse from the phase inverter 448 is impressed on the control grid of gate 454, which controls the input to delay-multivibrator 450. The pulse may pass through the open gate, producing a negative pulse which is coupled through diode 457' to trigger the delay-multivibrator. This action produces a square wave output which is differentiated by network 456, amplified in conventional amplifier 459 and delivered to the output 458. The square wave from delay-multivibrator 450 is coupled back along line 498 to the suppressor grids of gates 449, 454 and closes those gates for a time sufficient to block the remainder of the input signal, so that the positive pulse which follows the negative pulse for a "0" signal cannot get through to the gates to produce an output pulse. Since multivibrator 455 cannot be tripped, it is apparent that a "0" signal produces an output pulse only in channel 458.

The diodes employed are preferably type 6AL5, while the gate tubes 449, 454 are preferably type 6AS6, the phase inverter 448 is preferably a type 12AU7, and the remaining tubes of the circuit may be of the type 12AT7.

The four distribution gates to the short tape shift registers serve to gate into the shift registers either the numbers stored in the temporary storage registers **16*a*—16*d* or those from the polarity selectors 19*a*—19*d*, depending upon the signal received from the control unit 23. As may be seen in Figure 20, the control signal in channel 151 from cycling unit 24 determines the polarity of the output leads from pair 644, which are coupled through followers 645, 646, to output gating lines 647, 648. Diode clamps 649** in each output channel prevent the potentials in these channels from going above ground, so that the suppressor grids in the gate tubes connected thereto will not draw excessive grid current. The diodes are preferably type 6AL5.

Figure 21 illustrates in block form one of the four identical distribution gate units **21*a*–21*d*; for example, unit 21*a*. Gating lines 647, 648 control the operation of gates 650—653 as follows: if line 647 is "low," gates 651, 652 are closed, blocking both the number and shift pulses from channels 453, 458 of the associated one of the polarity selectors 19*a*—19*d*, Figure 19; but if line 648 is "low," gates 650, 653 are closed, blocking the number pulses from the associated one of temporary storage registers 16 in channel 213, and the "shift" pulses in channel 83 from record unit 33. The latter number pulses may be sharpened in blocking oscillator 216 before they are applied to the gate 650. The outputs of gates 650 and 651 are coupled through one winding of a pulse transformer common to the anode circuits of both gate tubes. The outputs of gates 652, 653 are similarly coupled, so that the number output pulses selected will appear in channel 654, while the shift pulses will appear in channel 655**.

Figure 22:
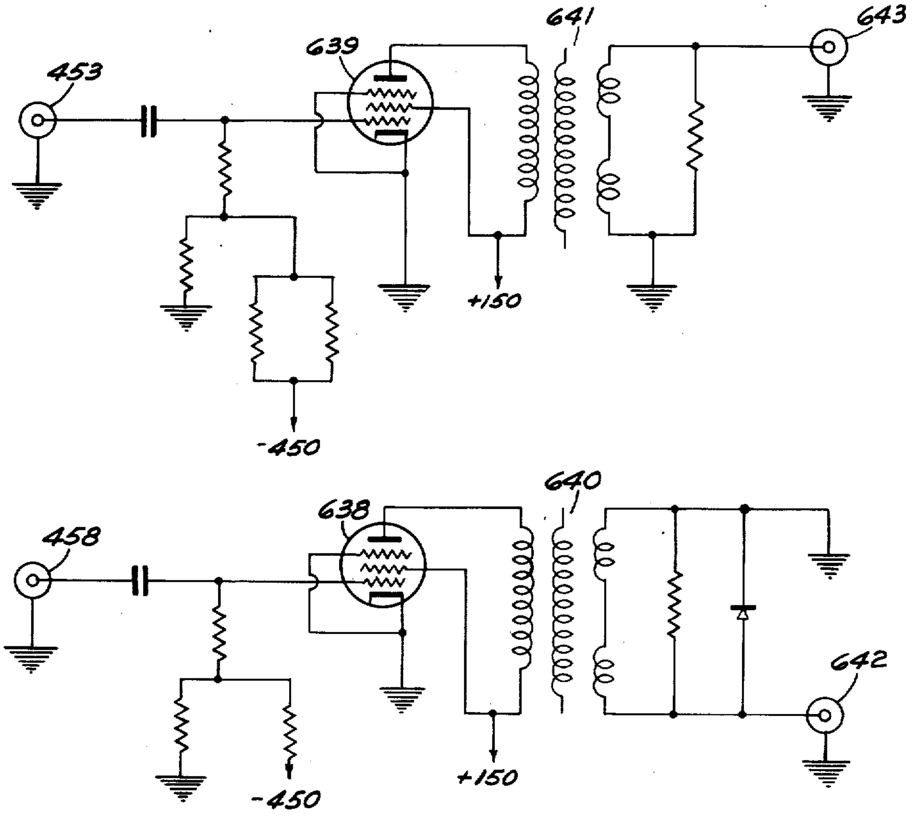

The five identical shift register drivers, one of which is illustrated in Figure 22, strengthen and sharpen the pulses from the outputs of polarity selectors **19*f*—19*j* so the pulses can effectively operate the following shift registers 15*e*—15*h*. They may comprise simply two pulse amplifier stages 638 and 639, respectively, connected to the mixed output channel 458 and the unmixed output channel 453 from a polarity selector, Figure 19. The outputs of the amplifier stages may be taken through pulse transformers 640 and 641, in the conventional manner, and delivered to output channels 642 and 643**. The tubes are preferably type 6AS6; the transformers may be the Dumont pulse transformer, mentioned above.

The control unit directs the operation of the entire computing cycle of the machine. From instruction signals recorded on the long tape, it controls the multiplication, addition, or subtraction called for, directs the distribution of the resulting numbers into the proper columns of the accumulator, automatically causes the recording of a new value of each unknown over the old value on the tape, directs the machine to print that new value if desired, and resets itself to receive the next set of instructions.

Figure 23:
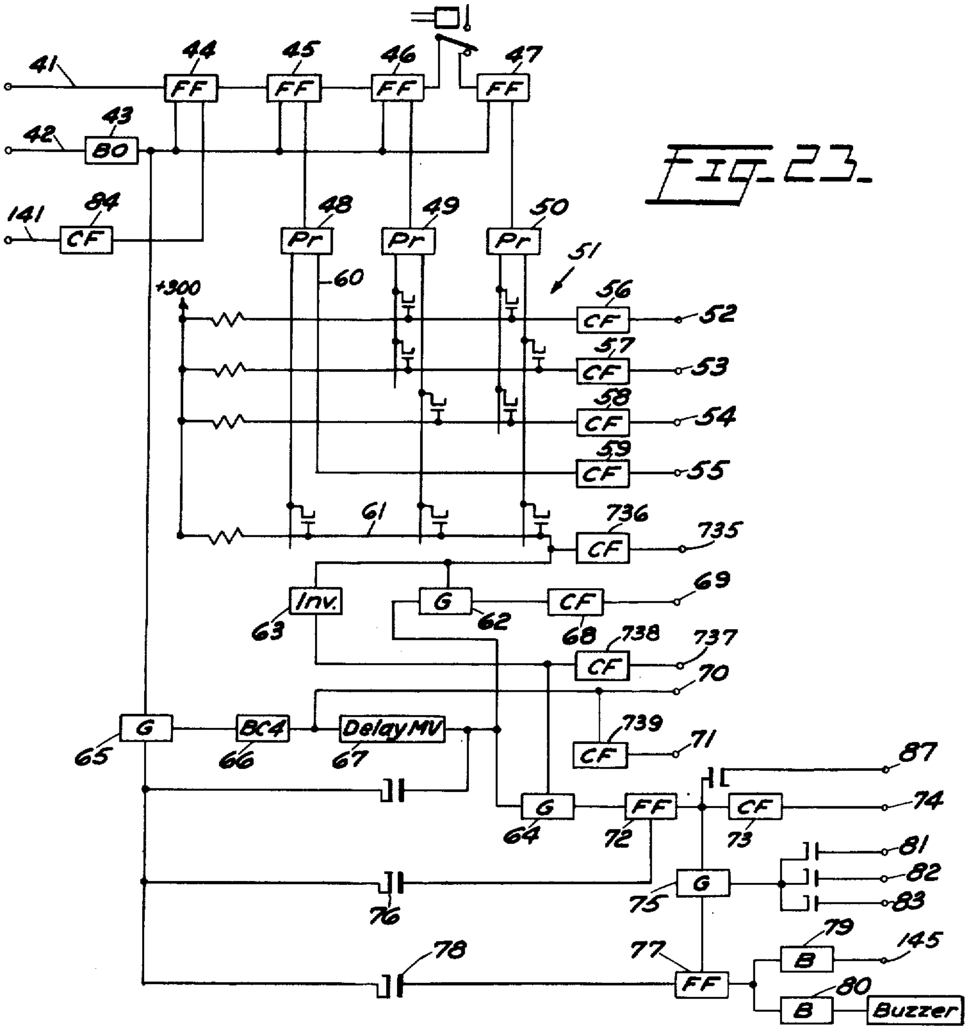

Referring now to Figure 23, the coded instruction pulses and the four shift pulse signals from a polarity selector, Figure 18, are applied to channels 41, 42, respectively of a series-fed shift register. The shift pulses may be sharpened and strengthened by blocking oscillator 43, and the oscillator output pulses are coupled to the flip-flop circuits 44—47 in the shift register so as to reset each circuit to a predetermined stable or "0" state.

In a manner fully described in connection with Figure 15, the four consecutive instruction signals will be set up, in inverse order, in the four flip-flop circuits. An output voltage is taken from each of the circuits 45—47 to indicate by its magnitude the condition of these circuits, and the outputs are fed to pairs 48, 49, 50, respectively. These pairs each have two output connections, and the relative potential of the two alternates, depending on the input signal from the flip-flop, as is described fully supra, in connection with Figure 12. Diodes are connected to the pair output lines as illustrated to form a diode matrix 51. The potentials at the inputs to followers 56—59 depend upon the relative polarities of the pair output lines, and hence indicate the signals stored in flip-flops 45—47. Only one of the normally non-conducting followers 56—58 may be made conducting by the matrix at one time, so a positive potential will appear in only one of the outputs 52—54. A positive potential may also appear at output 55, because follower 59 is connected directly to pair output line 60. That positive potential is coupled to a comparator circuit 25, for comparison with the sign of the number recorded on the short tape. If a positive potential appears at output 52, multiplication of the number read from the short tape by that read from the long tape is directed; if at output 53, multiplication of the long tape number by 1; while if at output 54, multiplication of the long tape number by a predetermined constant K is ordered.

The signal potential on matrix line 61 controls the opening of gate circuit 62, passes through inverter 63, and controls in like manner gate circuit 64. Because of the polarity inversion, only one of the two gates may be open at any time.

Each pulse from oscillator 43 may pass through gate circuit 65 to a binary scale-of-four 66, which delivers one output pulse for each four input shift pulses it receives. The output pulse from the scaling circuit appears in channel 70 as a cycling pulse, and may also be coupled through a follower circuit 71 to an oscilloscope, for checking purposes. The scale-of-four output pulse is also coupled to delay-multivibrator 67, the output of which is applied to gates 62, 64. If the former gate is open, follower 68 will be energized, and a pulse will appear at the "transfer" output 69. If the latter gate is open, compute flip-flop 72 will be triggered, raising the potential of the "add gate" channel 74 through follower 73, and applying a positive signal to gate 75 and a negative signal to diode 76. If the multivibrator 67 is still in its triggered condition, or if the compute flip-flop 72 is tripped, the negative signal coupled through diode 76 blocks gate 65, so that shift pulses do not enter scaler 66.

To prevent operation when the computer is not properly synchronized, gate 75 is opened only by the "high" D. C. computing signal from flip-flop 72. The synchronizing pulses come from the mixed pulse output of polarity selectors 19*e* and 19*i* and record unit 33. The synchronizer flip-flop 77 is tripped only by passage of the synchronizing pulses through gate 75, and when tripped, actuates three circuits: a negative voltage is coupled through diode 78 to block gate 65; buffer 79 is turned on, blocking gate 147 in the cycling unit, Figure 24, which blocks the record flip-flop 148 in that unit and prevents the machine from recording; and turns on buffer 80, energizing a relay to sound a warning buzzer. Thus, both blocking of any recording of erroneous information and warning of delivery of spurious pulses to the adder circuit is accomplished.

If a "1" is stored in flip-flop 44, indicating a "record" instruction, follower 84 will be rendered conducting and a positive voltage signal will appear in channel 141. This signal opens record gate circuit 142 in the cycling unit, Figure 24, and opens print gate circuits 7*a*—7*d*, Figure 1.

Figure 24:
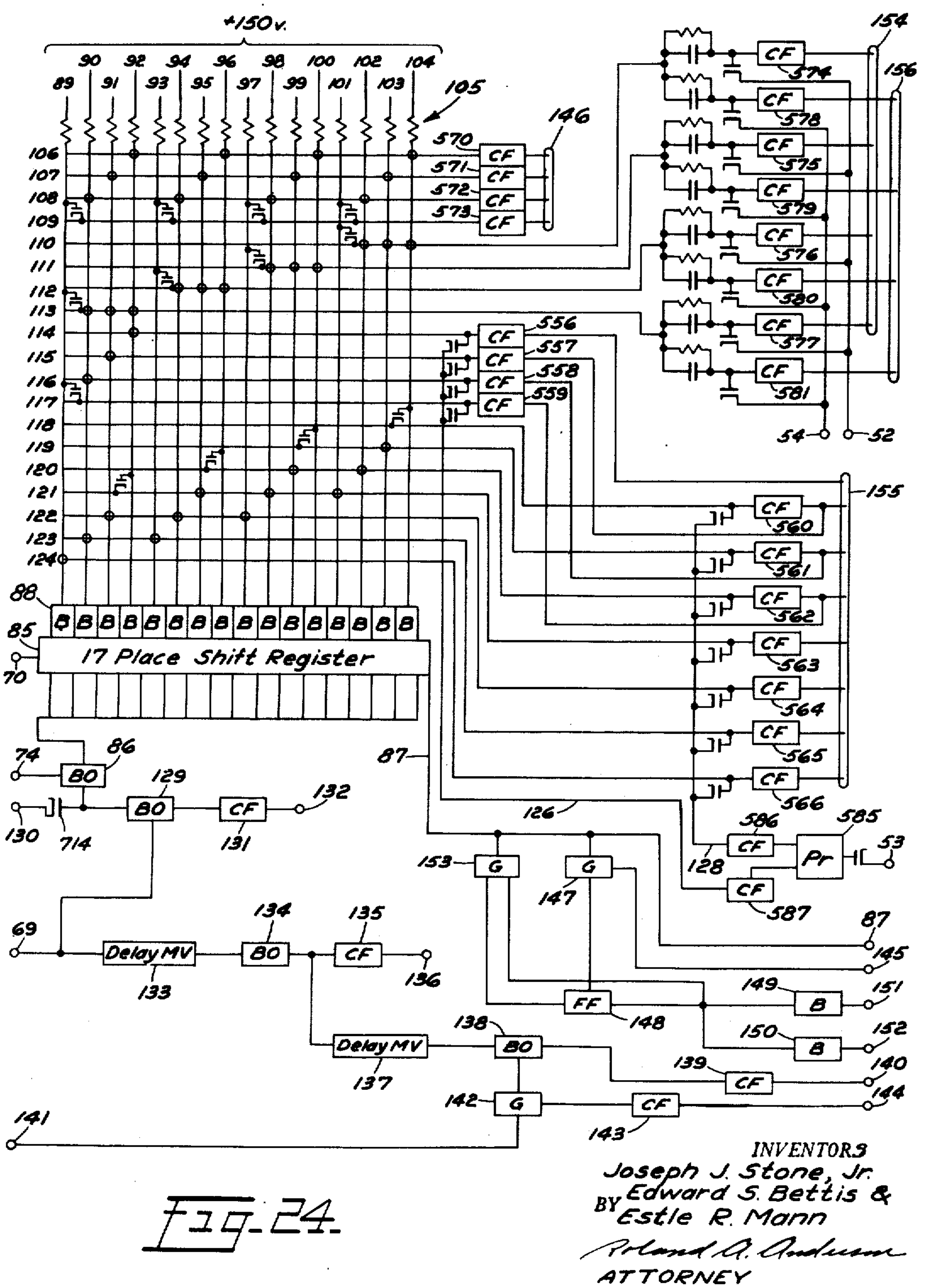

Referring now to Figure 24, the cycling pulse from channel 70, Figure 23, is fed to a seventeen place series-fed shift register 85, and, slightly later, the "add gate" pulse from channel 74 triggers blocking oscillator 86. That oscillator generates a train of pulses, each of which is utilized to simultaneously reset each stage of shift register 85, thereby effectively stepping the cycling pulse through each successive stage of the register and out to channel 87. Channel 87 is connected back to the "compute" flip-flop 72, Figure 23, so that a pulse in that channel will reset the flip-flop 72 to "0." Such reset action turns off follower 73, lowering the potential in channel 74, and blocking the oscillator 86.

Respective buffer tubes 88 are connected to each of the last 16 flip-flops or stages of shift register 85. The anode of each buffer tube is connected to a load resistor and a source of +150 volts through anode leads 89—104, which are also connected in a diode matrix 105. Each anode lead is diode-connected to one horizontal line in three of the four groups of horizontal lines, except leads 89—92, which are each connected to one line in all four groups. The diodes are connected anode to the vertical leads and cathode to the horizontal leads, as shown. For clarity, only one diode in each group is shown, the others being indicated by the small circles at the intersections of the connected lines. As the cycling pulse is stepped through the 17 stages of the register 85, the buffer tube 88 connected to the particular stage containing the pulse is cut off, and the anode lead from that tube rises in potential to +150 volts. Due to that rise, current flows through the diode connections from that lead, and the connected horizontal line in each of the three groups drops in potential; for example, if the potential of vertical line 89 rises, that of horizontal lines 190, 113, 117 and 124 will rise, due to increased voltage drop across the biasing resistors of the connected cathode followers. The horizontal lines operate as gating devices. Line 109 selects the least significant digit of the number stored in the long tape shift register 15*h* through follower 573 and cable 146; line 113 selects the least significant digit of the number stored in short tape shift register 152 or set on board 840 through selected follower 577 or 581 and associated cable 154 or 156; and line 124 or line 117, depending on the input from the "times 1" channel 53, selects the proper adder-accumulator where the product of the two numbers is to be placed through follower 566 or 562 and cable 155. It may be seen that as the potentials of lines 89—104 are raised consecutively, the four digits of the number stored in the shift registers 15*e*—15*h* and those of another selected number are gated in proper order into the multiplier circuit, and their product is gated into the proper column of the adder-accumulators 32 for completing the computing step called for.

Gating lines 106—109 are coupled to the respective grids of cathode followers 570—573, while the grids are returned to a negative potential through biasing resistors, not shown. As each anode lead 89—104 assumes a high potential, one of the four gating lines also goes high, increasing the conduction of the connected follower, causing a higher voltage to appear at the respective follower output. The four output leads are illustrated as a cable 146 connected to the shift registers 15*e*—15*h*.

Gating lines 110—113 are each coupled through separate RC decoupling networks to two cathode followers: one from the group designated 574—577, and one from the group designated 578—581. An "X" instruction raises the potential in channel 52, effectively unclamping the grids of each of the former group, while a "K" instruction in channel 54 in like manner effectively unclamps the grids of each of the latter group, allowing the tubes to conduct upon receipt of a positive signal. Therefore, depending upon the instruction, each of the followers in one of the two groups will be turned on four consecutive times by the gating lines 89—104, and four high or gating signals will appear in the corresponding follower output channels. These channels are illustrated as cable 154 for the followers 574—577, and cable 156 for the followers 578—581.

Gating lines 114—124 are connected to the grids of cathode followers 556—566, respectively. The cathodes of followers 557 and 560, 558 and 561, and 559 and 562 are connected together, so that if either of the two followers is turned on, the associated output line will receive a high or gating signal. Diode clamps are coupled to the grids of each of the followers 556—559 through channel 126, and to each of followers 560—566 through channel 128, holding the followers below cut off. However, a "1" instruction in channel 53 raises the potential in that channel, charging the state of pair 585, making follower 587 conduct, driving line 126 "high," allowing the connected followers to conduct when its respective gating line goes "high." In the absence of a "1" instruction signal in channel 53, follower 586 conducts, so line 128 is "high" and line 126 is "low," allowing the associated followers 560—566 to conduct on receipt of a gating signal.

One of the eight output gating lines, shown as cable 155, goes to each of the eight distribution gates 30 to control the distribution of the numbers from the multiplier into the proper column of the adder-accumulators 32*a*—32*h*.

Each pulse from oscillator 86 is also connected to trip another oscillator 129, if that circuit is not blocked by the occurrence of a negative voltage signal in channel 130 from the check matrix. Each pulse from oscillator 129 is coupled through follower 131 to channel 132, where it appears as a positive "add" pulse. Occurrence of a "transfer" pulse in channel 69 will trigger oscillator 129, producing a single "add" pulse.

Figure 31:
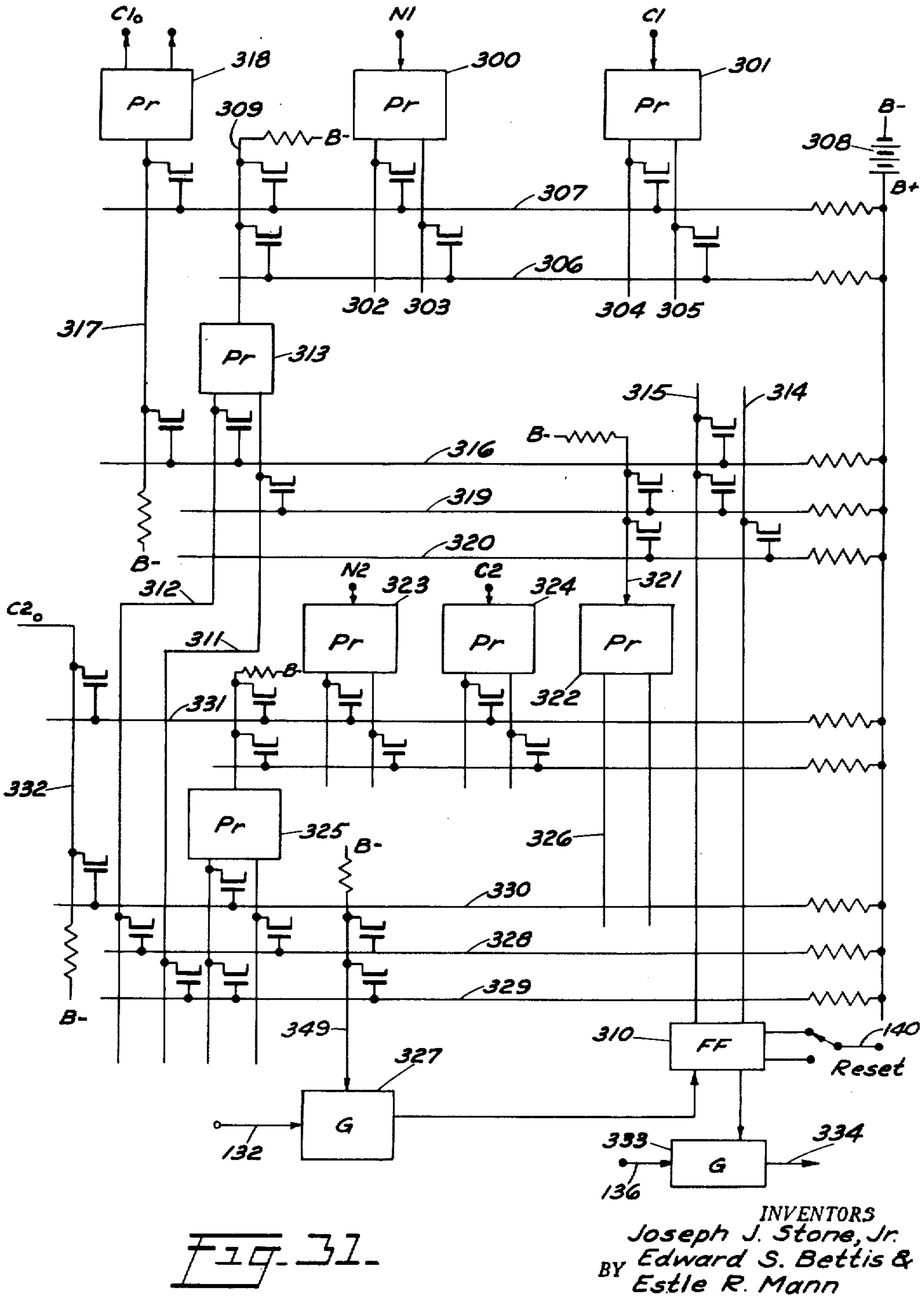

The transfer signal in channel 69 is also delayed in delay-multivibrator 133 and used to trigger oscillator 134. The pulse from this oscillator is coupled through follower 135 and channel 136 to each adder-accumulator, as is shown in Figure 31. The pulse from the oscillator may be further delayed in delay-multivibrator 137, amplified and sharpened in oscillator 138, and coupled through follower 139 and channel 140 to reset the accumulator to the proper position. A "record" pulse from channel 141, Figure 23, will open gate 142, allowing the pulse from oscillator 138 to pass through to follower 143 and to appear in channel 144, which connects to the relay timing circuit, Figure 36.

If a signal is transmitted from the control unit 23 in the "record" channel 145, gate 147 will be open, so that when the cycling pulse reaches channel 187, it will trigger flip-flop circuit 148. The output of that circuit is coupled through impedance buffer stage 149 and channel 151 to block the amplifiers for the short tape signals, Figures 17*a*–17*d*, and through buffer 150 and channel 152 to open gate 195 in the record unit, Figure 33. The signal also opens gate 153, allowing the next signal in channel 87 to pass through that gate and to reset flip-flop 148 to its normal operating state.

Figure 25:
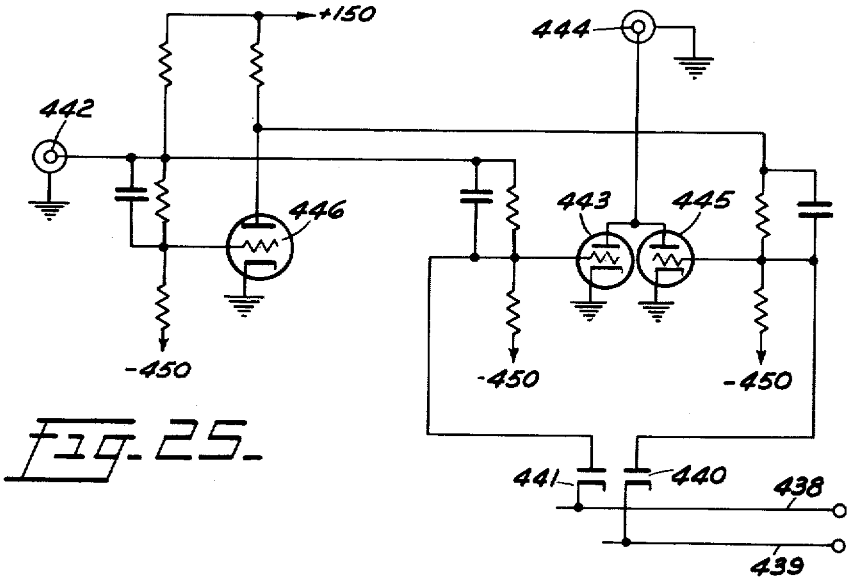

A negative number is stored, recorded, and printed by the computer in the form of its complement with respect to nine; for example, the decimal number —.4897 would be treated as .9999 —.4897, or —.5102. This method of handling negative numbers makes for a great saving in the number of components needed for addition, subtraction, and multiplication operations, but requires a special unit to complement the number and to preserve its sign. This complementing unit, illustrated in Figure 25, may comprise four identical channels, one for each digit in the decimal number. Its purpose is to reverse the polarity of each binary digit voltage, for the complement of a binary "high" voltage is a "low" voltage. In operation, the stored number may be transferred out of the short tape shift registers 16*a*—15*d*, one decimal digit at a time, by the successive gating pulses from cable 156 in the cycling unit. The number will be complemented, if its sign is negative, before it is passed to the multiplier circuits. Four identical complementers are required, one of which is illustrated in Figure 25.

Figures 35, 38:
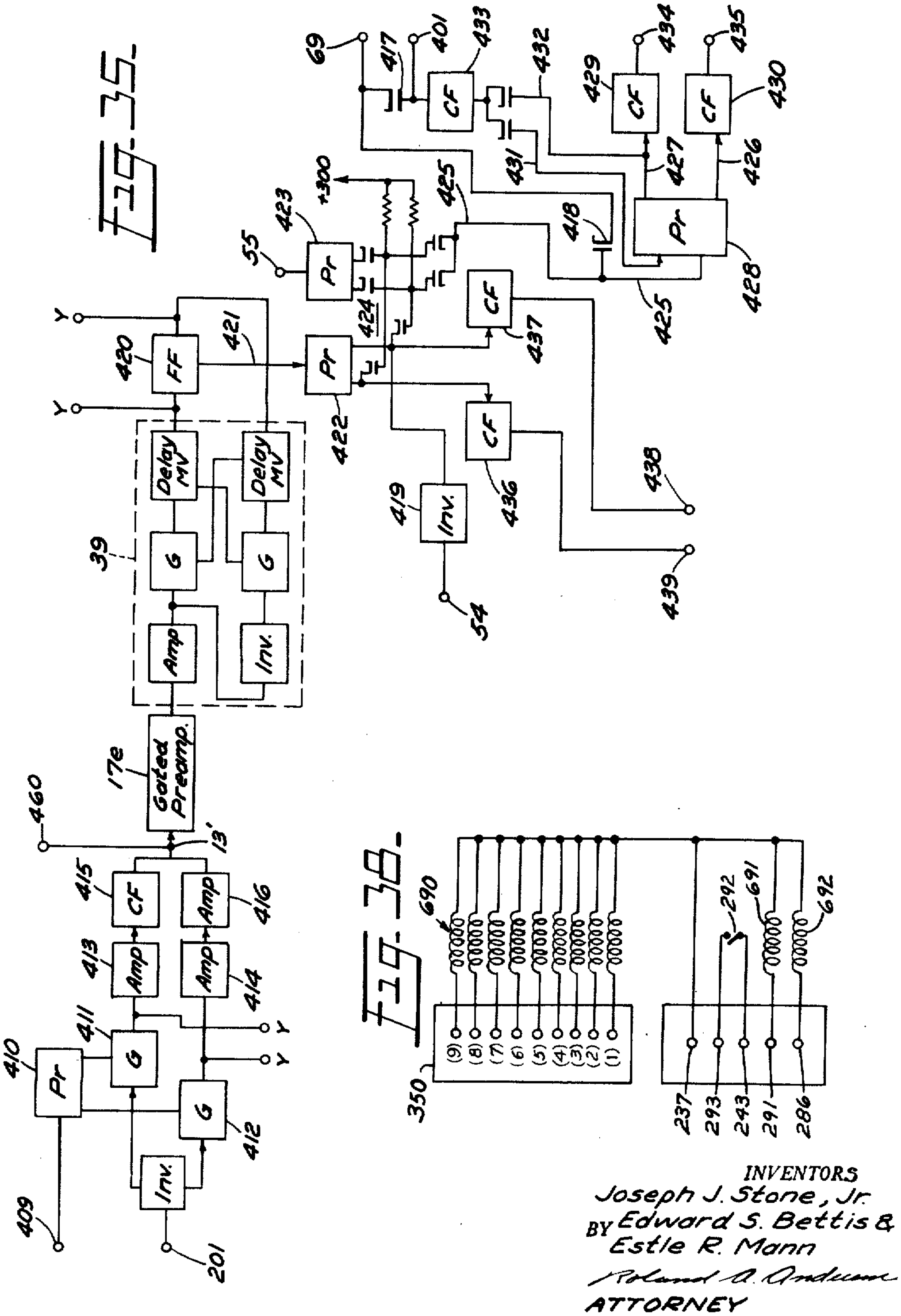

If gating lead 439 from the comparator circuit, Figure 35, is high, clamp 440 holds tube 445 below cut-off, while when line 438 assumes its higher potential, clamp 441 holds tube 443 below cut-off. If a "0" signal appears in sign channel 13′, indicating a negative short tape number, line 438 will be high, and line 439 will be low. If channel 442 receives a positive pulse, indicating a "1" as the most significant digit in the short tape shift register 15*a*, the pulse is coupled to the grid of non-conducting tube 443, rendering it conductive, and causing the potential in channel 444 to fall to a lower value. The input pulse is also inverted in a single amplification stage 446 and coupled to the grid of normally non-conducting tube 445, driving that tube further below cut-off. If instead a negative pulse, indicating a zero, appears in channel 442, it will not affect tube 443, which is normally not conducting. However, when inverted by stage 446 and coupled to the grid of tube 445, the pulse would render that tube conductive but for the action of diode clamp 440. Since line 439 is "low" for a minus number, the diode 440 will clamp the grid potential of tube 445 to the low potential of that line, a positive pulse will not turn on tube 445, and the potential in channel 444 will remain high, indicating a "1" output.

But if line 439 is "high" and line 438 is "low," indicating a positive short tape number, then the pulses incident on channel 442 will pass through the complementer unchanged, since clamp 441 will keep tube 443 cut off even though a positive pulse be impressed on its grid, and the inverter 446 and tube 445 will together preserve the polarity of the input signal as it passes through them to the output 444.

Figure 26:
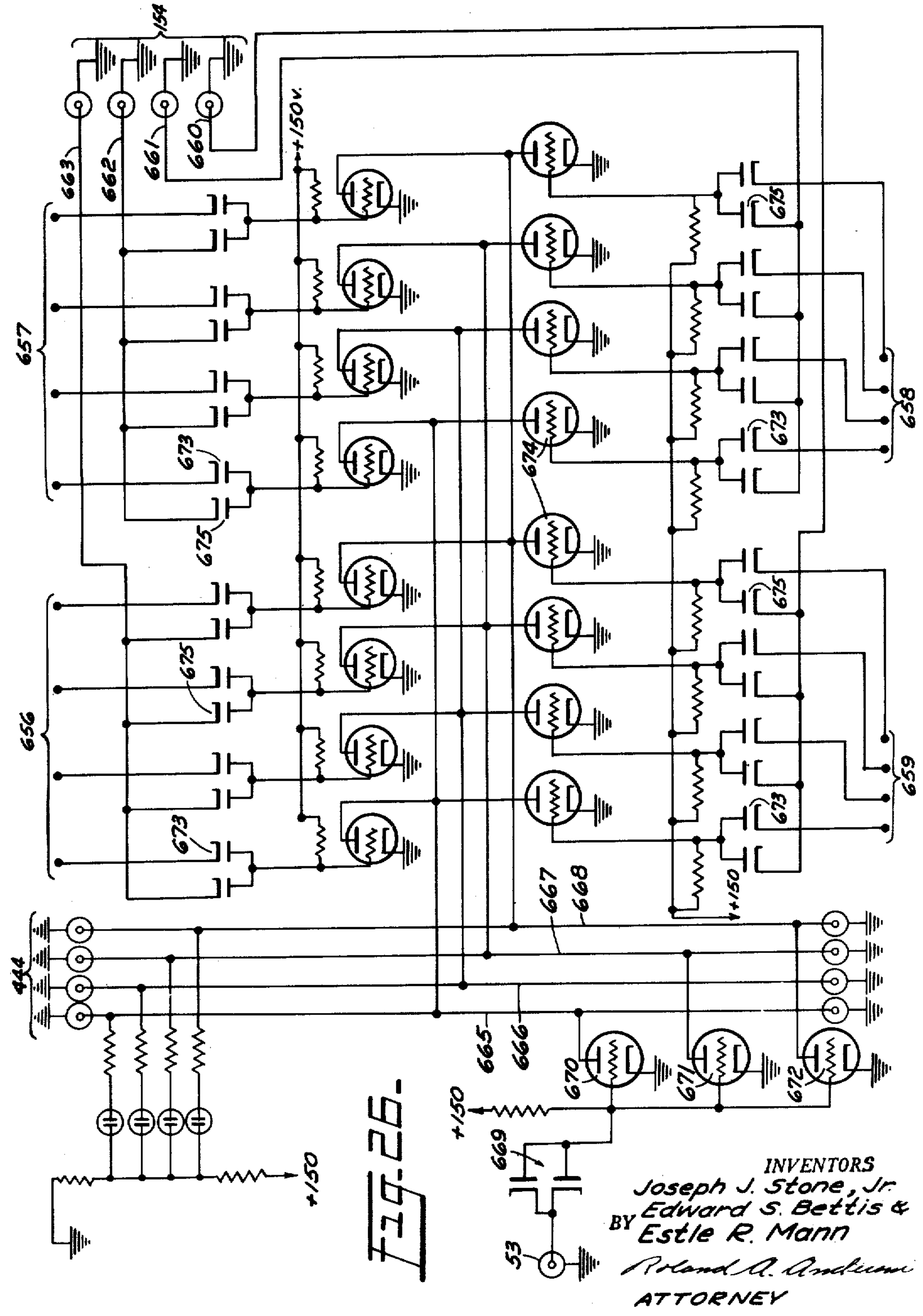

The computer may select either the number stored in the short tape shift registers, 15*a*—15*d*, unity, or a predetermined constant number from the number board 840, to multiply with the number from the long tape shift registers 15*e*—15*h*. The multiplier distribution gates, shown in Figure 26, perform the selection.

The constant is selected at the number board 840, Figure 1, by punching the four appropriate keys, one in each column. As is described in connection with the keyboard 3, the selected key in each column sets up four output "high" or "low" potentials. These potentials represent the complement of the coded binary form of the number indicated on the key, rather than the number itself. The four potentials representing the inverse or complement of the most significant decimal digit are set up in the four input channels indicated on Figure 26 by the numerals 656; those representing the second most significant digit are set up in the channels 657; those representing the third most significant digit are set up in the channels 658; and those representing the least significant digit are set up in channels 659.

Each input channel is coupled through one of the diodes numbered 673, illustrated to the right of accompanying diodes 675 to the grid of an amplifier 674. If a channel is "low," the respective coupling diode conducts, lowering the grid potential of the associated amplifier 674 below cut-off. If, however, a channel is "high," no current will flow through the associated diode 673, and the grid of the connected amplifier 674 will remain above cut-off, unless current flows through the accompanying diode 675 connected to that amplifier. Four gating lines 660–663 control the conduction through the respective left diodes 675 to which they are coupled, allowing current to flow only if a gating line is "low."

If the constant number is to be selected, as indicated by a "K" instruction, line 660 receives a "high" gating voltage four successive times from the output of follower 577 through cable 154 in the cycling unit 24, while the other three lines remain "low." Lines 661–663 then received four gating signals, in sequence. Therefore, at any one time, twelve of the sixteen amplifiers numbered 674 are cut off, and the other four amplifiers are unclamped so they may be cut off by a "low" voltage or made conductive by a "high" voltage impressed on the respective input channels from the keyboard 840.

The anodes of corresponding tubes in each of the four groups of amplifiers, each group representing one decimal digit, are connected in parallel and tied to the appropriate one of output channels 665–658. If an amplifier is conducting, the channel connected thereto will be "low," representing a "0." Otherwise, the channel will be "high," representing a "1." Binary signals representing each of the four decimal numbers may thus be gated successively into the output channels 665–658 on receipt of the proper instructions.

If multiplication by unity is directed, none of the gating lines 660–663 goes "high," so that all amplifiers remain cut off, and all four channels 665–668 remain "high" except line 666. A "times 1" signal appears as a "high" signal in channel 53, blocking diodes 669, and allowing the control grids of tubes 670–672 to rise. The plates of these tubes will fall in potential, so that lines 665, 667, and 668 are at their "low" potential, while line 666 remains "high." The signal then appearing across the four lines will be "0100," the coded binary signal for "1."

If multiplication by the number stored in the short tape shift registers 15*a*—15*d* is desired, the "times X" instruction will cause the binary coded form of the number to appear, a digit at a time, in the channels 665–668, as is described in connection with Figure 25, from complementer outputs 444.

The diodes employed in the above circuit may preferably be of the type 6AL5, while the amplifier stages 670, 674 are preferably type 12AT7.

Figure 27:
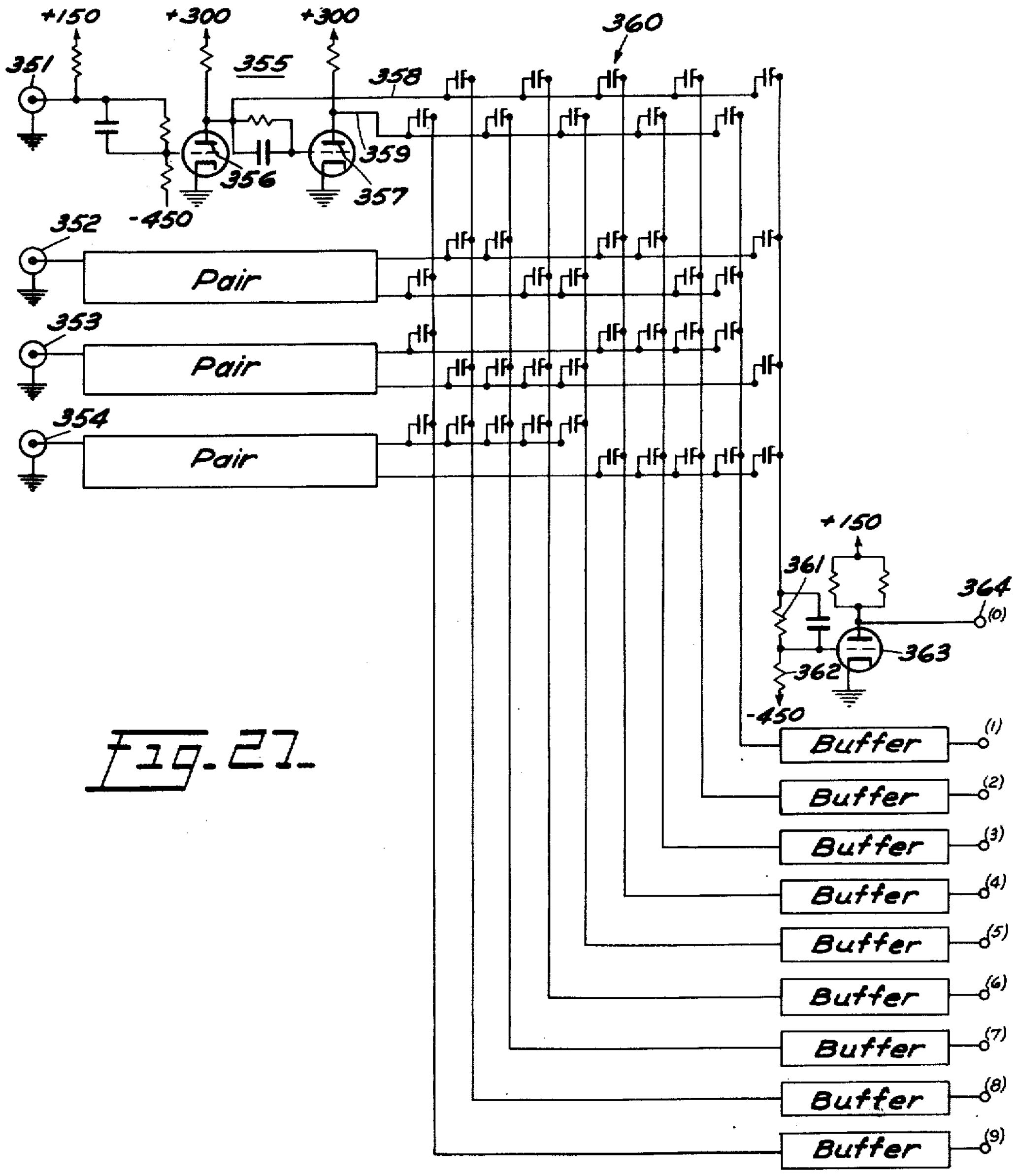

The binary coded numbers stored in the shift registers or received from the number board are to be multiplied together in the multiplier matrix 28. It is more economical of components to decode the binary coded digits into decimal numbers before they enter the multiplier. A decoder unit is provided for the numbers from each tape, as is illustrated by blocks 27*a* and 27*b* in Figure 1*b*. A preferred embodiment of one of the two identical units is illustrated in Figure 27, and may comprise four pairs, a diode matrix, and 10 buffer tubes. Channels 665–668 from distribution gate 26 connect to inputs 351–354, respectively, of the decorder. The signal in each input channel is coupled to its respective pair 355. A positive or "1" signal causes the potentials of anode 356 to fall and anode 357 to rise, causing associated line 358 to go more negative, or "low," and line 359 to go more positive, or "high." The output lines from each pair are connected in a diode matrix 360. Each vertical line of the matrix is connected through two resistors such as those numbered 361, 362 to a source of negative potential, while also serves to bias the associated buffer tubes, generally indicated as 363 below cut off. Each vertical line also connects through diodes with one of the two pair output lines from each input channel. When four of the eight pair output lines go high, responsive to input signals, current flows through the diodes connected to those lines, and increasing the potential at the grid of the associated buffers. The matrix 360 is so arranged that, for a given number input to channels 351–354, all but one of the buffer tubes will be rendered conducting, by the rise in potential of the vertical lines tied to their grids. Thus, while all but one of the numbered channels 364 connecting to the multiplier will all drop in potential to substantially 70 volts, the selected channel will remain at +150 volts, and this relatively "high" potential is employed as the input signal to the multiplier matrix 28.

Figure 28D:
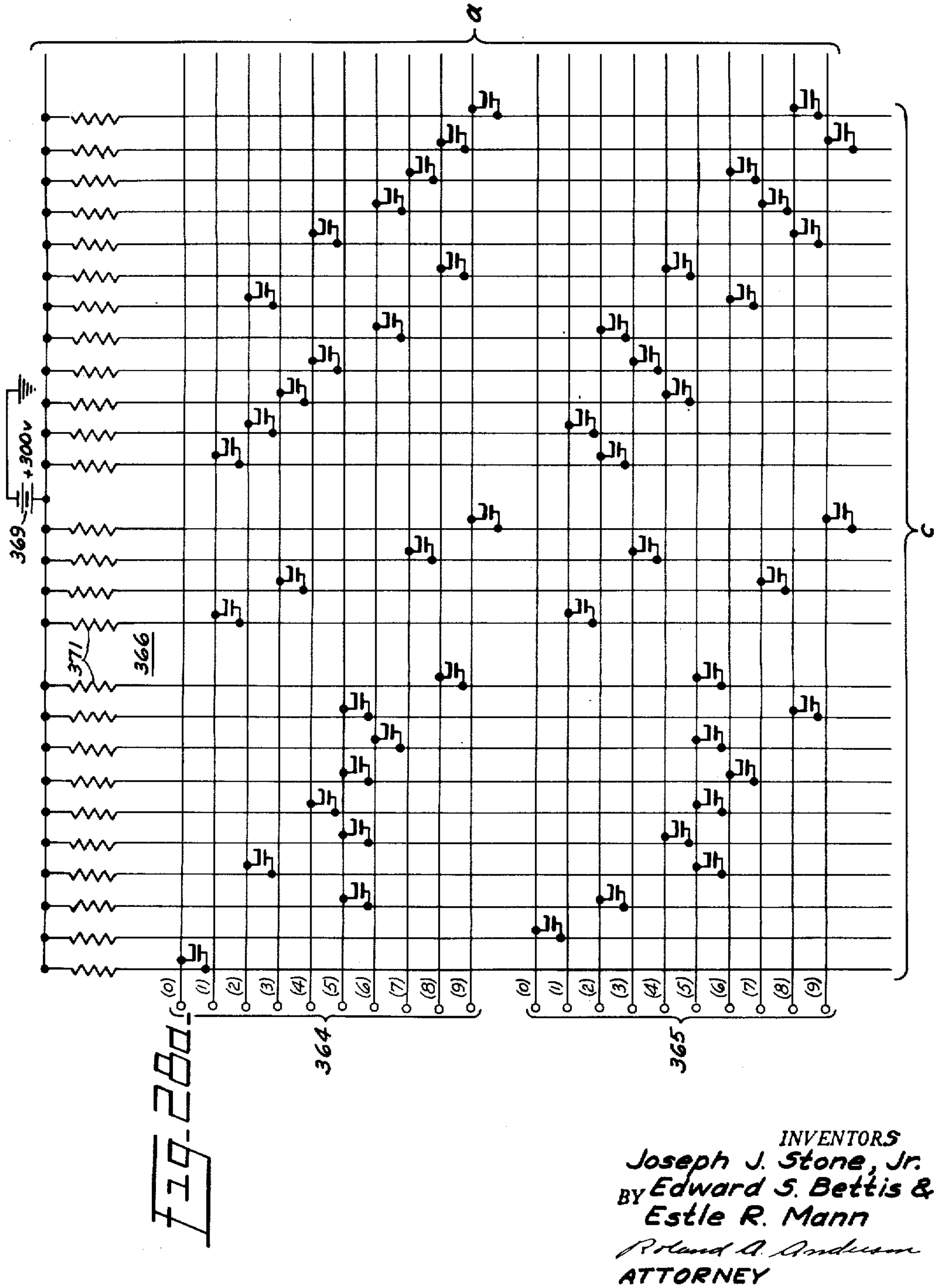
Figure 28B:
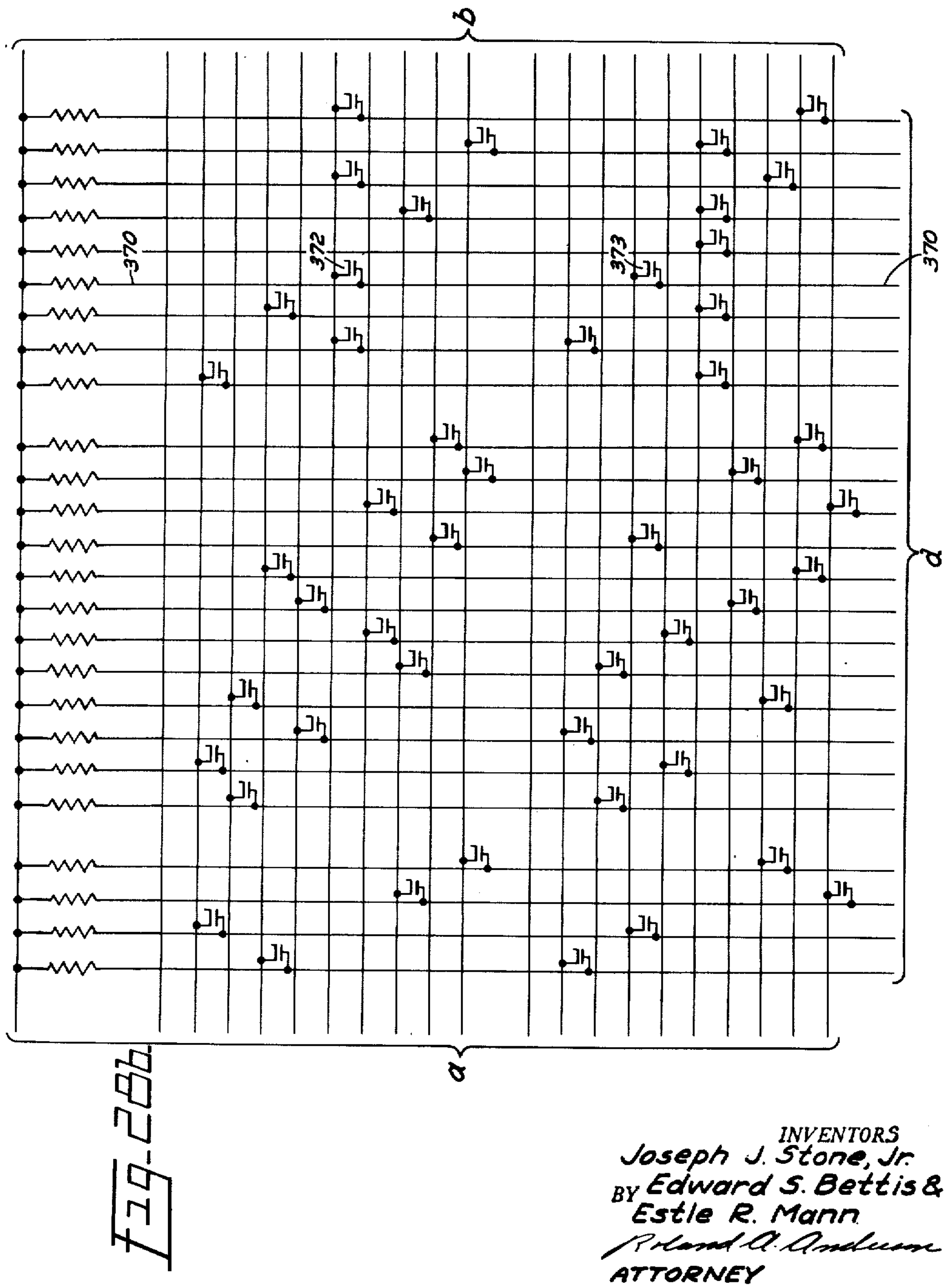
Figure 28C:
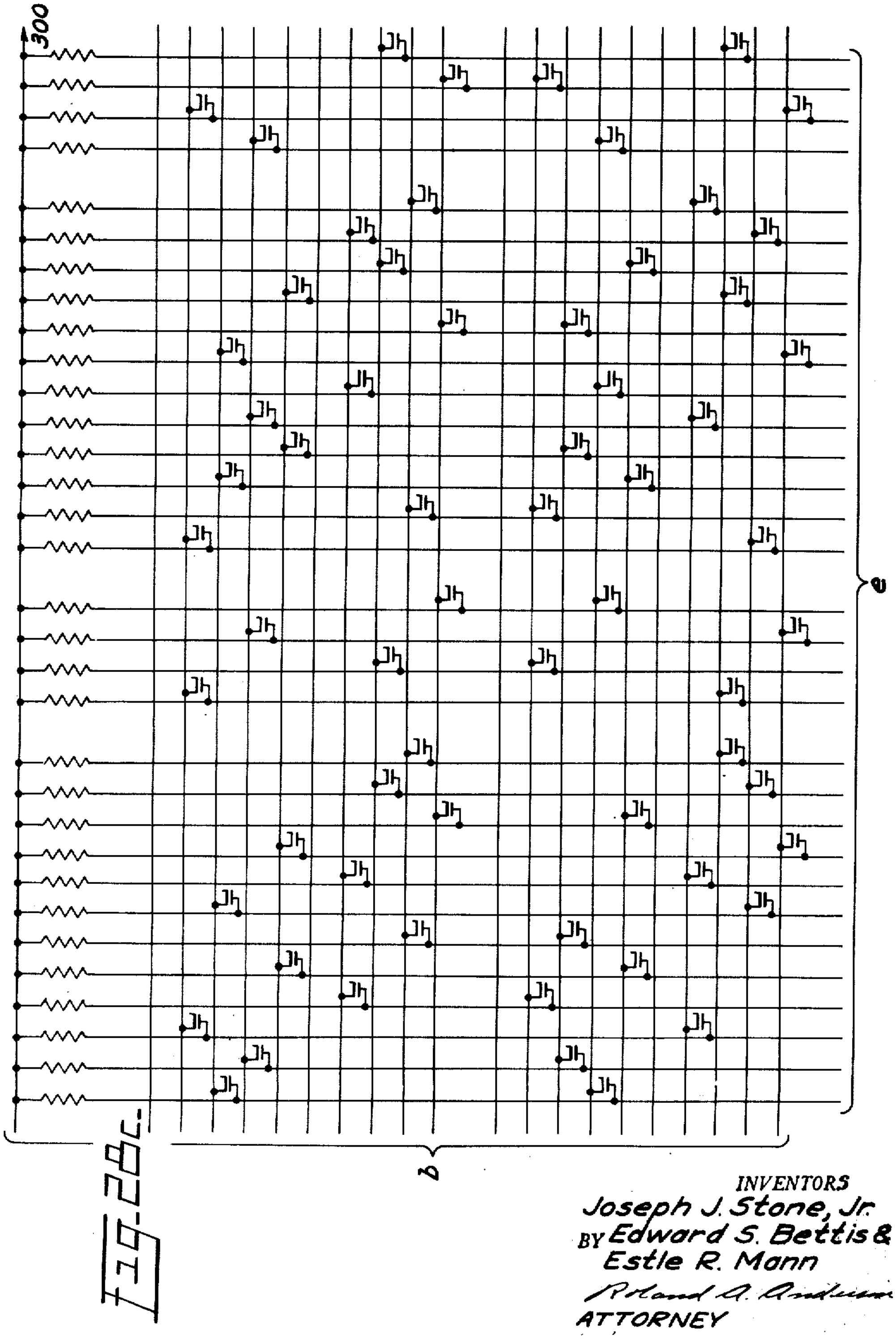
Figure 28D:
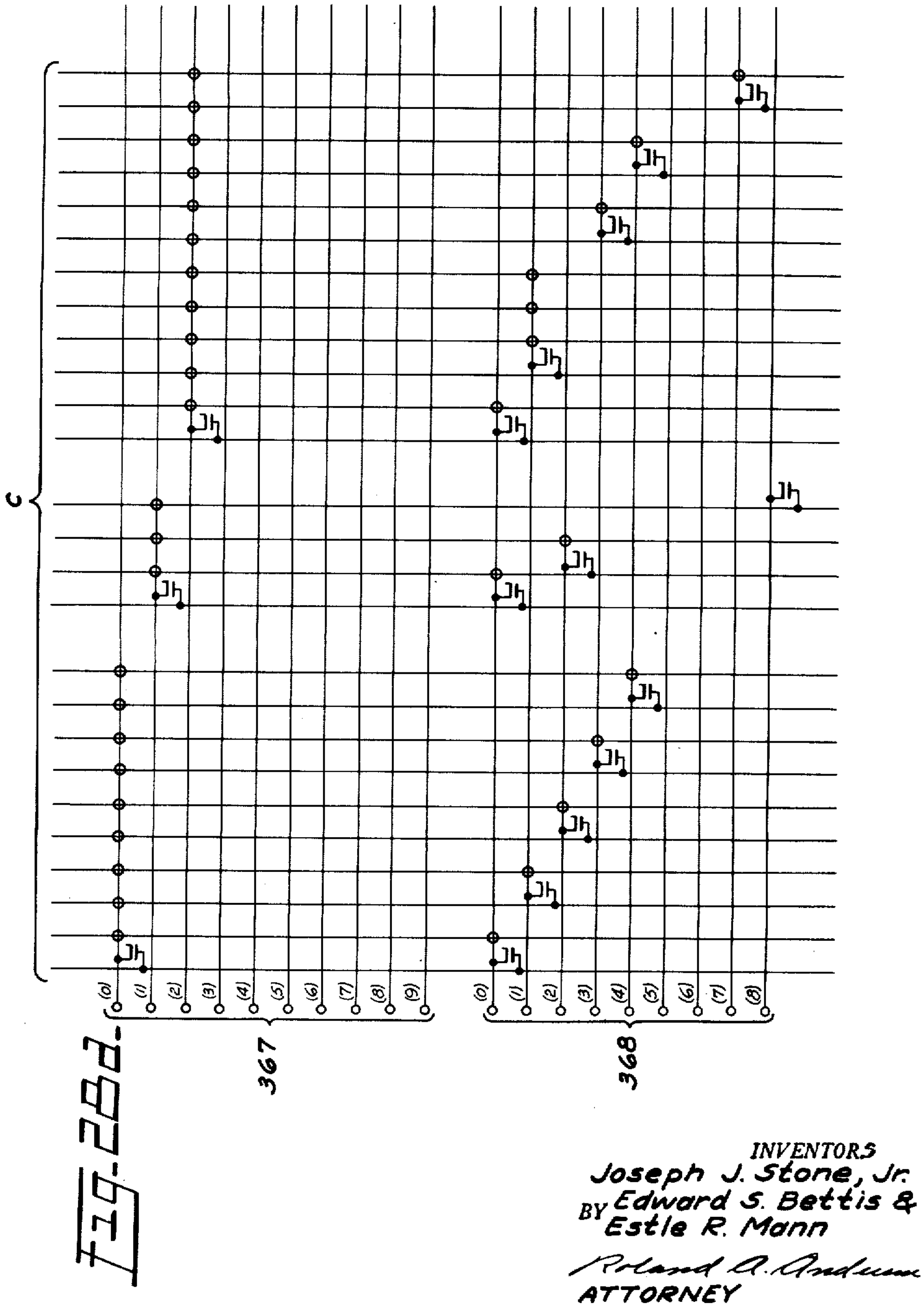
Figure 28E:
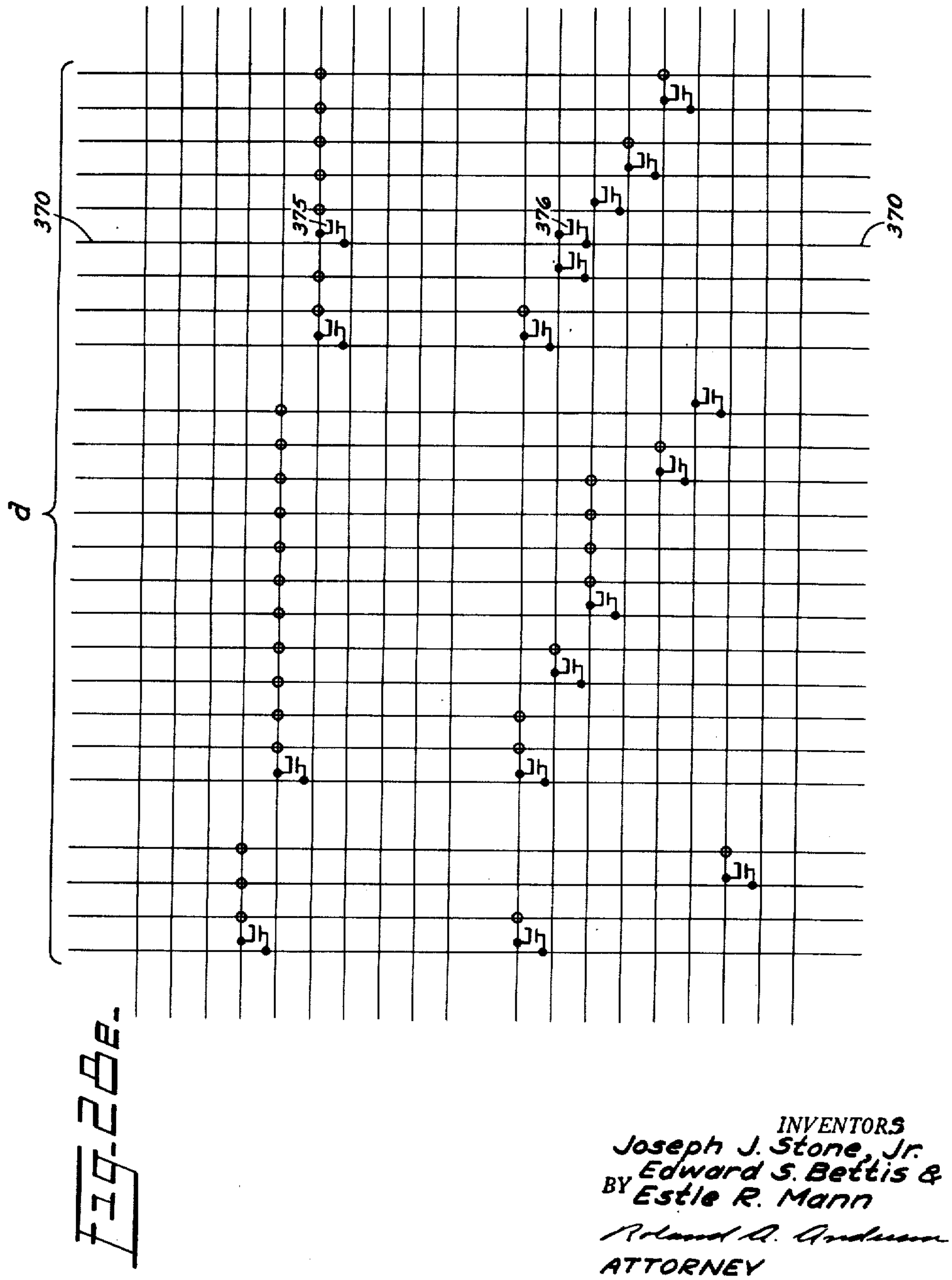
Figure 28:
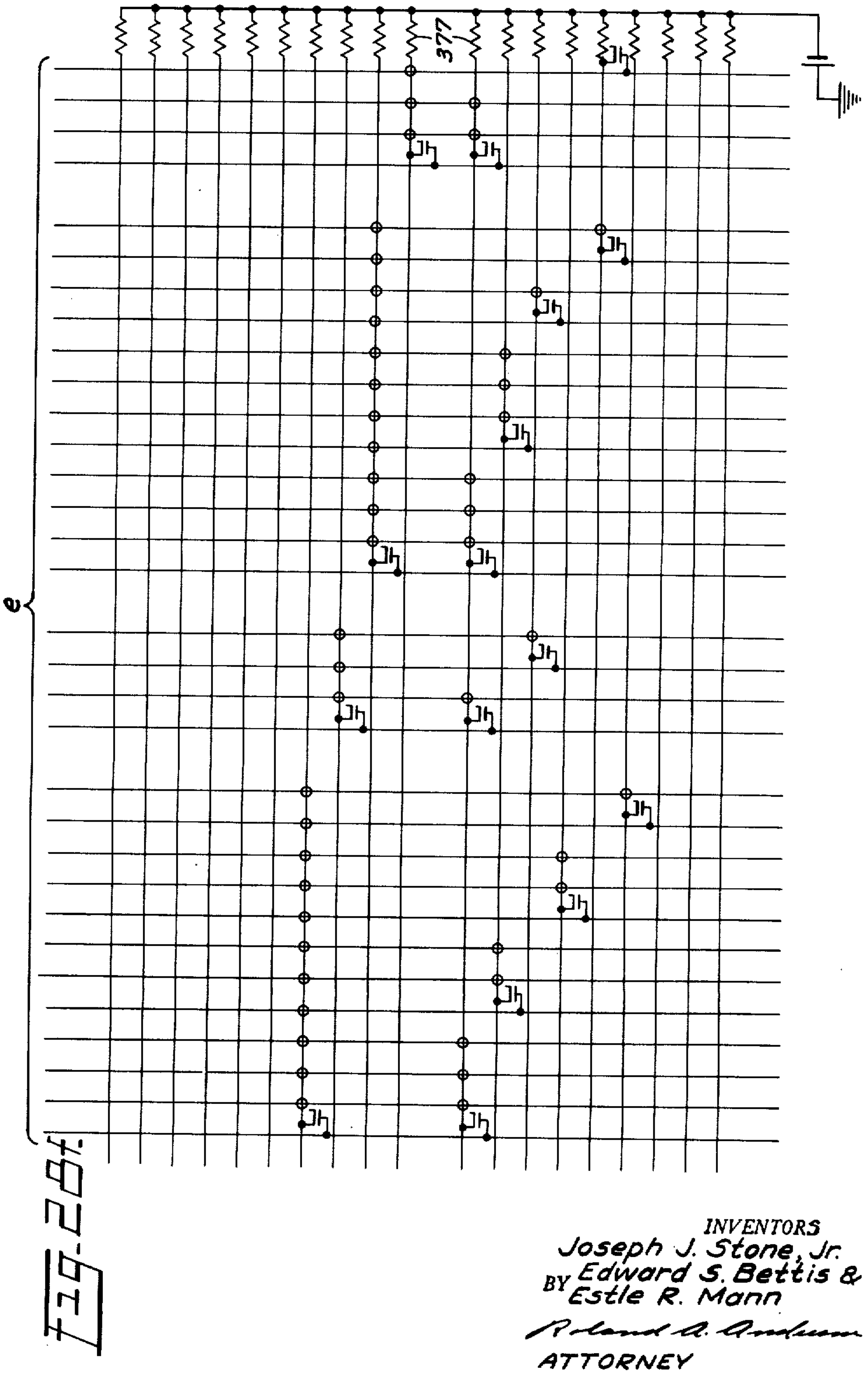

The multiplier matrix, shown in Figure 28, consists of two sets 364, 365, of ten input channels, a diode matrix 366, and two sets of output channels 367, 368. The vertical matrix lines are connected to a source of voltage 369 through resistors 371. In the drawing, in the interest of simplicity, a small circle represents a diode connection, with the cathode of the diode tied to the horizontal line and its anode connected to the vertical line.

The two numbers to be multiplied are represented by high potentials on two of the numbered input channels 364, 365. All the possible products of two digits are diode connected in the matrix, so that selection of the two input digits also selects two output digits representing the product. For example, if the "5" line is selected at input 364 and the "3" line is selected at input 365, diodes 372, 373 will be cut off, while all the remaining diodes will conduct because of the fall of potential on the remaining input lines. Since both its diodes are cut off, line 370 will rise in potential while the remaining vertical matrix lines will fall in potential. That rise will cause diodes 375, 376 to conduct, raising the potential of the connected "5" line in the right hand digit output 367 and "1" line in the left hand digit output, since those horizontal lines are connected through resistors 377 to a source of negative potential as illustrated.

The output signals must be re-coded into the binary system before being sent to the distribution gates 30 by two substantially identical coder units, one for the right hand digit, the other for the left hand digit.

Figure 29:
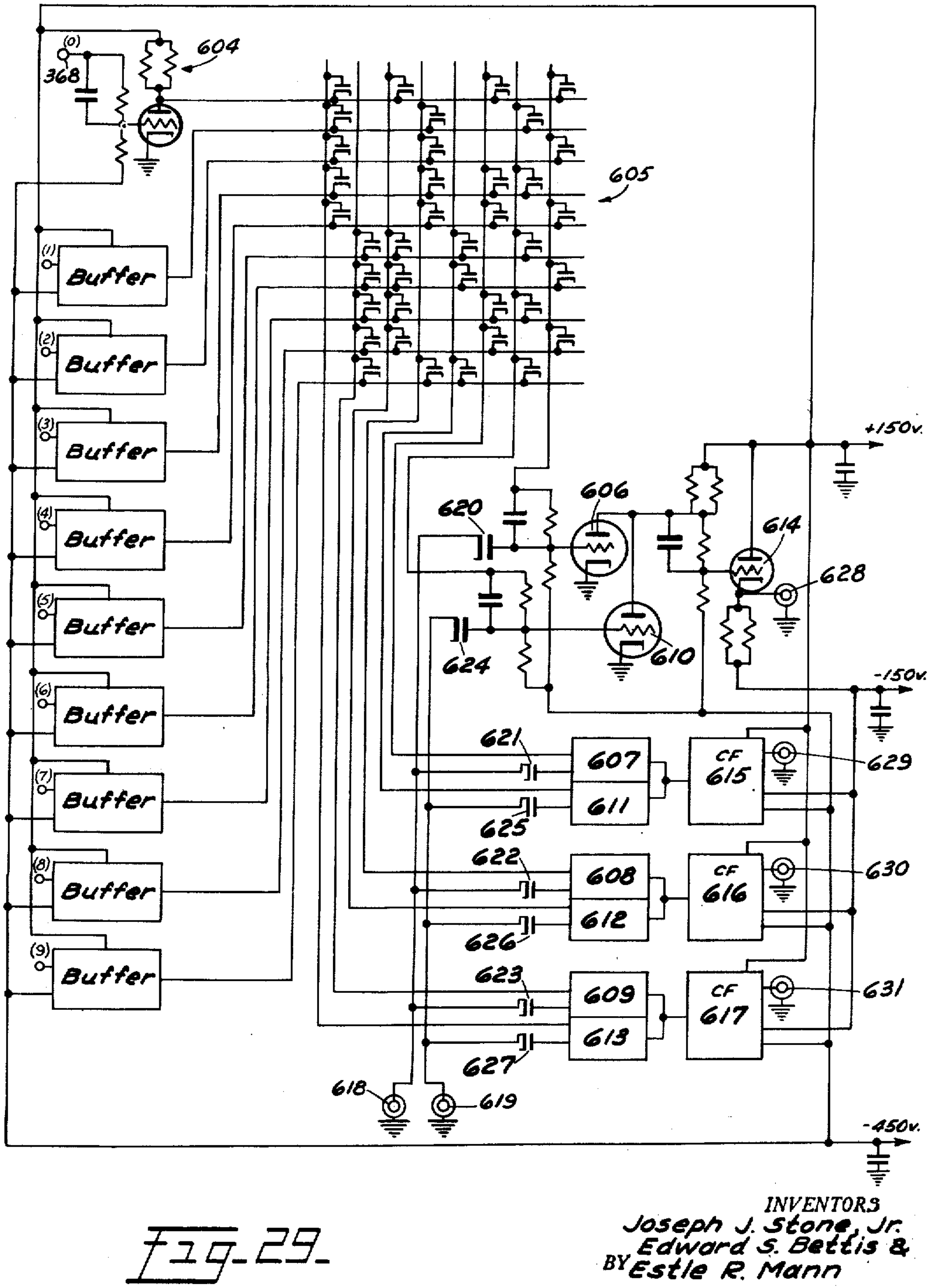

The right hand digit coder unit is illustrated in Figure 29. The left hand digit coder is different from the unit illustrated only in that the channel numbered "9" is unnecessary and may be omitted. The unit shown comprises ten numbered buffer stages 604 connected to the output channels 368 of the multiplier, a diode matrix 605, amplifier stages 606—613, cathode followers 614—617, output channels 628—631, and input gating lines 618—619. Line 618 is coupled through diode clamps 620—623 to four of the amplifiers, while line 619 is coupled through clamps 624—627 to the other four amplifier stages.

A positive signal voltage from the multiplier is applied to the input terminal of one of the buffers 604, causing a fall of potential at the buffer output, and dropping the potentials of the cathodes of the four diodes in the matrix connected to that output, shown as a horizontal line. The four vertical lines of the matrix to which those four diodes are connected will fall in potential, dropping the potentials at the grids of the four amplifiers to which they connect. If the four amplifier tubes are conducting, the decrease in grid potentials will produce an increase in the plate potentials, and these signals may be utilized to produce positive voltage signals in the corresponding output channels by means of the cathode followers. But if the amplifier tubes are cut off by the clamps, the signals will not pass, and no positive or negative voltage signals will appear in the output channels 628—631.

The relative polarity of lines 618—619 is determined by whether the number from the multiplier is to be added or subtracted from the accumulator total. If addition is indicated, line 618 is "high," unclamping the grids of tubes 606—609 to follow signals from the matrix. If subtraction is indicated, line 619 is "high," unclamping the grids of tubes 610—613. The tubes coupled to the more negative line are maintained well below cut-off, so that a signal from the matrix 605 will not render them conductive. But the tubes coupled to the more positive line are normally conducting, so their anode potentials are "low." These potentials are coupled to the grids of the followers 614—617, producing "low" voltages in the output channels. But when four of the matrix vertical lines fall in potential, the four corresponding grid potentials tend to drop. If the tubes are already cut off by the clamp, no change occurs in the output channels; but if any of the tubes were conducting, they will now be cut off, raising the grid voltages of the followers, and impressing a "high" signal voltage in the corresponding output channels.

Thus the signal in the output channels is either the number selected by the multiplier or its complement, which is represented by exactly the opposite binary digits from those representing the number in the system we have chosen. For example, the number "7" would be coded 1010 while its complement "2" would be 0101. Since in the binary system addition of a first number to a second is equivalent to subtracting the complement of the first number from the second number, the addition and subtraction operations can be performed in the same unit in our computer merely by controlling the potentials on the two gate lines 618—619. The coded outputs are delivered to distribution gates **30*a*—30*h* through cables 632, 633**, as is shown in Figure 1*b*.

The amplifier stages 606—613 may comprise one triode stage of a twin-triode 5687, while the diodes are preferably type 6AL5.

Figure 30:
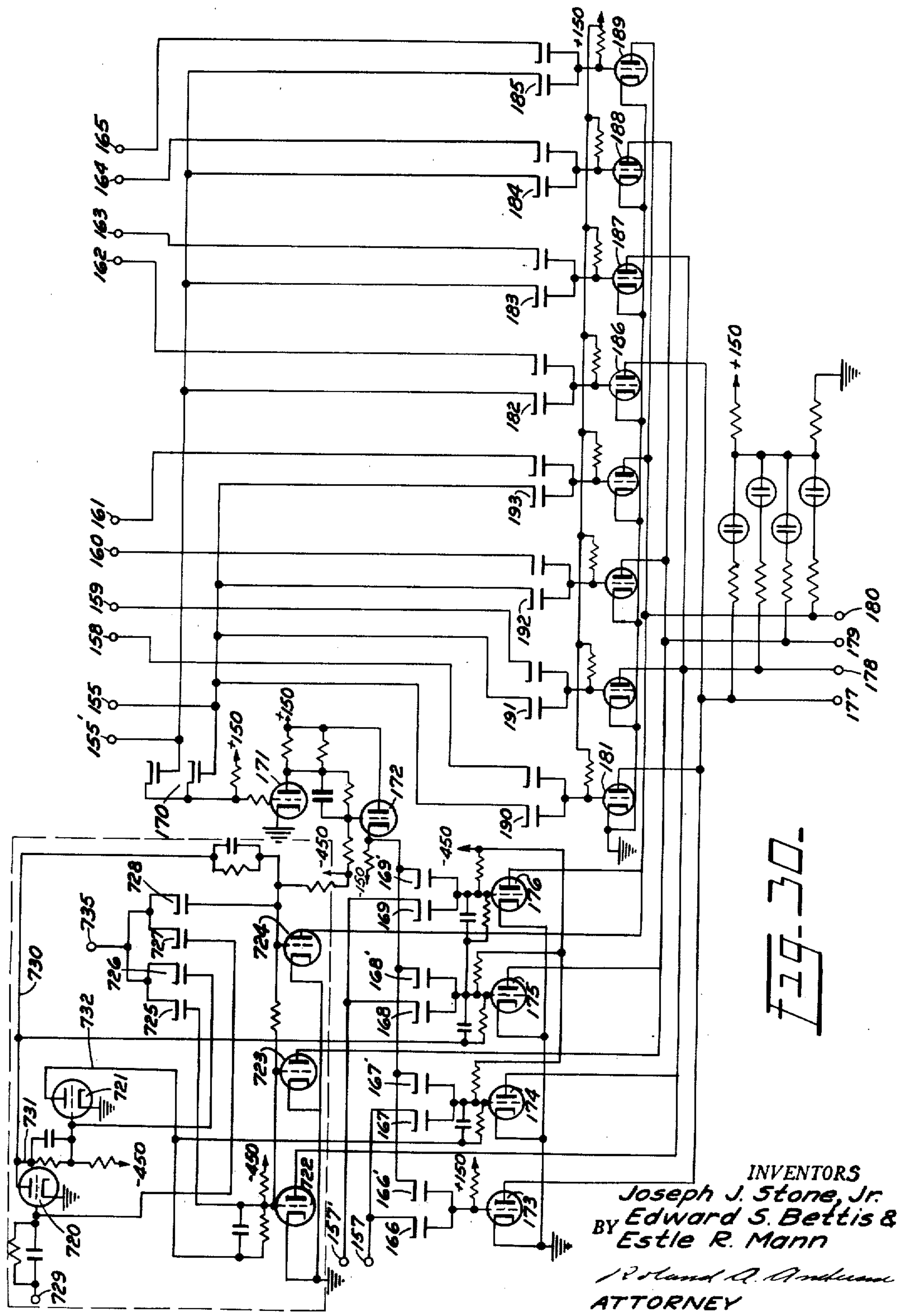

Figure 30 illustrates the distribution gates, eight of which are provided to transfer the products from the multiplier coders **29*a*, 29*b* into the proper columns of the accumulator 32 a digit at a time. In cycling unit 24, a positive or number-gating pulse is impressed upon two of the eight channels in cable 155 during two of the sixteen steps as the cycling pulse is stepped through shift register 85. Two of the lines in cable 155** are coupled to each distribution gate, as shown in Figures 1*b*, 1*c*, except gate **30*a*, which receives only one line. During the remaining fourteen steps, a zero should be gated into the accumulator columns in an addition operation, or the complement of a zero, a nine, should be entered for a subtraction. The output line 435 of comparator 35 maintains channel 157′ at the higher of its two possible potentials if the signs of the numbers read into it from the short and long tapes are different, resulting in a negative product, while line 434 maintains channel 157 at its higher potential if the signs are alike. The binary coded left hand digit of the product from the coder 29*a* enters the unit through channels 158—161, while the binary coded right hand digit from coder 29*b* enters through channels 162—165**.

When channel 157 is at its higher potential, for example, indicating a positive product is to be gated in, diodes 166 and 167 are cut off. Diodes 166′—169′, connected to the cathode of normally conducting follower 172, cannot conduct because of the potential of that cathode while the follower is conducting. But diodes 168, 169 are free to conduct, causing a fall in potential at the grid of the associated triodes 175—176. Therefore, only triodes 173, 174 conduct current, causing the potentials of channels 177, 178 to fall, while the potentials in channels 179, 180 remain high. Thus, a binary zero, "0011," is indicated in the output channels 177—180. If a minus operation is indicated by a "high" signal on line 157′, diodes 166, 167 are free to conduct, cutting off triodes 173, 174, and setting up a binary nine, "1100," in output channels 177—180.

But when a positive gating pulse is received in either of the lines 155, 155′, current flows through one of the twin-diodes 170, a positive pulse appears at the grid of tube 171, and a negative pulse is coupled through follower 172 and diodes 166—169′ to cut off the triodes 173—176 and keep them cut off while the number from the multiplier is gated in. When the gating pulse is removed from channels 155, 155′, the above circuits return to their previous conditions, and the potentials in the output channels are again determined by the input to channels 157, 157′.

When a positive gating pulse appears in channel 155′, for example, diodes 182—185 are cut off. If then a positive or "0" signal appears in one of the multiplier output channels 162—165, cutting off the diode connected to that channel, the grid potential of the corresponding triode 186—189 will rise, causing the anode potential thereof to fall, setting up a low voltage in the connected output channel. In like manner, a positive pulse in channel 155 cuts off diodes 190—193, so that a positive signal in one of the channels 158—161 causes a drop in the plate potential of one corresponding triode, and lowers the potential of the one connected output channel.

The unit thus provides the proper coded number to be entered in each of the accumulator columns, gating the proper product digits from the multiplier into two of the columns, and generating a "9" or a "0" for each of the other columns, depending on the input instruction.

Since only four decimal digits of a number are transferred out of the accumulator 32, it becomes necessary to round-off the fourth decimal digit appearing in accumulator **32*e*** before transfer to avoid a large cumulative error. In any round-off to four digits, the sign of the accumulator number and the magnitude of the digit held in the fifth decimal position must be considered to determine the round-off required. If the sign be positive, then if a 4 or less be stored in the fifth position, nothing ("0") should be added to the fourth position; but for a 5 or greater, "+1" should be added. If the accumulator number be negative, then if 5 or more is stored in the fifth position, it represents the complement of a number from 0–4, so that addition of "0" is required. Therefore, the complement of "0," that is, "9," is added to the fourth position. But if the fifth place contains 4 or under, addition of "+1" is necessary, so "8," the complement of "1," is added to the fourth position.

A circuit designed to provide the necessary round-off is shown inside the dotted lines of Figure 30. This additional circuitry is required only in the gate **30*e*. It includes two amplifier stages 720, 721 connected in cascade, three driver circuits, 722–724, connected to output lines 178–180 respectively, and four diode clamps 725–728, connected to a gating line 136. For an example of proper operation of the circuit, consider a positive number stored in the accumulator, having a digit of 5 or greater in the fifth position. Input channel 729 will assume its low potential, because a binary "1" appears as the first number in the coded expression for decimal digits 5 and larger, and channel 729 is coupled to that lead of the pair which goes "low" when a "1" is received. Gating line 157** will be at its more positive potential, indicating a positive number.

Diodes 166, 167 will be cut off, but diodes 168, 169 may conduct, raising the potentials at the grids of tubes 175, 176, and causing the potentials of associated lines 179, 180 to fall to their low potentials. Since tube 172 is conducting, diodes 166′—169′ are cut off, keeping tube 173 conducting but also keeping tube 174 clamped below cut off. The associated lines 177, 178 are, respectively, "low" and high."

Gating line 735 from the control unit, Figure 23, is normally at its low potential, causing diodes 725—728 to conduct, clamping the control grids of tubes 720—724 below cut-off. But upon receipt of a "transfer" gating signal from the control unit 23, line 735 goes "high," cutting off the diodes 725—728, thereby removing the clamps during the round-off operation. Line 729 being at its low potential, tube 720 will remain cut-off, so that line 730 will remain at its high potential and line 731 will go "high." Tube 721 will then conduct, causing line 732 to fall to its low potential. The high potential on line 730 will cause tubes 723 and 724 to conduct, making their anode voltages fall, thus setting up low potentials in channels 179, 180. The low potential on line 732 will maintain tube 722 below cut-off, so that a high potential appears in channel 178. This is in accord with the high potential maintained in the channel by the nonconductance of tube 174. Since tubes 181, 186 are normally conducting, because their respective grids are returned to a positive voltage, they also maintain channel 177 at its low potential. It may be seen that the round-off circuit has set up low, high, low, low potentials in the respective output channels 177—180, the coded representation for decimal digit "1."

Then a single "add" pulse is applied to the adder unit, as may be seen in Figure 31, on line 132 from the cycling unit 24 to gate the "1" into the accumulator to perform the round-off. Next a "transfer" pulse is applied through channel 136, Figure 31, to gate the number stored from the accumulator to the temporary storage register. Next a "reset" pulse from line 140, Figure 31, resets each stage of the accumulator to zero, so it is ready to receive the next number.

In like manner, the coded representation of "9," "8," or "0" may be set up in outputs 177—180 by the round-off circuit, depending upon the signal on line 729 and the sign of the stored number as indicated by lines 157, 157'.

The diodes employed in the above circuit may be type 6AL5, and the triode amplifier may be single units of the twin-triode type 5687.

In a digital computer using the binary system, a basic component is the mechanism for adding two numbers together. Because of the nature of the binary system, the problem resolves itself into that of adding "1" or "0" to "1" or "0" and of carrying "1," if necessary, into another unit for adding the next two digits. For ease in computing, it is known that a shift of three numbers in the normal binary coding system may be made, so that a ±3 correction to the adding system is also required. The excess —3 code for decimal numbers is given in Table B below.

*Table B*

| Decimal No. | Binary Code | Potentials |
|---|---|---|
| 0 | 0011 | low—low—high—high. |
| 1 | 0100 | low—high—low—low. |
| 2 | 0101 | low—high—low—high. |
| 3 | 0110 | low—high—high—low. |
| 4 | 0111 | low—high—high—high |
| 5 | 1000 | high—low—low—low. |
| 6 | 1001 | high—low—low—high. |
| 7 | 1010 | high—low—high—low. |
| 8 | 1011 | high—low—high—high |
| 9 | 1100 | high—high—low—low. |

In the particular computer embodiment described herein, numbers having eight decimal digits are added together. Each of the eight decimal digits is binarily coded into four binary digits. The stage illustrated schematically in Figure 31 is used to add one of these four binary digits to a second binary digit stored on a flip-flop or multivibrator therein, to carry 1 from the preceding stage if necessary, to carry 1 to the following stage if required, and to correct the answer for the binary coding factor ±3. Thus, 32 such stages are required to handle a single number having eight decimal digits.

All 32 stages are fed in parallel and simultaneously, accomplishing a great reduction in time over series-feed systems, where each binary column is added sequentially, then those totals are added sequentially from the right hand column.

Figure 32:
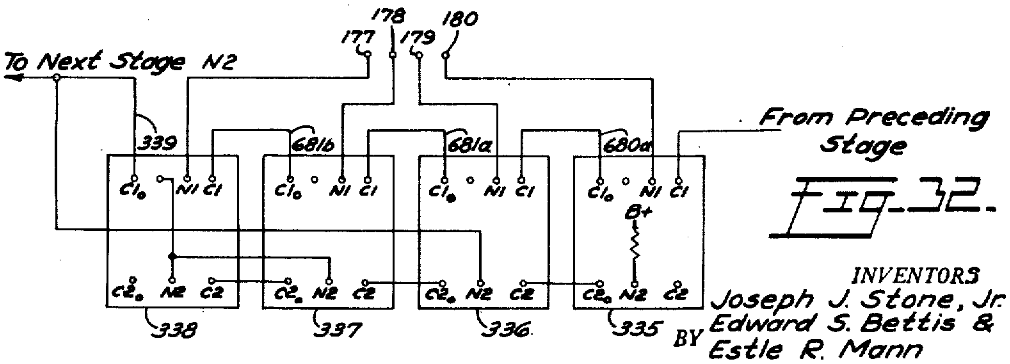

A system has been designed for binary addition employing comparator units and comparator matrices, a gate circuit, and a multivibrator. Referring now to Figure 31, the operation of the circuit is as follows:

(1) The number signal N1 enters amplifier pair 300 from one of the distribution gates 30. The carry signal C1 enters amplifier pair 301 from a preceding stage, as shown in Figure 32.

(2) The plate leads 302, 303, 304, 305, from the tubes of pairs 300, 301 are brought out to form a diode matrix, and the output voltages are compared through lines 306, 307, connected to a source of positive potential 308. If leads 302, 304 are both "high," representing two "1's" at the inputs, line 307 is "high," representing "0" with "1" to carry. If leads 303, 305 are both "high," representing two "0's" at the input, line 306 is "high," also representing "0," with no carry. For either condition, the number stored in the accumulator flip-flop 310 is not to be changed.

(3) Line 309 compares lines 306, 307, and is connected to the negative terminal of source 308 through a resistor. If either of the lines are "high," current flows through the appropriate diode and line 309, raising the potential of that line, indicating "no trigger"; that is, flip-flop 310 is not to be triggered to its other stable state. If both lines 306, 307 are "low," representing inputs of "0" and "1," then line 309 will be "low," which is the signal indicating that flip-flop 310 should be triggered to its other state.

(4) Line 309 governs the relative polarity of the plate leads 311, 312, of pair 313, the line 312 being "high" for the "trigger" or low input signal. The number stored in the circuit 310 determines the relative polarity of leads 314, 315, line 315 being "high" to represent a "1" stored in that device.

(5) Line 316 compared lines 312, 315, and is "high" for the combination "trigger +1." Line 317 compares lines 316, 307, and is "high" for either "trigger +1" on line 316 or "1+1" on line 307, the signal going to pair 318 to deliver a "carry" pulse to the next stage.

N2, the second number input, and C2, which in coded systems is the correction factor of 3 mentioned previously, are fed to pairs 323, 324 to set up a "trigger" or "no trigger" signal in the output of pair 325 in exactly the same manner as N1 and C1 did in the output of pair 313 in the circuit just described. Instead of only the one number located in the flip-flop 310, the result of the sum of that number plus N2 plus C2 must be used in setting up the carry generated by this correction factor. Since a sum of one is used in setting up a carry it is only necessary to detect this condition. This is determined in lines 319 and 320. Line 319 is "high" if the flip-flop 310 contains a "1" and "no trigger" is indicated from pair 313. Line 320 is high if a "trigger" is indicated and the flip-flop 310 contains a "0." If either lines 319 or 320 is "high," then the diode connections to line 321 cause it to be "high" and the output line 326 of pair 322 will be "high," indicating a sum of "1." This pair output line may then be compared with the signal from pair 325 on line 330, which will be "high" for "trigger +1." Line 331, like line 307, will be "high" to indicate a "0" with "1" to carry. Line 332 compares lines 330, 331, and like similar line 317, will be "high" to indicate a carry to the next stage.

Two sets of trigger signals have been generated in the circuit. If either, but not both, circuits call for a trigger, then the add gate 327 should be opened, but, however, if both or neither call for a trigger, then the add gate should be closed, for two trigger inputs mean that the circuit should be triggered twice, which would return it to its initial state as if it had not been triggered. To select these two conditions, lines 328, 329, are diode connected to the outputs of pairs 313 and 325. Line 328 is "high" if a "trigger" is indicated from pair 313 but not pair 325, while line 329 is "high" if a "trigger" is indicated from pair 325 but not from pair 313. If either of these lines is "high," line 349 will be "high," opening the add gate 327 to the add pulse when it is received from channel 132 of the cycling unit 24.

To summarize the action described above, the voltage on the suppressor grid of the add gate 327 has been determined by the combination of four voltage inputs, each representing a binary number, in conjunction with the number internally stored in the flip-flop, in such a manner that the application of a single "add" pulse to the control grid of the gate will set the flip-flop in a position representing the sum of the five numbers. Such carries as are required are produced within the stage and coupled as a voltage level to the next stage to act as two of its inputs. The voltage at the gate reaches its steady state level before the application of the "add" pulse so that no coincidence is involved between pulses of short duration.

Auxiliary circuits must be provided to transfer out the sum held in storage flip-flop 310 of each adder in accumulators 32*e*—32*h*, representing the four most significant digits of the sum. Pentode gates 333 are provided in the adders of those accumulators, and are open only when the flip-flop 310 contains a "1." The "transfer" pulse from cycling unit channel 136 will pass through the gates, when they are open, and pass to the associated temporary storage registers 16*a*—16*d* and to the gates 7*a*—7*d*.

In place of gate 333, a single amplifier stage not shown, may be provided in the most significant digit adder of accumulator group 32*d*, to provide signal in channel 729 described more fully in connection with Figure 30.

Following the "transfer" pulse a "reset" pulse from channel 140 of the cycling unit 24 is applied to one of the inputs of flip-flops 310 to reset the stage to "0" or "1," as desired. The four flip-flops 310 in each accumulator group representing a simple decimal digit should be reset to the coded zero which may or may not be all zeros in the individual positions. By proper positioning of a soldered jumper in the reset circuit the flip-flop may, therefore, be set either to a one or a zero as required.

In adding two coded numbers, X and Y, using binary arithmetic, the result Z is $$Z=(X+3)+(Y+3)=(X+Y)+6$$

In order to bring Z back to the proper coded form, three must be subtracted from the result if the sum of X and Y does not exceed ten. For a sum of two numbers which does exceed ten a separate correction must be used due to the behavior of the binary numbers. With four binary numbers the maximum number which can be represented is 15. If X plus Y is ten or greater, the sum of the codes will exceed 16 in the binary system, which causes a binary one to be carried into the next decimal position. The four binary numbers which remain in the Z position become zeroes for Z plus Y equal ten and then increase in a manner which represents the right hand digit of the sum exactly for sums larger than ten. Thus, the three has been lost when the sum exceeds ten and must be added to Z to bring the code back to the proper form.

The carry between decimal digits, therefore, is the determining factor for the correction factor which is to be applied to the sum after each addition in order to maintain the proper code for the sum. If there is no carry, three is to be subtracted, while if there is a carry, three is to be added.

Subtraction may be accomplished by adding to the minuend the complement of the subtrahend with respect to nine and adding one to the result. The carry which results from this addition should not be carried to the next digit position but should be used only in the digit which is being corrected. Binarily, this amounts to adding "1101" if there is no carry, or adding "0011" if there is a carry. The diagram shown in Figure 32 illustrates how this may be accomplished with the adder units described above. In this arrangement, the carry output 339 from the fourth stage 338 is connected to the second number input channels, marked N2, in each stage. The carry output line 680*a*, which is high for a carry from stage 335, is connected to the following stage 336 so that a one will be fed into this stage only when there is a carry. The lines 681*a*, 681*b*, which are high for no carry, are connected from the outputs of stages 336, 337 to the inputs of stages 337 and 338, respectively, so that a one will be applied to these inputs only when there is no carry. The number input N2 to stage 335 is permanently connected to a high voltage so that a one always appears in that position regardless of the condition of the carry output.

The digits from the distribution gates 30*a*—30*h* may be gated into the adder circuits 31*a*—31*h* through separate channels connected to the N1 inputs of each adder unit. These channels are indicated by the numerals 177—180 in Figure 30, which shows a single distribution gate unit. One gate unit is provided for each decimal digit adder group, shown in Figure 32, so that corresponding input channels of Figure 32 are also indicated by numerals 177—180. An input from the preceding stage enters the input C1 of stage 335, and may indicate a carry or not as described in connection with output 339, which is coupled to the C1 input of the first stage of the next decimal digit adder group in the accumulator. The carries between stages of a single group, like those which result on line 332 of Figure 31, are coupled to the C2 inputs of the next successive stage, except for the output from stage 338 of the most significant decimal digit group 324, which is fed back to limiter 34 through channel 387, shown in Figure 1*e*.

Figure 33:
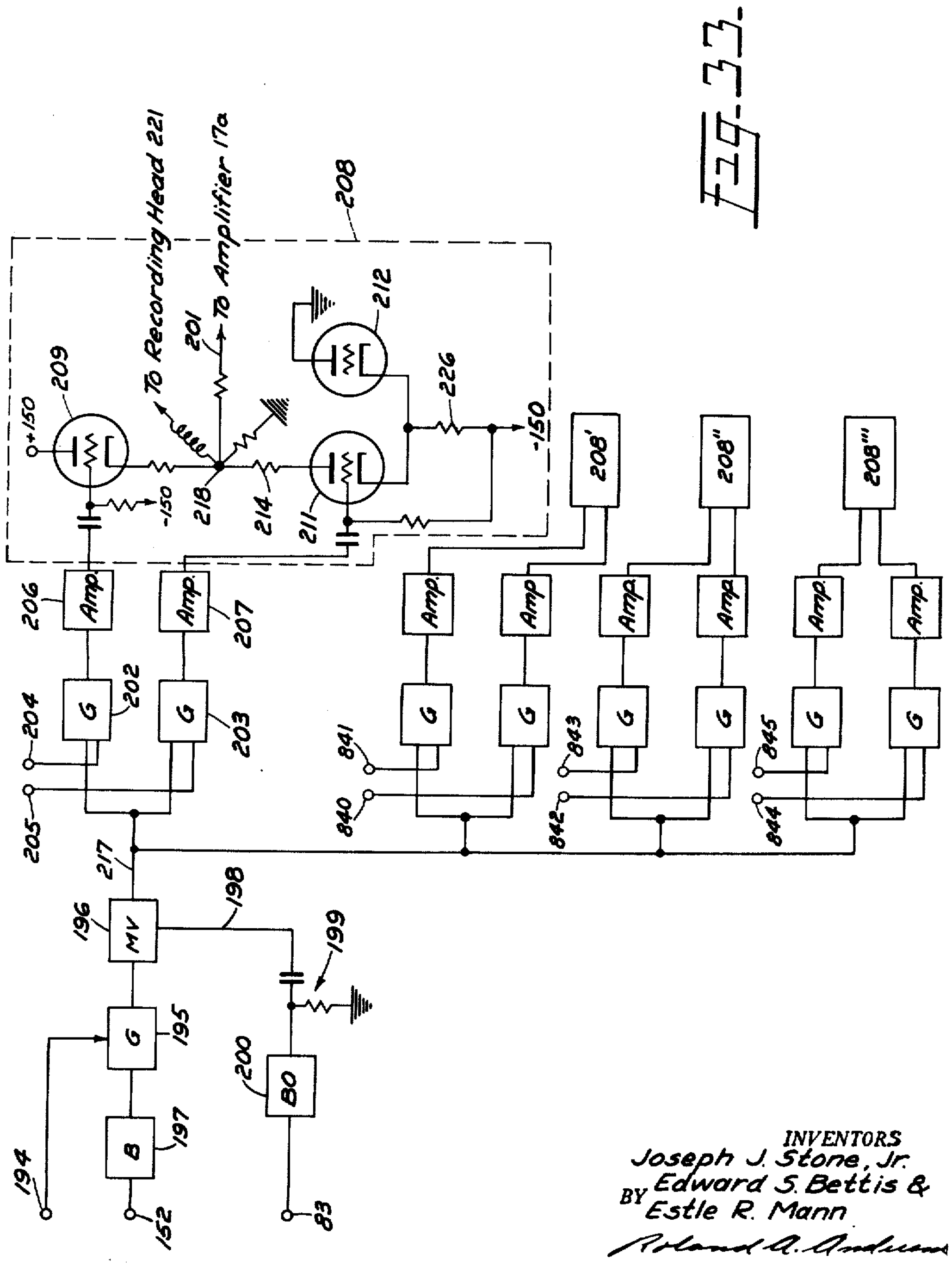

The recording circuit is illustrated in Figure 33. Signals from the timing marks on the short tape are obtained by the reading-recording head 220, which monitors short tape channel 12′, are amplified by amplifier 18*f*, and are fed to the polarity selector 19*e*. Positive pulses from that unit are passed through channel 194 and open gate circuit 195 to trigger delay-multivibrator 196. Gate 195 is opened by the buffer stage 197 only in response to a pulse from channel 152 of the cycling unit 24. Four positive pulses per digit, representing the timing marks, pass through gate 195 before it is closed by the resetting of flip-flop 148, Figure 24, and those four pulses trigger circuit 196 to produce four positive and four negative square waves in channels 217, 198, respectively. The negative signals are differentiated in RC network 199, and the pulses from the trailing edge are used to trigger oscillator 200, producing four "shift" pulses in channel 83. The positive signals in channel 217 pass through the open one of two gates 202, 203, depending upon the polarity of the gating voltage in channels 204, 205, which polarity is determined by whether a "0" or a "1" is shifted out of the temporary storage register unit 16*a*. The four negative pulses that appear at the output of one gate are amplified in the corresponding amplifier circuit 206 or 207, and passed to the circuit indicated schematically 208.

The object of this circuit is to cause current to flow through a recording head in one direction for a "1" signal, and in the other direction for a "0" signal, so as to record the proper signal on the magnetic tape. As each pulse passes through gate 202 and amplifier 206, it turns on cathode follower 209, which was cut off by the grid bias voltage until the arrival of the pulse. Current then flows through head 221 from ground to the cathode of the follower 209 during the conductive period thereof, recording a "positive" signal on the tape. But a signal through amplifier 207 is coupled to the grid of tube 211, which is normally held below cutoff by current flow through the cathode load resistor 226 and tube 212. Tube 211 conducts while the positive signal is impressed upon its grid, and current flows through tube, its plate load resistor 214, and the recording head 221 to ground, recording a "negative" signal on the tape. Junction point 218 is connected to the corresponding preamplifier numbered 17*a*, to enter the appropriate signal into the short tape shift register 15*a* while it is being recorded on the tape.

Channel 217 connects also to three sets of gates similar to gates 202, 203, and controlled by the number gated out of shift registers 16*a*—16*d*. Output signals are taken from circuits 208′, 208″, and 208‴, which are identical to circuit 208, to magnetic heads 222—224 and amplifiers 17*b*, 17*c*, and 17*d*, respectively.

The tubes 209, 211, and 212 in the above circuit may preferably be of the type 5692.

Figure 34:
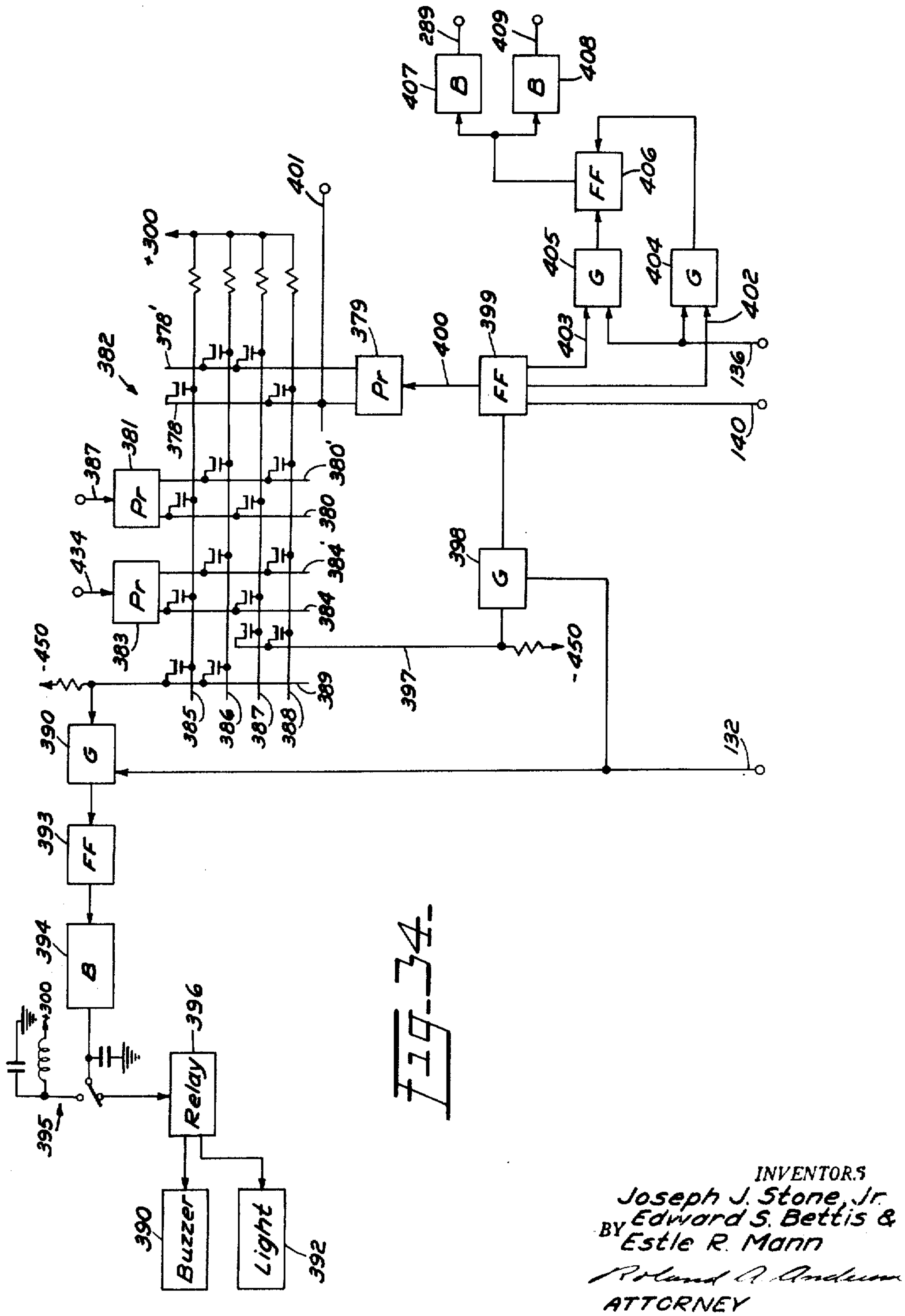

The computer is presently designed to handle only numbers between +1 and —1. The units employed to warn the operator when the computer has exceeded the above limits is illustrated in Figure 34.

If the accumulator total carries a positive sign, output line 378 of pair 379 will be "high." Likewise, if a carry is indicated from the most significant digit of the accumulator, line 380 of pair 381 will be "high." The four output lines of the pairs are connected in a diode matrix 382, together with the outputs of pair 383, which is controlled by the sign of the number to be placed in the accumulator, line 384 being high for a positive number.

Since addition of a positive number to a positive accumulator total resulting in a carry must indicate a number greater than +1, matrix line 385 is coupled to pair outputs 380, 384, 378, and because subtraction of a negative number from a negative accumulator total resulting in no carry digit would indicate a number less than —1, matrix line 386 is coupled to the remaining outputs 384′, 380′, and 378′ of the pairs. Line 389 will then be "high" if either of lines 385, 386 are "high," indicating that the limits of the computer have been exceeded, and will open gate 390. An incoming "add" pulse from channel 132, Figure 24, will then pass through gate 390 and will actuate the intermittent warning buzzer 391 and light 392 through limit flap-flop 393, buffer 394, relay oscillator 395, and relay 396, to provide both audible and visible warning that the computer has exceeded its limits.

Subtracting a larger number from a smaller accumulator total will change the sign of the total from + to —, while adding a number to a negative accumulator total that results in a carry operation (the two numbers added are greater than 1) will change the sign from — to +. Should either of these operations be directed, matrix line 397 will go "high," opening gate 398, allowing the "add" pulse to trigger the "sign" flip-flop 399. The signal in output channel 400 will then reverse in polarity, reversing the polarity of the leads from pair 379 in accordance with the new sign of the accumulator total, and reversing the polarity of the signal in channel 401 leading to the sign comparator circuit.

The "sign" flip-flop also has output channels 402, 403, which furnish signals of opposite polarity, depending upon the state of the flip-flop, to open one of gates 404, 405, and close the other. The "transfer" pulses from channel 136, Figure 24, will pass through the selected open gate and trigger "sign-storage" flip-flop 406 to the same state as the sign flip-flop 399. An output may be taken from that circuit and fed through buffer tubes 407, 408 to two output channels: channel 289, connected to relay timer 37, and channel 409, connected to comparator circuit 35. The "sign" flip-flop may be reset to the state where a + signal occurs in output channel 400 by occurrence of a pulse in the "reset" channel 140 from the cycling unit 24.

The sign to be recorded on the short tape 2 appears in channel 409, and is fed to pair 410 in the comparator unit, Figure 35, to control the operation of gates 411, 412. Record pulses from channel 201, Figure 33, will pass through only one of those gates, depending upon the polarity of the pair leads. The pulses then will pass through either amplifiers 414, 416 or amplifier 413 and follower 415, and are fed to the channel 13′ and its associated magnetic recording head 425. This part of the circuit is identical to the number recording circuit shown in greater detail in Figure 33, and designated by the numbers 202—213. Since amplifier 416 produces an inverted output pulse, while follower 415 produces a wave of the same polarity as the input pulse, it is apparent that the polarity of the pulse fed to the recording head depends upon the gate opened by the sign signal in channel 409.

Figure 39A:
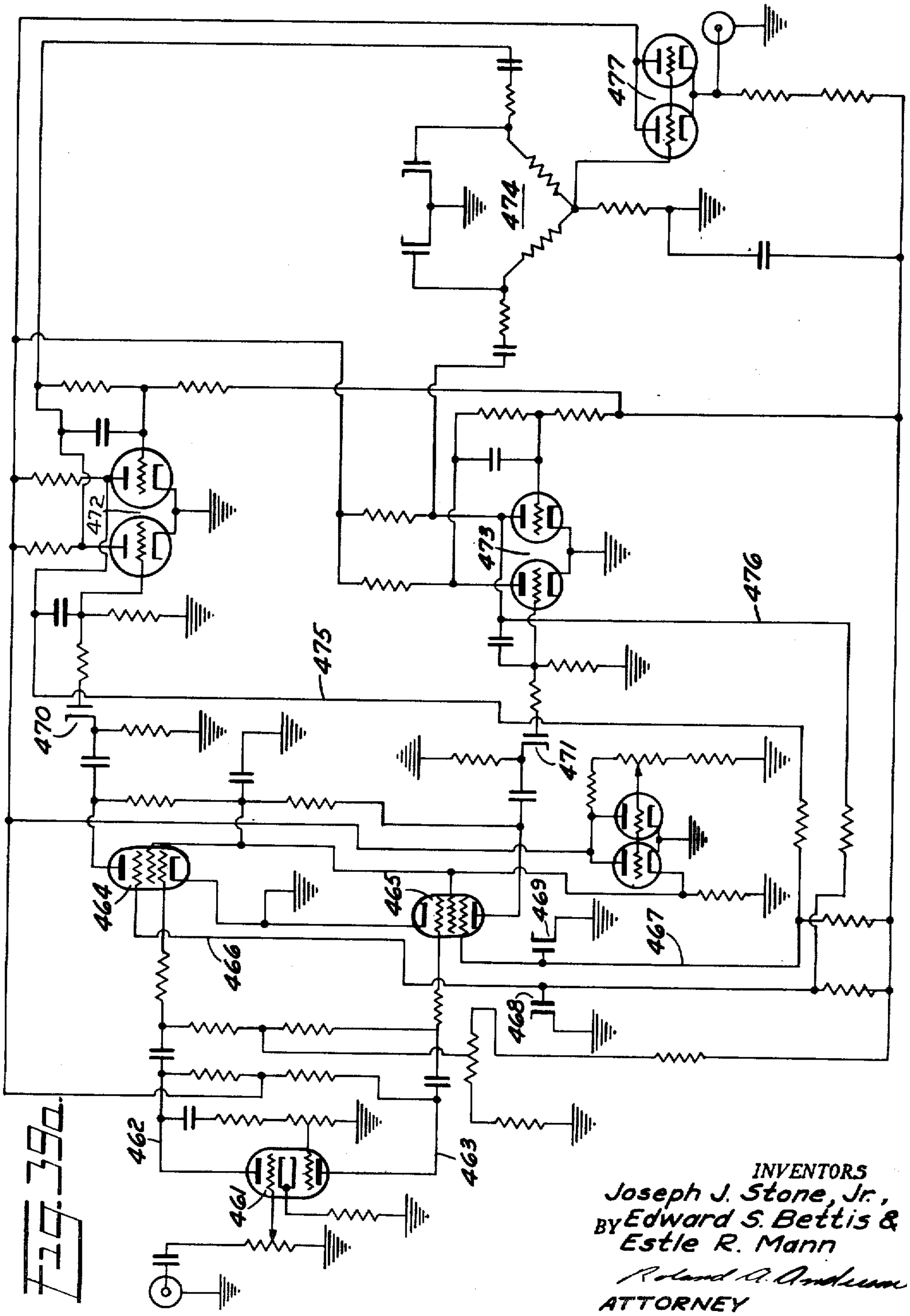
Figure 39B:
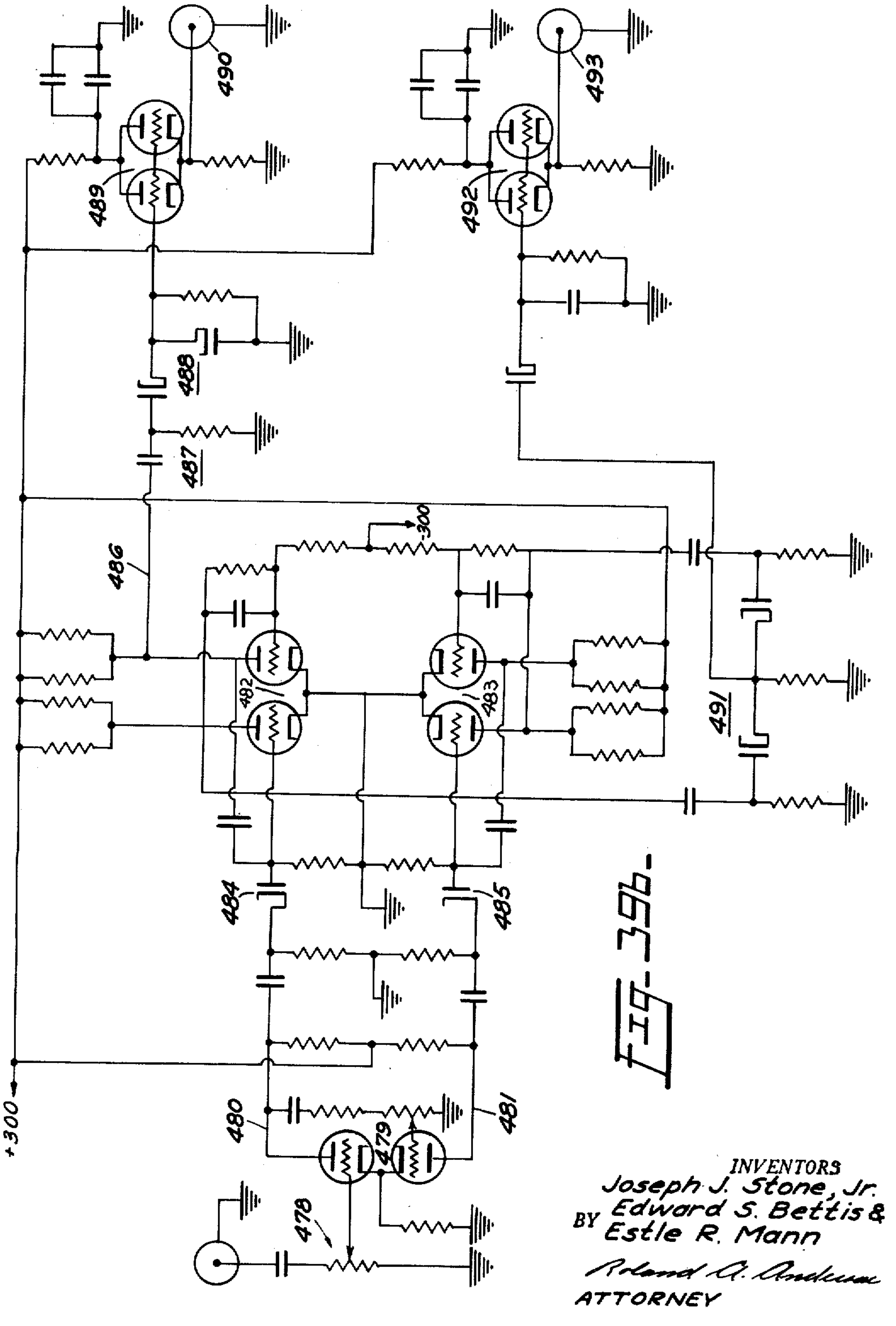

The pulse in channel 13′ is fed into preamplifier 17*e* and fed to polarity selector 39, shown schematically only, which may be of the type shown more fully in Figure 39. The outputs of the polarity selector drive "sign" flip-flop 420. The sign stored therein determines the polarity of the output channel 421 and consequently governs the polarity of the output leads of pair 422. The signal from "sign" channel 55, Figure 23, governs the polarity of the leads from pair 423. If the inputs to the pairs indicate that both signs are the same, through diode matrix 424 line 425 will go "high." But if the inputs to pairs 422, 423 indicate that the signs are different, line 425 will assume its lower potential. Matrix output line 425 determines the polarity of the output leads 426, 427, from pair 428, which feed followers 429, 430. The accumulator sign in channel 401, Figure 34, will control the polarity of the leads 431, 432, from follower 433, only if a positive "transfer" signal from channel 69 of the control unit 23 removes a diode clamp 417 from the follower input. Such signal also is coupled through clamp 418 to pair 428 to block the signal from line 425, so that only the sign of the accumulator from channel 401 will determine the polarity of output channels 434, 435, when the accumulator total is to be transferred out.

Returning to the output leads from pair 422, which indicate the sign of the short tape number, these leads are coupled through followers 436, 437 to the complementing circuit shown in Figure 25. The multiplication signal from channel 54, Figure 23, a positive voltage, unblocks follower 437 through inverter 419; otherwise, line 438 remains low.

Figure 36:
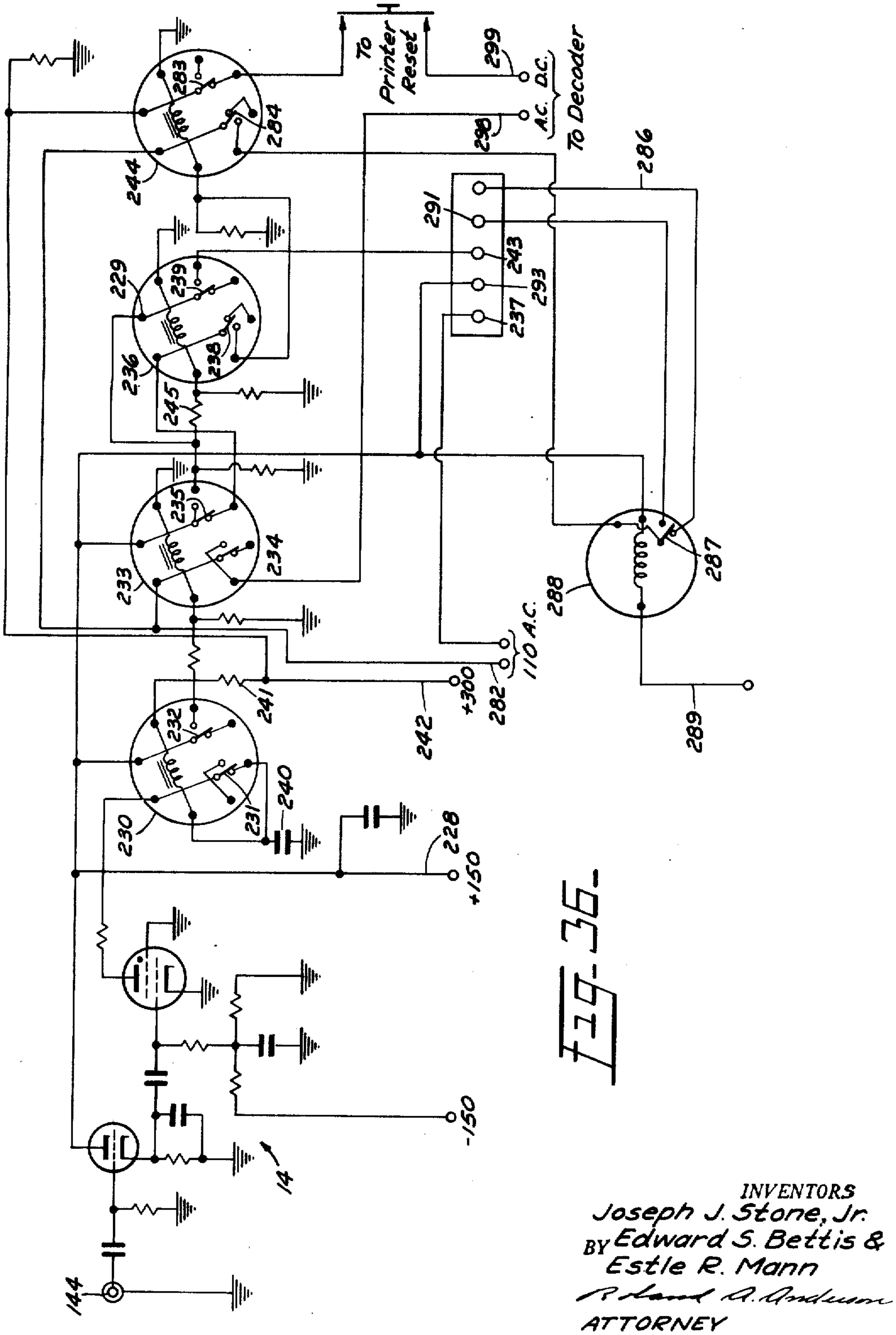
Figure 33:
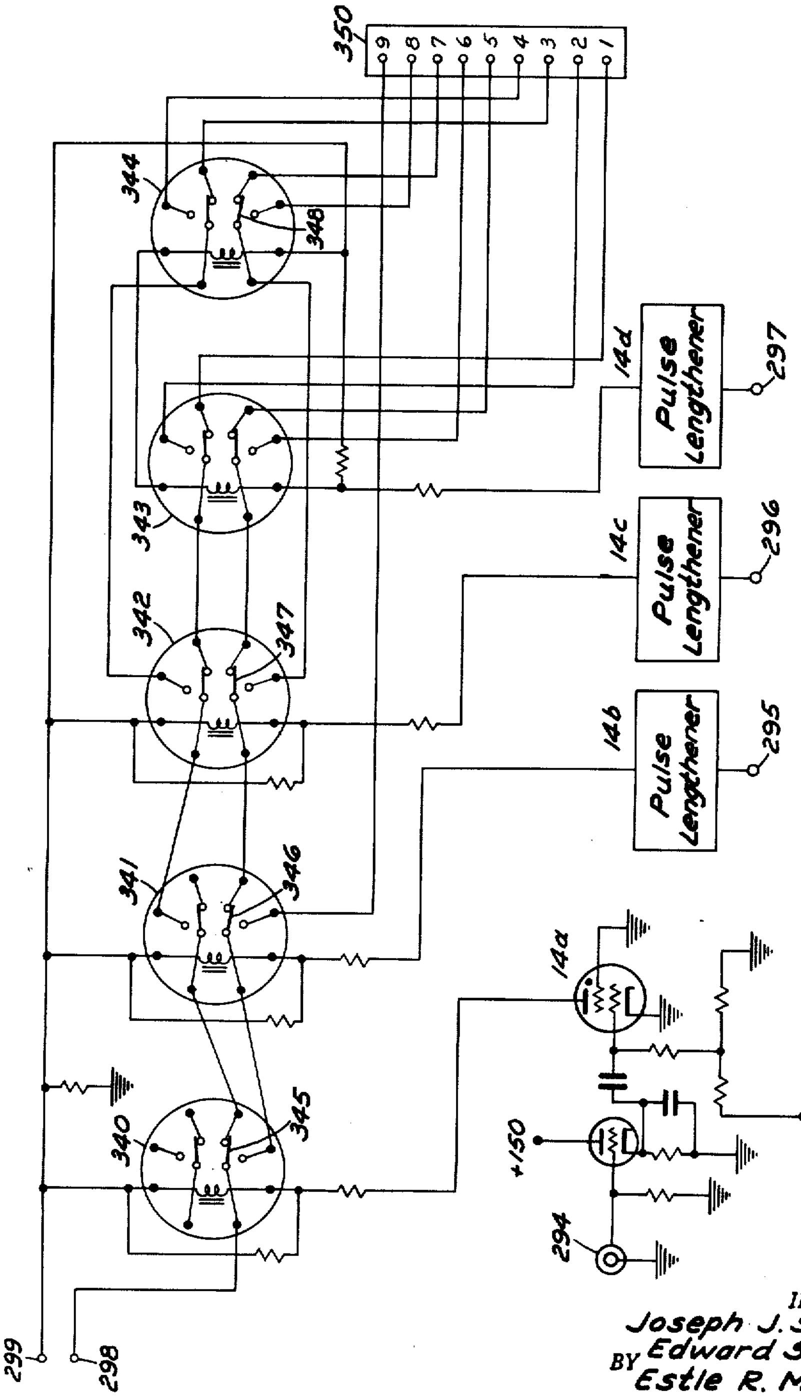

It may be desired to print the number stored in the accumulator at the end of a computing cycle. To accomplish this, the instruction "TP" is recorded, in coded binary form, on the long tape alongside each number. When the "TP" signal is read by the instruction reading head into channel 3′, it causes a pulse to appear in channel 144, Figure 24. Figures 36 and 37 illustrate a preferred means for actuating the desired printing keys responsive to that pulse. The decoder 37 sets up a path for an actuating voltage to one of the numbered solenoids through cable 350. Timer 37 provides that A. C. voltage to actuate a key, and also provides a voltage to a printer actuator solenoid to print the number selected.

Referring now to Figure 36, the pulse is widened in circuit 14, described fully in connection with Figure 14, by the RC time constant in the cathode circuit, so that it will reliably fire the connected thyratron. As current flows through the thyratron, relay 230 is picked up, opening contact 231 in the plate circuit of the thyratron and closing contact 232 to energize relay 233. Relay 233 closes contacts 234, 235, energizing relay 236 and connecting the 110 volt A. C. line 298 to channel 282. Relay 236 closes contacts 238, 239, connecting channel 243 to 150 volt D. C. line 228 through pin 229 and contact 235.

After a time determined by the time constant of capacitors 240 and resistor 241, relay 230 opens, allowing relay 233 to open. But relay 236 remains closed due to its holding circuit from energized line 228 to channel 243, contact 239, pin 229, resistor 245, the relay coil, and ground. The energizing circuit for relay 244 is also complete, from channel 228, contacts 235 and 238, the relay coil, and ground, so that relay 244 picks up, closing contacts 283, 284. Closing contact 283 deenergizes channel 299 supplying the plate voltage to the four thyratrons 285, shown in Figure 37. Contact 284 energizes the positive printer actuator coil, Figure 38, from 110 volt channel 282 through contact 284, contact 287 on deenergized relay 288, channel 286, and the actuator coil to the common return 237. A positive signal potential in channel 289, signifying a positive number in the accumulator, allows relay 288 to remain open, because the difference of potential across the relay coil is not great enough to close the relay contacts. But a negative signal in channel 289 actuates the relay, picking up contact 287, and energizing the negative printer actuator through channel 291.

When either actuator is energized, the printer mechanism prints out the numbers selected by the key solenoids. The movement of the printer actuates microswitch 292, Figure 38, connected across terminals 293, 243, which opens the circuits energizing relays 236 and 244, resetting the relays for the next cycle of operations.

As is shown in Figure 1, the binary signal appearing in each of the four most significant output channels of the accumulator sections **32*e*—32*h* is connected to the input of one of the corresponding gate circuits 7*a*—7*d*, which may be opened only by a transfer pulse from channel 141 in the cycling unit. If the gate circuit allows the signals to pass, they go to four four-channel decoder units, each unit representing one decimal number. One of the identical units is shown in Figure 37. The gated signals are applied through input channels 294—297 to switching circuits 14*a*—14*d*. A "1," or positive input pulse in any input channel will fire the thyratron connected to the pulse widener in that channel, as is described in connection with Figure 14, picking up the corresponding relay. The contacts actuated are so interconnected that the appropriate one of the numbered output channels 350 is energized by the combination of the four binary input signals to the unit. For illustration, the decimal number "8" may be coded as "1011." If these four binary digits were applied to channels 294—297, relays 340, 342, 343, and 344 would pick up. Contact 345 is then connected through contacts 346, 347, and 348 to the number "8" output channel. Contact 345 is connected to channel 298, Figure 36, which carries 110 volts A. C. when relay 233 is closed. This voltage is applied through the output "8" channel 350 to a corresponding number key solenoid, and is removed shortly thereafter, after the number key is fully depressed, by the opening of relay 233, as described above, breaking the voltage supply circuit. In addition, the 300 volt D. C. entering the decoder on channel 299 from the relay timer unit 36 is removed by the closing of relay 244**, as described above.

The relays employed may preferably be the BOYHO-6, obtainable from the Allied Control Company.

The printer unit, shown in Figure 38, may comprise any suitable solenoid-actuated printing keys; for example, those found in commercial adding machines are satisfactory.

There are provided four groups of nine key solenoids each to select the four numbers to be printed. One group is indicated generally by the numerals 690. A solenoid from each group is energized through the appropriate numbered output channels 350 in the four relay decoders **37*a*–37*d* as described above. The selected keys are depressed to print on a tape by "positive" solenoid actuator 692, or "negative" solenoid actuator 691. The "negative" printer actuator key prints a minus sign after a negative number. That key is energized through channel 291 of the relay timer 36, while the "positive" actuator is energized through channel 286**. A positive number is printed without any arithmetic sign An alternative form of a polarity selector circuit, similar in its function to that shown in Figure 19, is illustrated in detail in Figure 39. The circuit provides a two-channel output from an input of two pulses of opposite polarity.

Each input pulse is applied to the grid of a phase inverter stage 461, producing a pulse in both output channels 462, 463, the pulses being of opposite polarity. These pulses are fed to gates 464, 465, controlled by the voltage on leads 466, 467, respectively. Diode clamps 468, 469, respectively, are coupled to those leads. Both gates are initially open, and the tubes biased below cut-off. A positive pulse in one of the channels 462, 463, will turn on the connected gate tube, producing a sharp fall of potential at its anode. After passing through an RC differentiating network, the resulting negative pulse is coupled through the connected one of diodes 470, 471 to the input grid of a delay-multivibrator. After a suitable delay, the multivibrator produces a square-wave output signal, which is coupled to mixing network 474. Both multivibrators 472 and 473 feed this network. The output circuit of each multivibrator is fed back to block the gate in the opposite channel; thus, circuit 472 is connected through lead 475 to the suppressor grid of gate 465, while circuit 473 is coupled to the suppressor grid of gate 464 through lead 476. In this manner, the gate is blocked as a result of the first input pulse, before the second of the two input pulses can pass therethrough, and for a time long enough to allow the said second pulse to decay so it is no longer in the input circuit to the gate. The negative blocking square wave is removed before the next set of two input pulses is received at the gate, and the latter is open again.

It may be seen from the above description that only one of the multivibrators will be triggered for each input set of two pulses, and that the polarity of the first of those pulses determines which one will be triggered. If circuit 473 is triggered, a negative pulse will appear at the input of follower 477, but if circuit 472 is triggered, a positive pulse will appear there. The resulting pulse, of the same polarity, is differentiated in coupling network 478 and applied to another phase inverter 479. Pulses of opposite polarity will then appear in channels 480, 481, and those channels are coupled to the input circuits of delay-multivibrators 482, 483, respectively. Only the multivibrator coupled to the channel receiving the negative pulse may be triggered, because of the coupling diodes 484, 485. If circuit 482 is tripped, the resulting positive square wave in output channel 486 is differentiated in network 487, the positive pulse is passed but the negative pulse is removed by series-parallel clipping network 488, and the positive pulse is coupled to a cathode-follower output stage 489. The output in channel 490 will therefore be a positive pulse for each group of two pulses appearing in the input stage 461 wherein the first pulse is of positive polarity.

The anode of the input tube of each of multivibrators 482, 483 is coupled to mixer network 491 and that network is coupled to follower 492 so that a positive pulse is impressed upon the follower grid regardless of which multivibrator is triggered. Therefore, a positive pulse will appear in channel 493 for each set of two input pulses at input stage 461.

The tubes employed in the foregoing circuit are preferably: diodes—6AL5; inverters 461, 479—12AU7; gates 464, 465—6A56; multivibrators 472, 473—12AT7; followers 477, 489, 492—6J6; univibrators 482, 483—5687.

Figure 40:
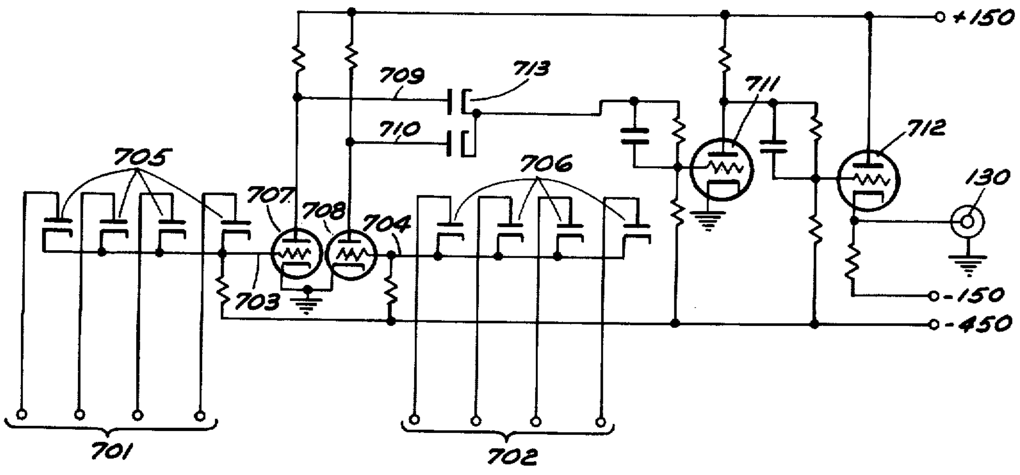

The check matrix, Figure 40, is provided to monitor the numbers coming to the adder and to prevent the machine from adding a faulty number to the total in the accumulator, when the fault is caused by an error in coding or improper functioning of the multiplier unit with its associated code and decoder.

If a legitimate binary number is set up in the left and right hand digit cables 701, 702, then at least one of the four channels corresponding to each digit will contain a "high" voltage signal. Since the matrix lines 703, 704 are each returned to a negative voltage, those lines will be "high" as long as at least one of the diodes 705, 706 associated with each conducts. If the lines are "high," then tubes 707, 708 will conduct, maintaining the potentials of lines 709, 710 "low." The grid of tube 711 will, in turn, be held "low" so the tube is below cut off and its plate potential is "high." Then tube 712 will conduct, raising the potential of clamping line 130 to "high," removing the clamp 714 from the grid of oscillator 129, Figure 24, which generates the add pulses. With the clamp removed, add pulses can be generated and transmitted through to the adder unit.

But if either of the input number cables should fail to contain a "high," an error is indicated, and operation should be halted. If the error is in the left hand cable 701, for example, then matrix line 705 would fall in potential, cutting off tube 707, raising the potential of line 709, and causing diode 713 to conduct. Potential at the grid of tube 711 will rise, causing that tube to conduct, lowering the potential at the grid of tube 712 below cut off, and causing a "low" potential to appear at output channel 130. The clamp 714 then keeps oscillator 129 from operation, so that no add pulses are generated, and no further computation occurs.

The vacuum tubes illustrated may be type 12AT7, while the diodes may be type 6AL5, for example.

What is claimed is:

1. An electronic, digital computing machine comprising a memory and data storage system for numbers and computing instructions including a pair of synchronized magnetic tape means on which signals are recorded and from which signals are read, a plurality of electromagnets for reading and recording said signals on said means, registers coupled to said magnets for storage of signals read from said tapes; and electric signal producing means connected to said electromagnets for producing said signals to be recorded; an arithmetic unit including a parallel, coded-decimal adder comprising a plurality of parallel channels, each channel including an electronic circuit having two stable conditions, signal generating means responsive to inputs from said registers for triggering said electronic circuit from one condition to the other, gate circuit means for passing or blocking the triggering signal from said generating means and provided with a control input, a digit adder unit comprising a plurality of inter-connected diode matrix logical adder networks provided with an output coupled to said control input to actuate said gate circuit responsive to the coincidence of selected binary inputs to said adder; a control system having an input circuit for said instructions and output circuits for directing the operation of said computing machine; output display means; and means responsive to the binary state of said electronic circuit in said adder and to signals derived from one tape for applying recording signals to that group of said magnets associated with the other tape and for applying output signals to said display means.

2. An electronic, digital computing machine comprising a memory and data storage system for numbers and computing instructions, an arithmetic unit including input means for deriving signals representative of two numbers simultaneously from said memory, a matrix multiplication table circuit provided with inputs coupled to said input means and a pair of outputs for signals representative of the product of said two numbers, a parallel, coded-decimal adder comprising a plurality of parallel channels, each including an electronic circuit having two stable conditions, signal generating means responsive to inputs from said system for triggering said electronic circuit from one condition to the other, gate circuit means for passing or blocking the triggering signal from said generating means, and a plurality of interconnected diode matrix networks coupled to said bistable circuit and to said multiplication circuit outputs and provided with an output coupled to said gate circuit to actuate said gate circuit responsive to the inputs to said networks; a control system having an input circuit coupled to said memory to receive said instructions and output circuits for directing the operation of said computing machine; and means for delivering the output signals of said arithmetic unit to said memory system and to an additional member for indicating said output signals.

3. In a calculator, first and second signal pick-up means, first and second magnetic tapes of unequal length movable with respect to said means, the peripheral length of said first tape being an integral multiple of that of said second tape motive means for said tapes comprising a common drive shaft for urging said tapes past said pick-up means in synchronism, first and second means to record digit representing signals on respective tapes, digit multiplying means having first and second inputs coupled to respective pick-up means and provided with an output, a digital adder having an input coupled to said multiplier output and provided with an output, and means responsive to said first pick-up means for coupling said adder output to said second recording means to record a signal on said second tape.

4. In a computing machine for computing a series of unknown quantities, a plurality of magnetic reproducing and recording heads arranged in two groups, said first group including a timing signal reproducing head, first and second magnetic tape data carriers arranged to register with respective groups of said heads, said first carrier being continuous or endless and provided with a series of equally-spaced bits of information for timing, means for moving said tapes past said heads at equal velocities, a digit adder circuit a first binary memory element coupled to said adder for periodic storage of the computed value of each of said unknowns, a second binary memory element coupled to the heads of said second group for periodic storage of instruction information recorded on said second tape means responsive to the coincidence of selected binary states of said memory elements for operatively coupling said first memory element to said first group of magnetic heads to record said computed values on said first tape.

5. In a computing machine, a data carrier for a series of coded instructions, each instruction including a plurality of bits of binary information; means for reading said instructions from said carrier and for producing a pair of electrical impulses therefrom, the polarity of said impulse corresponding to the binary character of said instructions; means for deriving a first pulse from each of said pairs and a second pulse from only those of said pairs corresponding to a selected binary character; pulse generating means responsive to said first pulse for deriving a group of pulses; a first register coupled to receive said first and second pulses and comprising a plurality of interconnected stages of binary character, each stage corresponding to one of said bits, and each stage save one being provided with an output lead which assumes a potential corresponding to the binary state of that stage; means for deriving a pair of voltage signals of opposite binary character responsive to each of said output signals; a first diode matrix having input leads coupled to said last-named means to receive said output signals and having a plurality of output leads; a second register comprising a plurality of stages and coupled to receive said groups of pulses from said pulse generating means, each stage being provided with a corresponding output lead; a second diode matrix having input leads coupled to said output leads from said second register stages and to a source of constant potential and having a plurality of output leads for carrying control signals; and a plurality of groups of gating devices, each device being coupled to one of said output leads of said second matrix, and each group being coupled to a respective output lead from said first matrix to receive gating signals therefrom.

6. In a computing machine, a memory system including first and second magnetic tapes for storing numbers and computing instructions, two groups of electromagnets, one group being associated with each tape, means for moving said tapes in synchronism past said electromagnets, means for deriving timing impulses from at least one tape, and a plurality of data storage registers provided with output leads and having inputs coupled to respective magnets for receiving recorded information from said memory tapes; number storage means including a plurality of output leads and means to impress on said output leads respective electrical potentials representing a desired decimal number; circuit means having inputs associated with the outputs of one group of said data storage registers and with said number storage means for deriving the binary complement of the potentials at its inputs responsive to a selected binary signal from a first of said electromagnets; digit multiplier circuit means having two groups of inputs and outputs; digit adder circuit means provided with an accumulator section, input leads coupled to said two groups of multiplier outputs, and output leads; a temporary storage register having output leads and having input leads, means operative to connect said last-named input leads to said adder outputs responsive to a selected binary signal from a second of said registers; circuit means responsive to said timing impulses for periodically operatively connecting one group of multiplier inputs to a first group of data storage register outputs circuit means operable by said timing impulses for coupling the other group of multiplier inputs to a second group of register outputs or to said number storage output leads, alternatively, responsive to the binary character of the output of a third selected data storage register; and circuit means operative to connect the outputs of said temporary storage register to the inputs of said first group of said magnets responsive to the presence of a selected binary signal on the output lead of said third data storage register to record on one of said tapes the results of one computation cycle.

7. In a computing machine, first and second magnetic tapes for storage of information, first and second groups of transducer heads spaced along respective tapes for recording and reproducing signals, means for moving said tapes in synchronism past said heads, respective amplifiers coupled to said heads, for amplifying pulses produced in said heads by said signals on said tapes, respective generator means coupled to said amplifiers for producing from said pulses substantially simultaneously first and second groups of pulses, the first group including a pulse for each amplified pulse and the second group including a pulse for each amplified pulse of a selected binary character, a plurality of multi-stage shift registers, each provided with first and second inputs coupled to respective generator means to receive said pulse groups, a first group of gating circuits connected between a first group of said generator means and a first group of said shift registers, complementing circuit means coupled to said first group of shift register outputs for reversing the binary character of the said outputs in response to a control signal, first and second decoding matrix networks coupled to said complementing means to receive a plurality of binary voltage inputs and to produce voltage outputs on two selected output leads representing corresponding decimal digits, multiplier circuit means coupled to receive said respective output voltages representing two decimal digits and to deliver a pair of output binary voltage signals representing the decimal product of said digits, first and second coding matrix networks coupled to receive said multiplier outputs and to produce respective groups of potentials representing the binary coded form of said decimal digits, a second group of gating circuits coupled to said coding circuits, an accumulator provided with a group of storage circuits for the binary signals representing a total, adder circuit means connected between said accumulator and the said second group of gating circuits for receiving signals representing said coded product and adding the same to the signals representing said total to provide a new total, a third group of said registers couplable to respective accumulator stages responsive to a control signal for storage of said total, circuit means coupled to respective stages of said third registers for generating recording signals in a group of said heads associated with said second tape responsive to a control signal, means coupling said third registers with said first group of gates for transferring said new total into said first group of shifting registers responsive to a control signal, means for deriving a series of timing pulses from one of said tapes, and circuit means for generating a series of control pulses responsive to said timing pulses and to instruction information reproduced sequentially from one of said tapes.

8. In a computing machine, as a subcombination, a magnetic tape having binary signals representing instructions recorded serially thereon, an electromagnetic transducer associated with said tape for recording and reproducing binary signals thereon, a shift pulse generator, a first shift register coupled to said pulse generator and said transducer to receive binary signals representing instructions from said transducer; a first diode matrix network having inputs coupled to said register and a plurality of outputs, a multiplier matrix table having associated inputs and outputs, a plurality of storage devices for storing groups of potentials representing decimal numbers, first gating circuits connectable between said multiplier and one of said storage devices responsive to gating voltages received from said diode matrix outputs; a group of accumulator flip-flops, an adder circuit for receiving potentials from said multiplier outputs and said flip-flops and performing binary addition, a second group of gating circuits connected between said multiplier outputs and the inputs to said adder and operative responsive to control signals; a second multi-stage shift register provided with a pair of inputs, outputs derived from each stage, and a second output from the terminal stage, means for deriving a first pulse from said shift pulse generator, said last-named means being connected to one input of said second register, delay circuit means operative in response to a pulse from said generator to generate a pulse train and provided with an output connected to the other input of said second register for resetting each stage thereof sequentially, a second diode matrix network having inputs coupled to each stage of said second register and having a plurality of groups of output gating leads, a first group being coupled to a first of said potential storage devices, means to couple a second group of said gating leads alternatively to second or third storage devices responsive to one or the other binary signal on a first output of said first diode matrix, and means to couple third and fourth groups of said gating leads alternatively to said second gates responsive to one or the other binary signal on a second output of said first diode matrix, whereby two proper numbers are selected, multiplication is effected, and the product is added to the previous total.

References Cited in the file of this patent

UNITED STATES PATENTS

| | | |
|---|---|---|
| 2,538,636 | Williams | Jan. 16, 1951 |
| 2,564,403 | May | Aug. 14, 1951 |
| 2,587,532 | Schmidt | Feb. 26, 1952 |
| 2,594,731 | Connolly | Apr. 29, 1952 |
| 2,604,262 | Phelps | July 22, 1952 |
| 2,608,346 | Hopkins | Aug. 26, 1952 |
| 2,609,143 | Stibitz | Sept. 2, 1952 |
| 2,611,813 | Sharpless | Sept. 23, 1952 |
| 2,614,169 | Cohen | Oct. 14, 1952 |
| 2,617,704 | Mallino | Nov. 11, 1952 |
| 2,651,458 | Bennett | Sept. 8, 1953 |

(Other references on following page)

OTHER REFERENCES

Hartree Calculating Instruments and Machines. University of Illinois Press. 1949. Page 107 relied on.

Proc. of Inst. of Elec. Engineers, "Universal High-Speed Digital Computers: A Magnetic Store," by Williams et al. (pp. 94–106). April 1, 1952.

5th Interim Progress Report on the Physical Realization of an Electronic Computing Instrument. Pages VIII–1 to VIII–6 including drawing C–3–1068. January 1949.

A Functional Description of the EDVAC Univ. of Pa., Moore School of Elec. Engineering; vol. 1, pages 6–1 to 6–5; vol. II, dwg. 104–10LD–6. November 1, 1949.